May 3, 1938. H. R. GEER 2,116,169
WIRE BENDING MACHINE
Filed Nov. 23, 1936 29 Sheets-Sheet 3

Inventor
Harry R. Geer, deceased.
By Eula S. Geer, Administratrix.
By R. S. C. Dougherty
Attorney

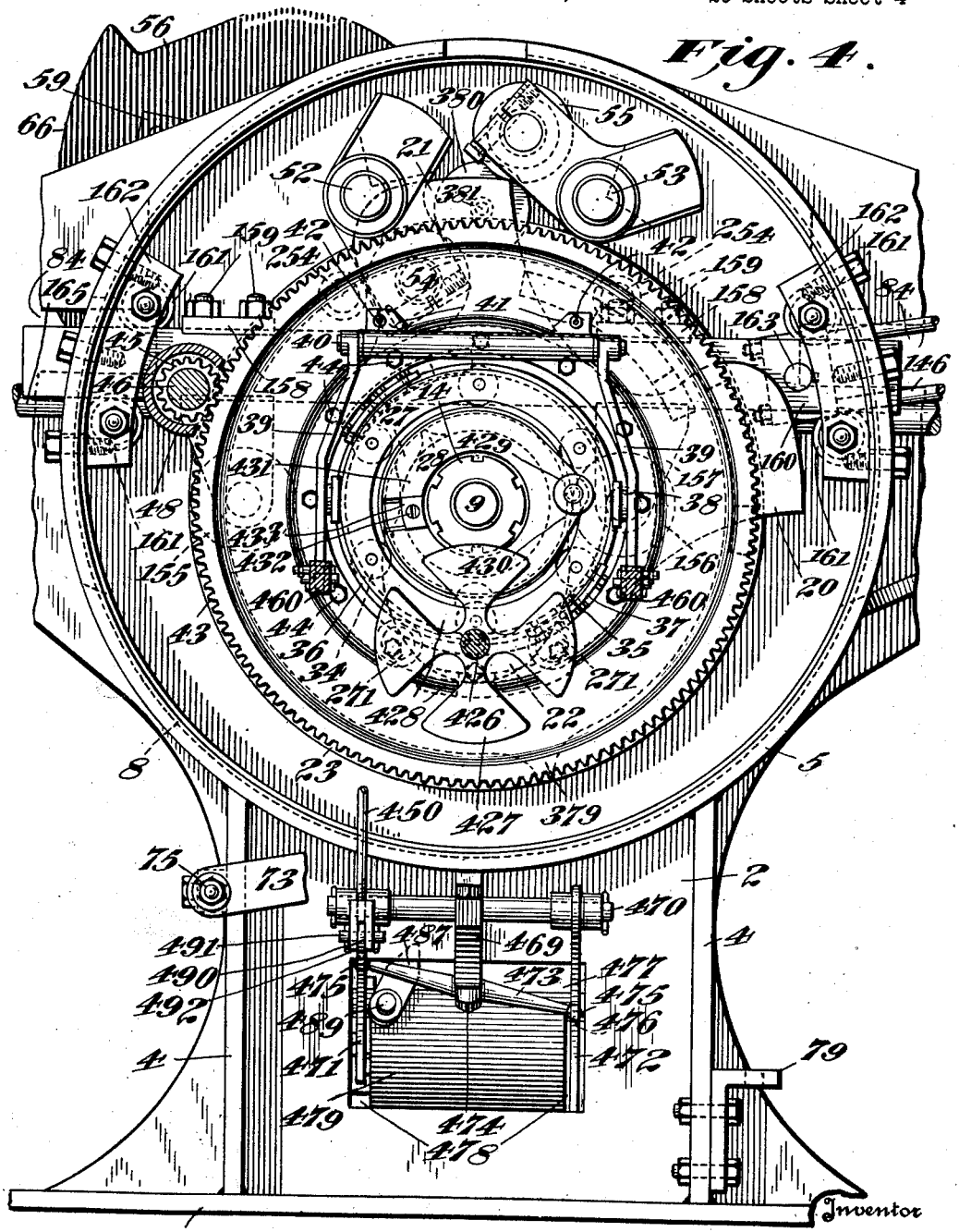

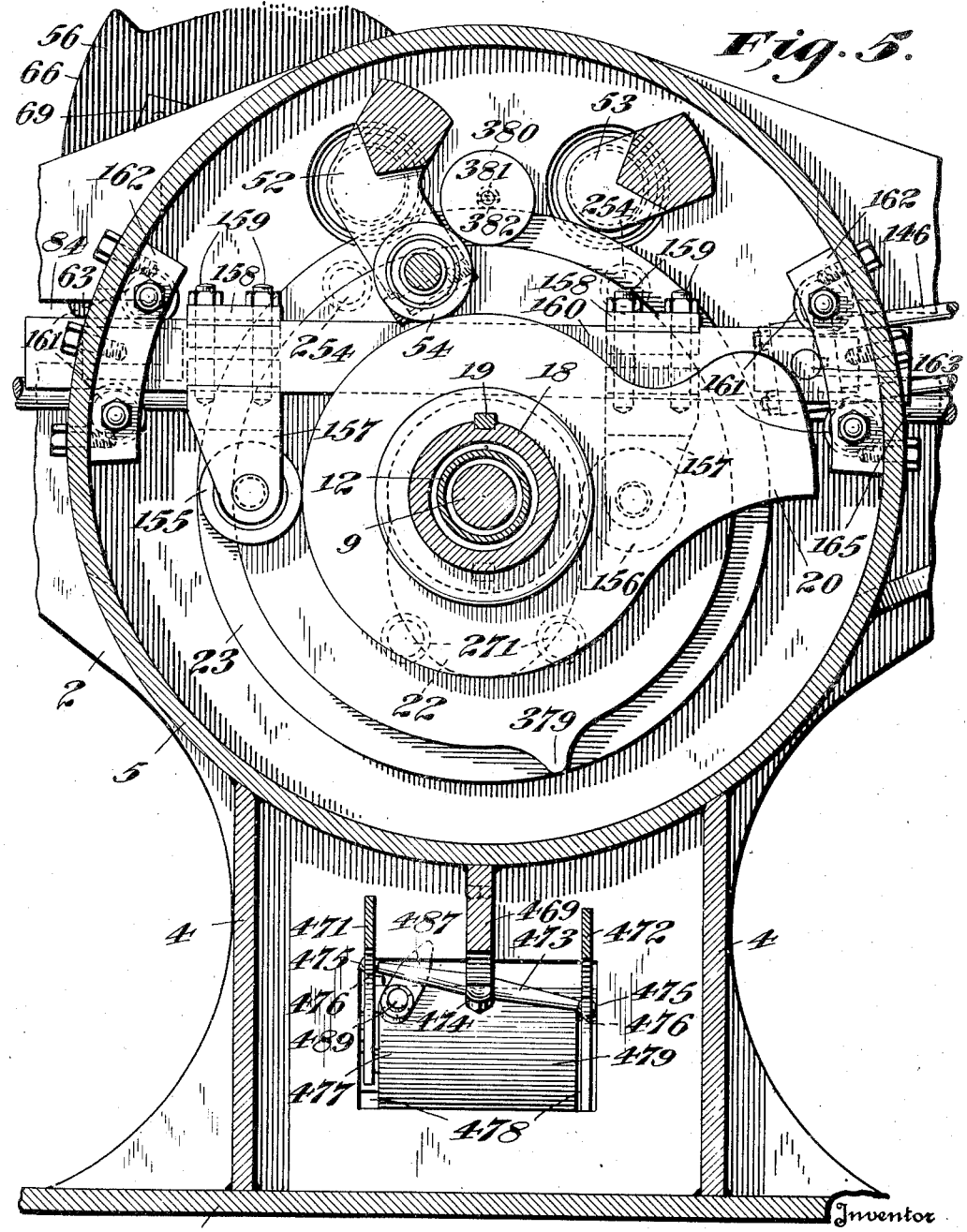

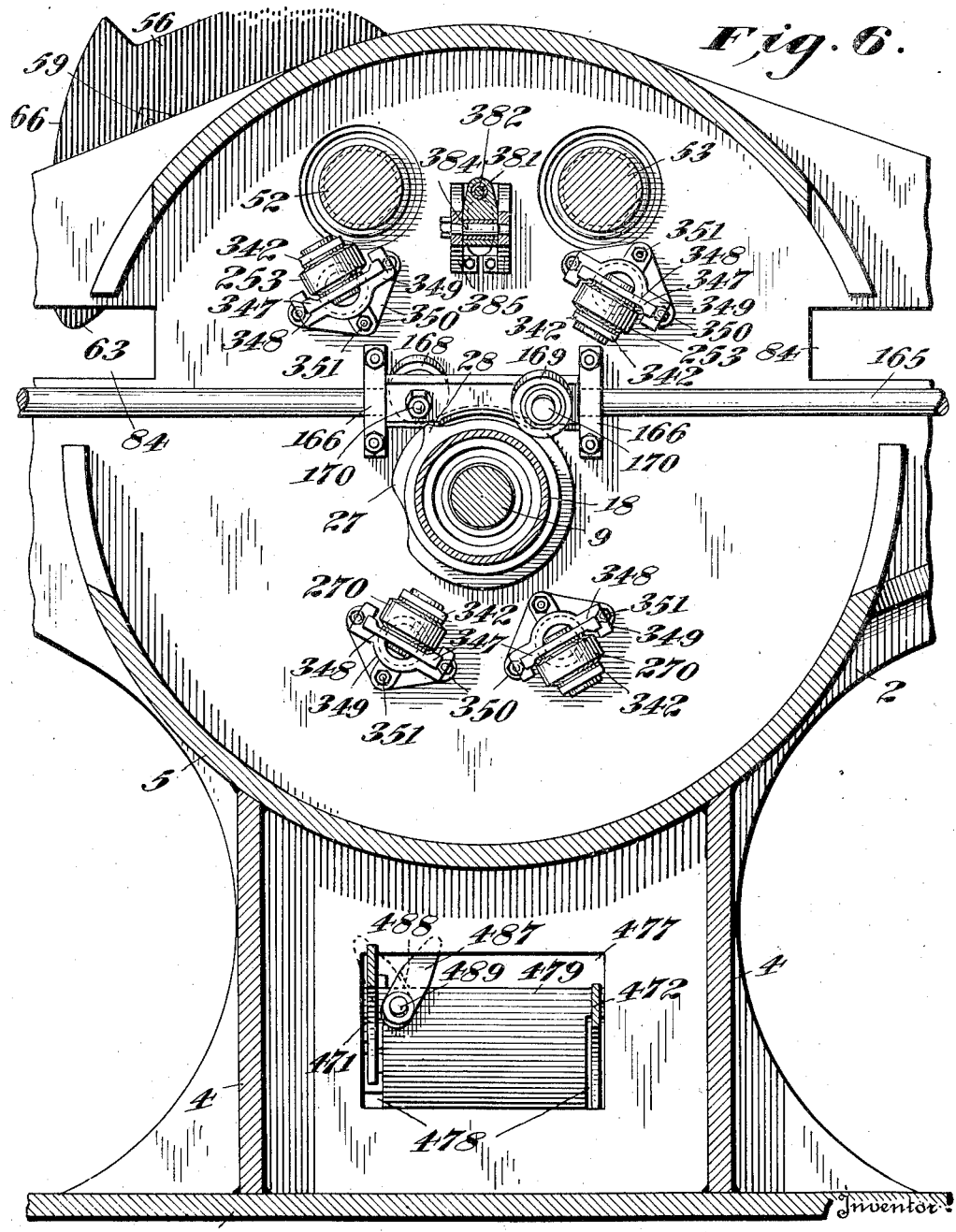

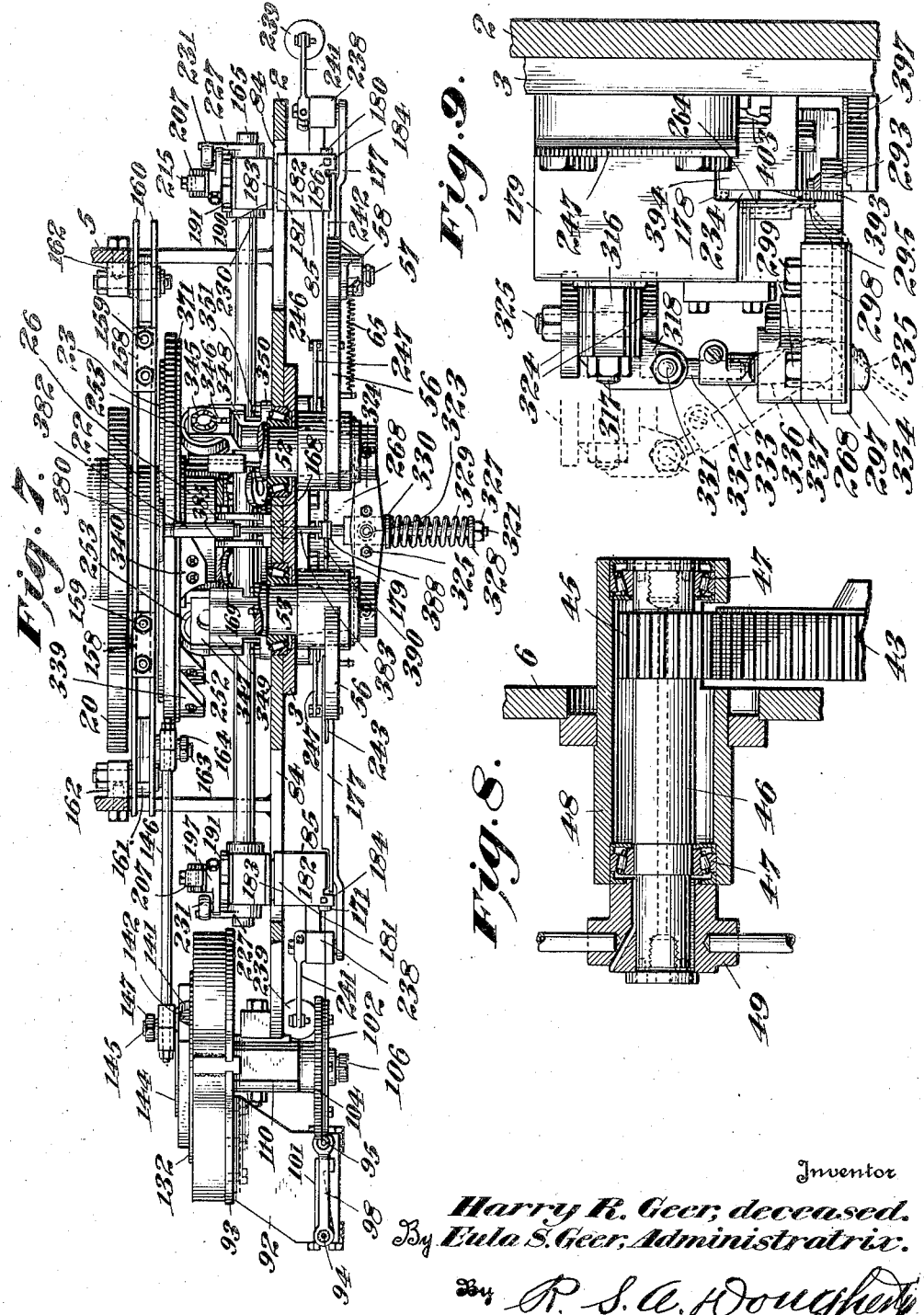

May 3, 1938.          H. R. GEER              2,116,169
                    WIRE BENDING MACHINE
              Filed Nov. 23, 1936     29 Sheets-Sheet 8

Inventor
Harry R. Geer, deceased.
By Eula S. Geer, Administratrix.

By R. S. A. Dougherty.
          Attorney

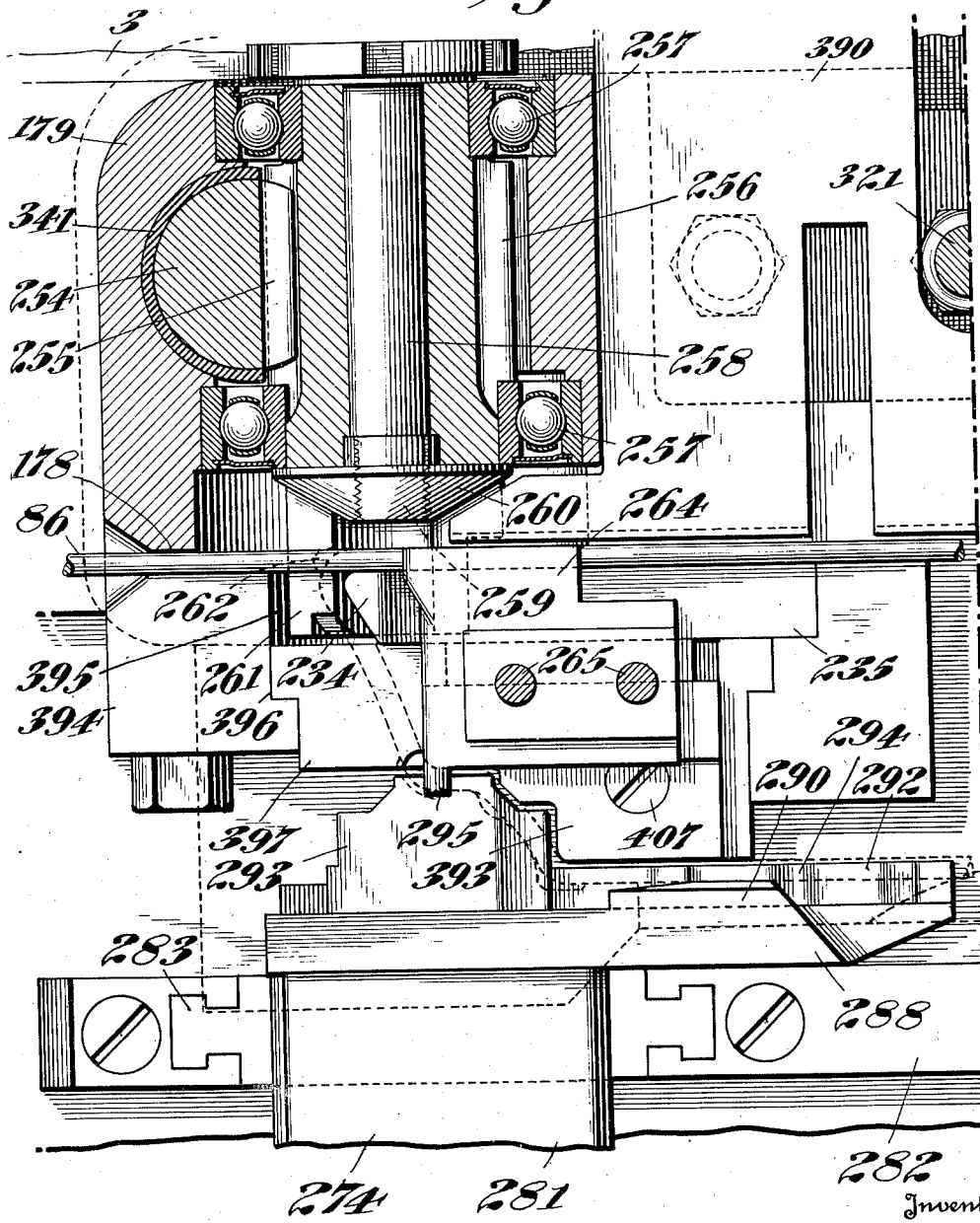

May 3, 1938.  H. R. GEER  2,116,169
WIRE BENDING MACHINE
Filed Nov. 23, 1936  29 Sheets-Sheet 10
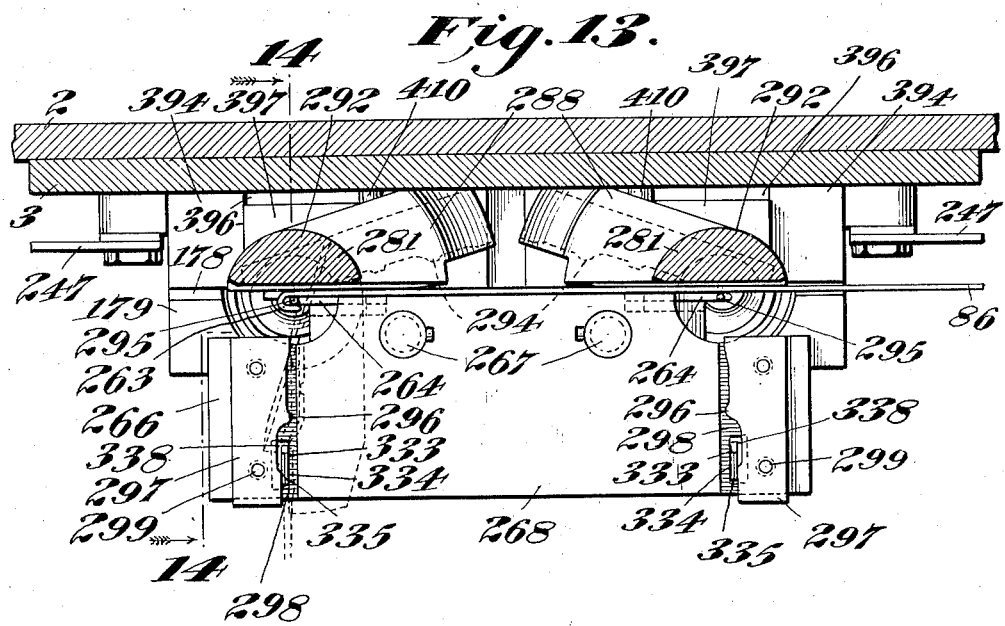
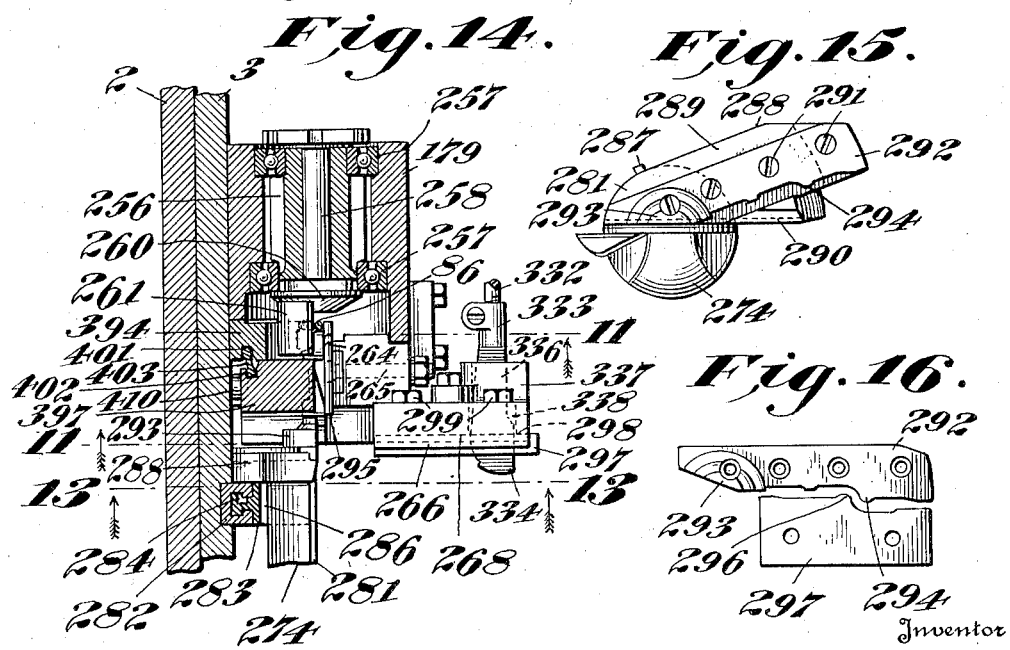
Harry R. Geer, deceased.
By Eula S. Geer, Administratrix.
By R. S. A. Dougherty
Attorney May 3, 1938. H. R. GEER 2,116,169
WIRE BENDING MACHINE
Filed Nov. 23, 1936 29 Sheets-Sheet 11
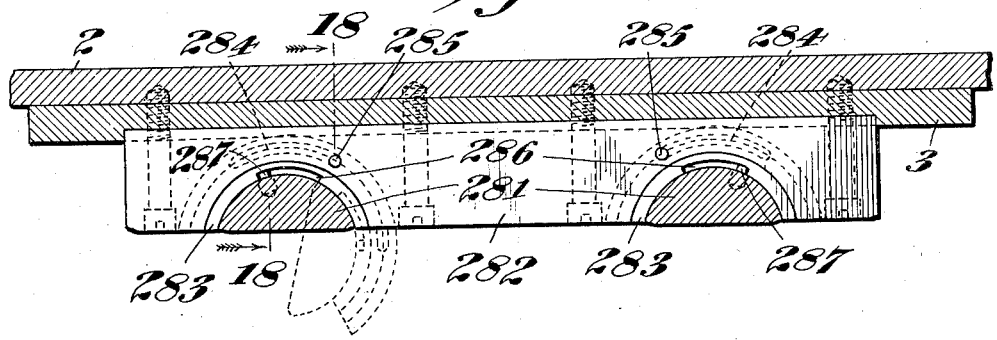
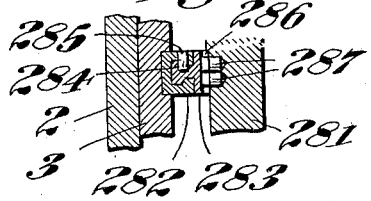
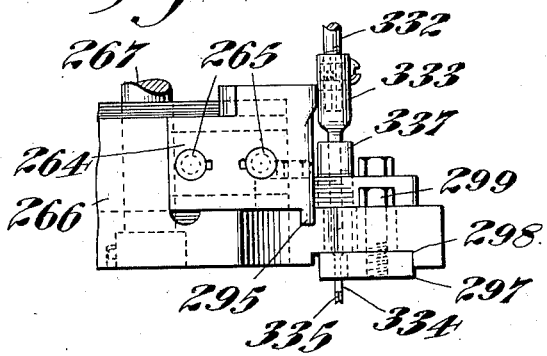
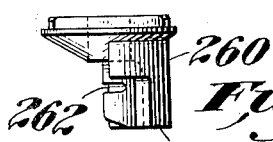
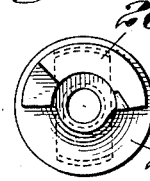
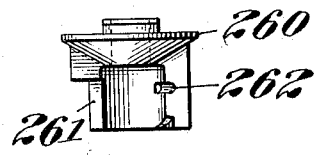
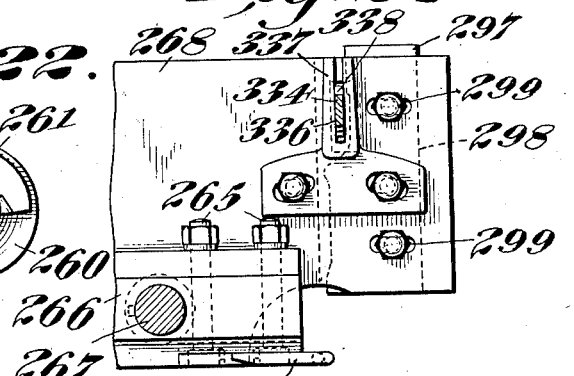
Inventor
Harry R. Geer, deceased.
By Eula S. Geer, Administratrix.
By R. S. A. Dougherty
Attorney May 3, 1938.  H. R. GEER  2,116,169
WIRE BENDING MACHINE
Filed Nov. 23, 1936  29 Sheets-Sheet 12
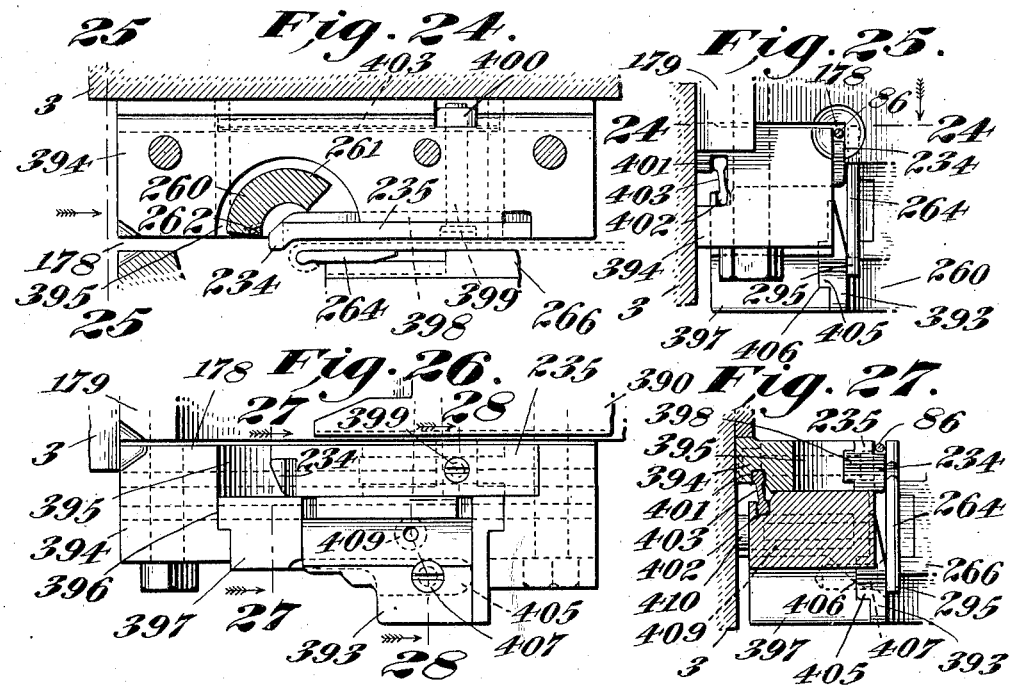
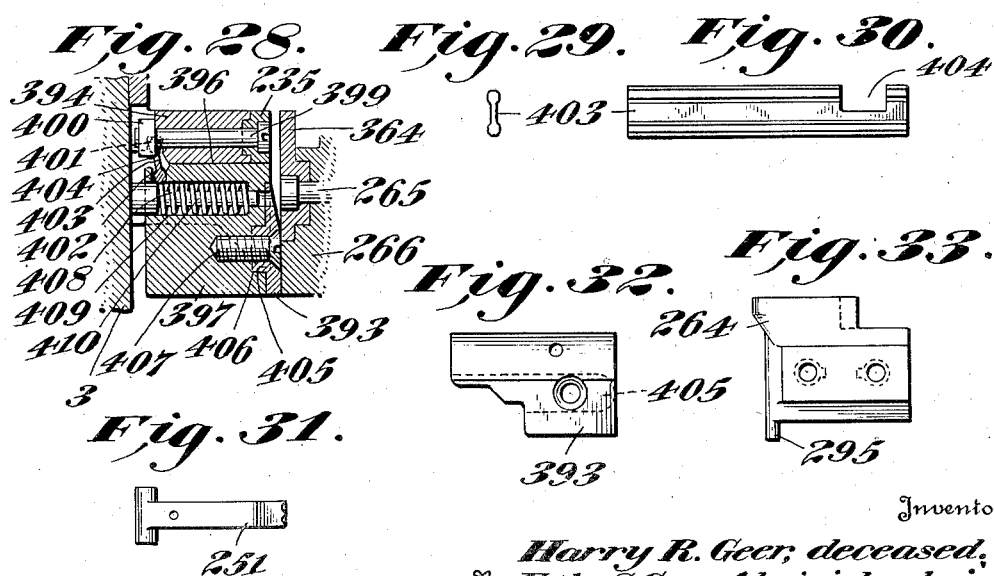
Inventor
Harry R. Geer, deceased,
By Eula S. Geer, Administratrix.
By R. S. A. Dougherty
Attorney May 3, 1938.  H. R. GEER  2,116,169
WIRE BENDING MACHINE
Filed Nov. 23, 1936  29 Sheets-Sheet 13
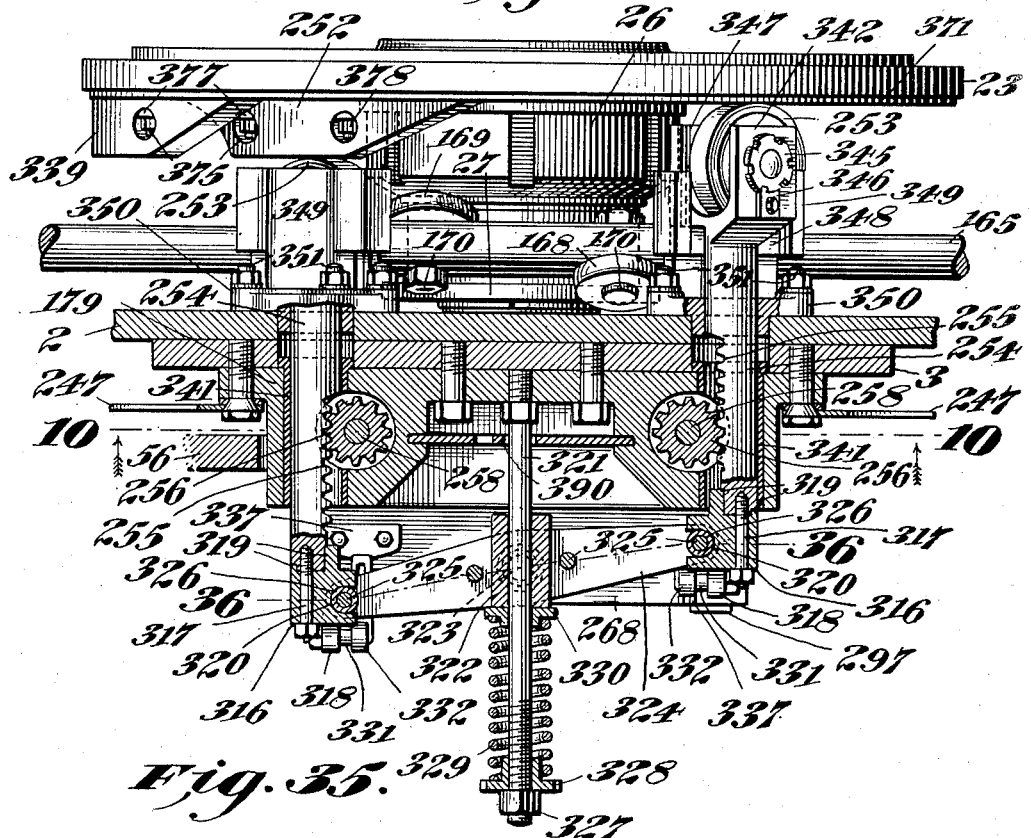
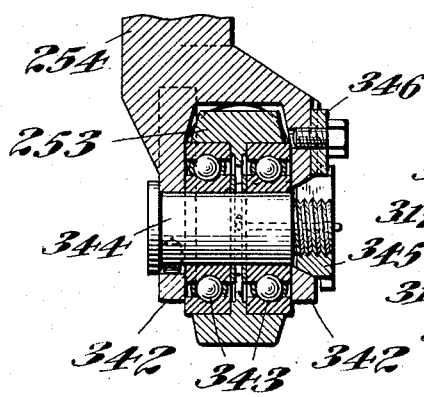
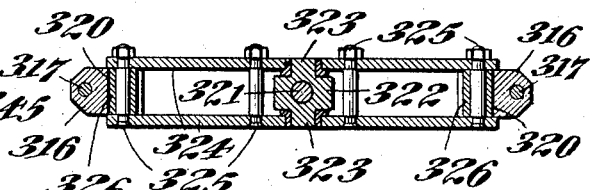
Inventor
Harry R. Geer, deceased.
By Eula S. Geer, Administratrix.
By P. S. A. Dougherty
Attorney

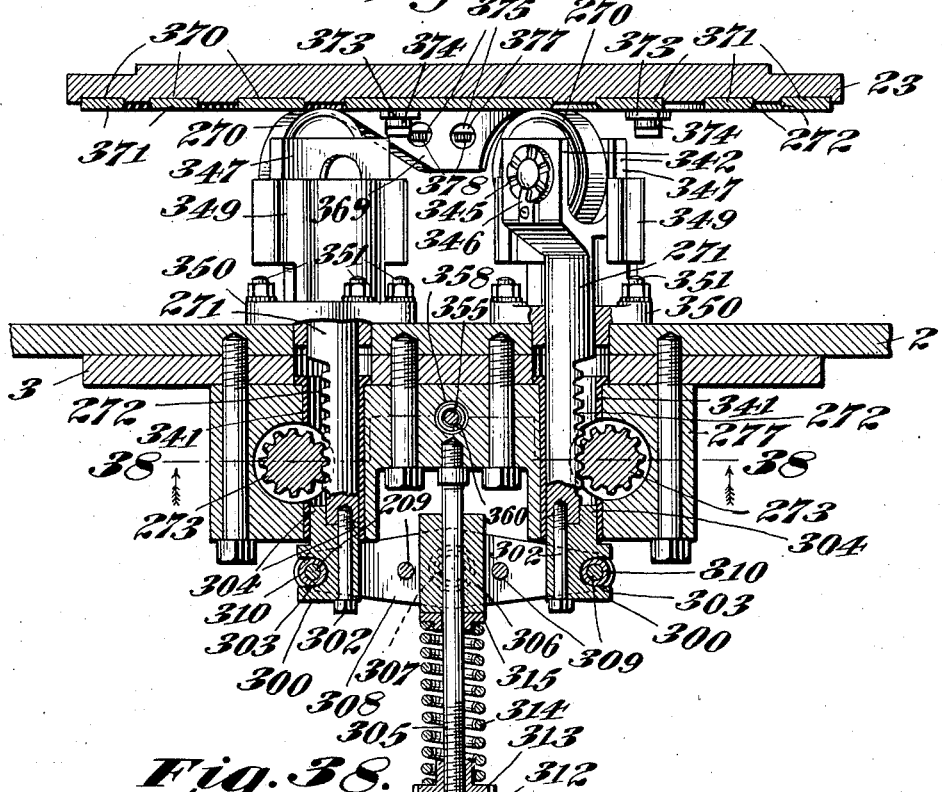
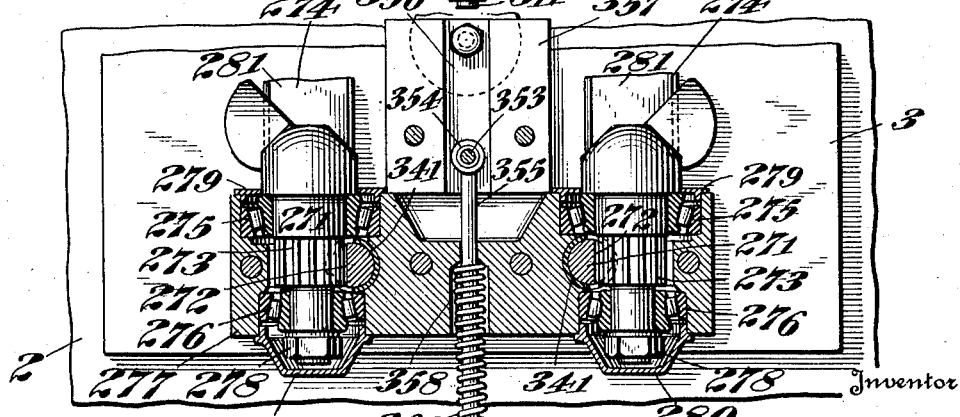

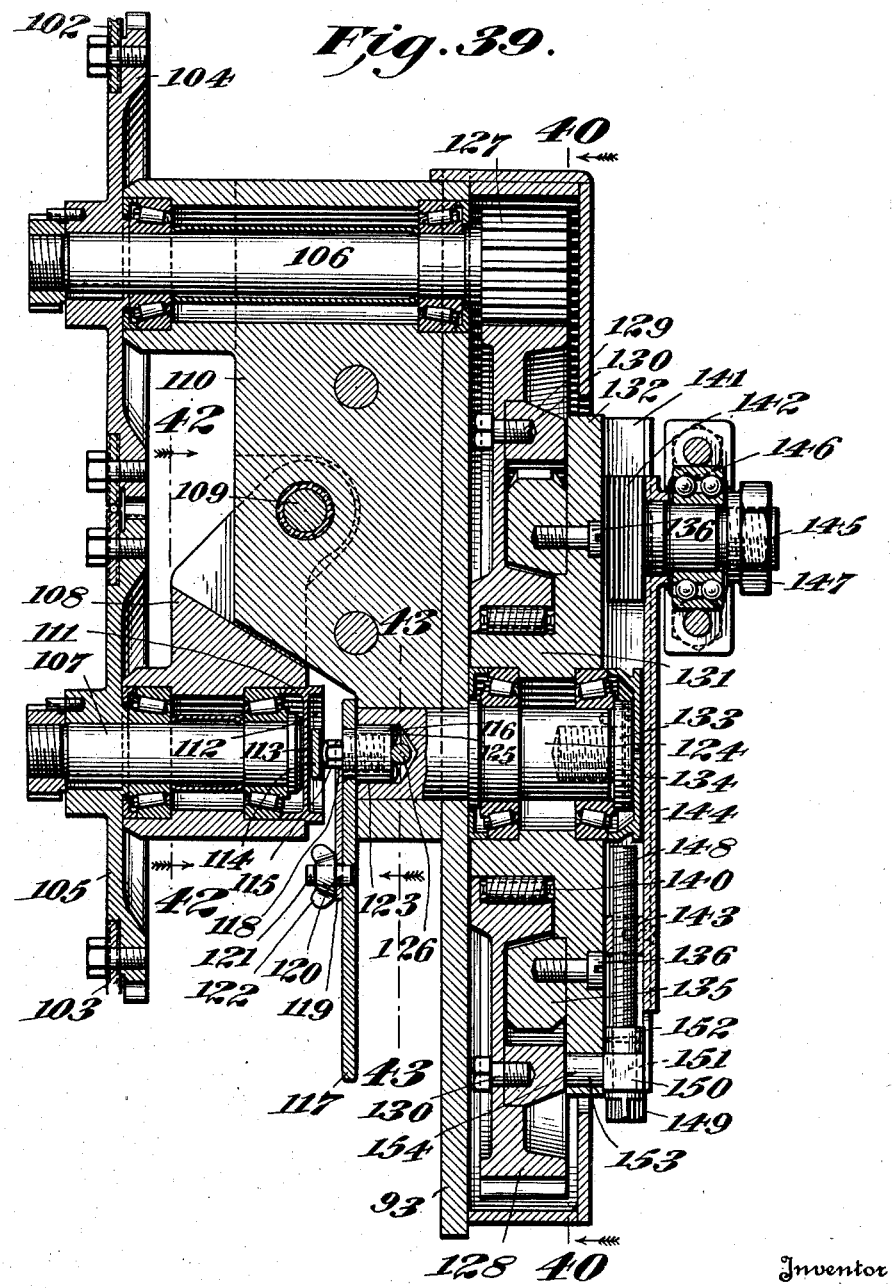

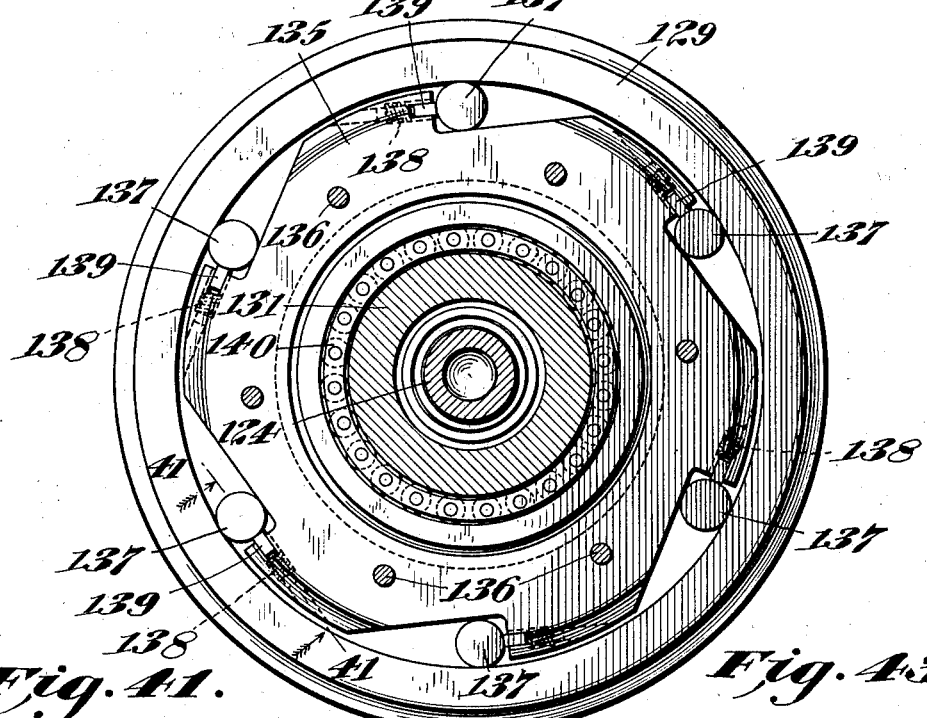
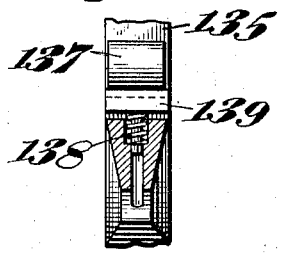
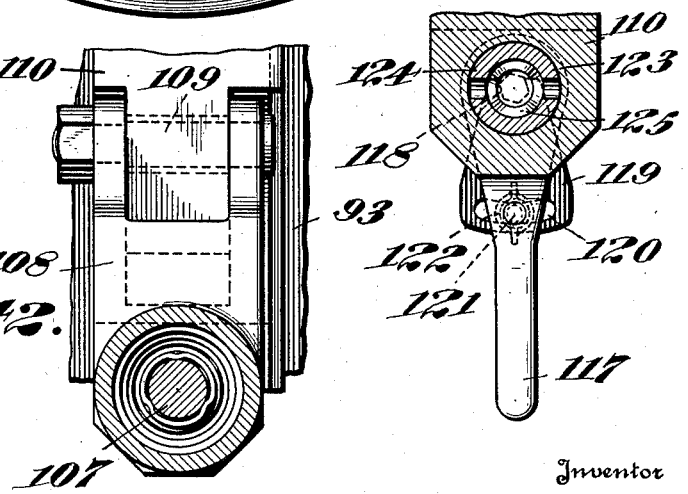

May 3, 1938.  H. R. GEER  2,116,169
WIRE BENDING MACHINE
Filed Nov. 23, 1936  29 Sheets-Sheet 17
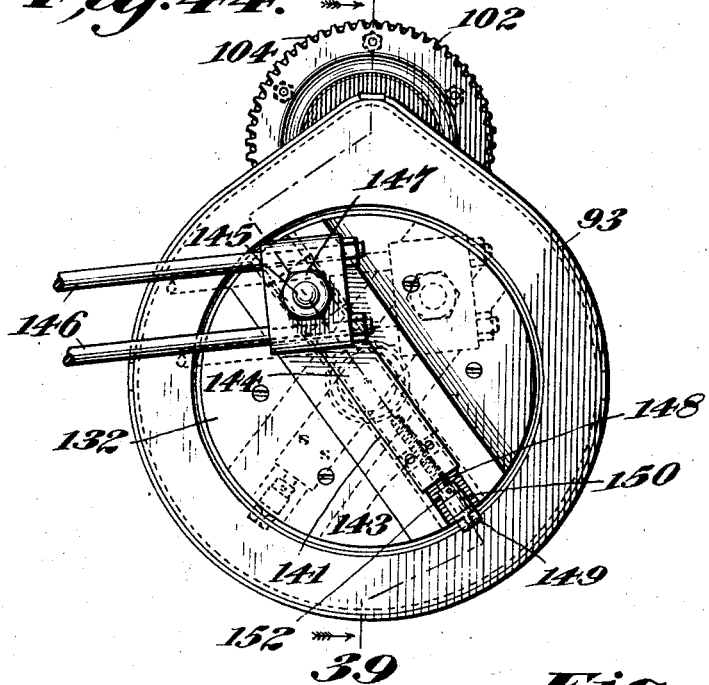
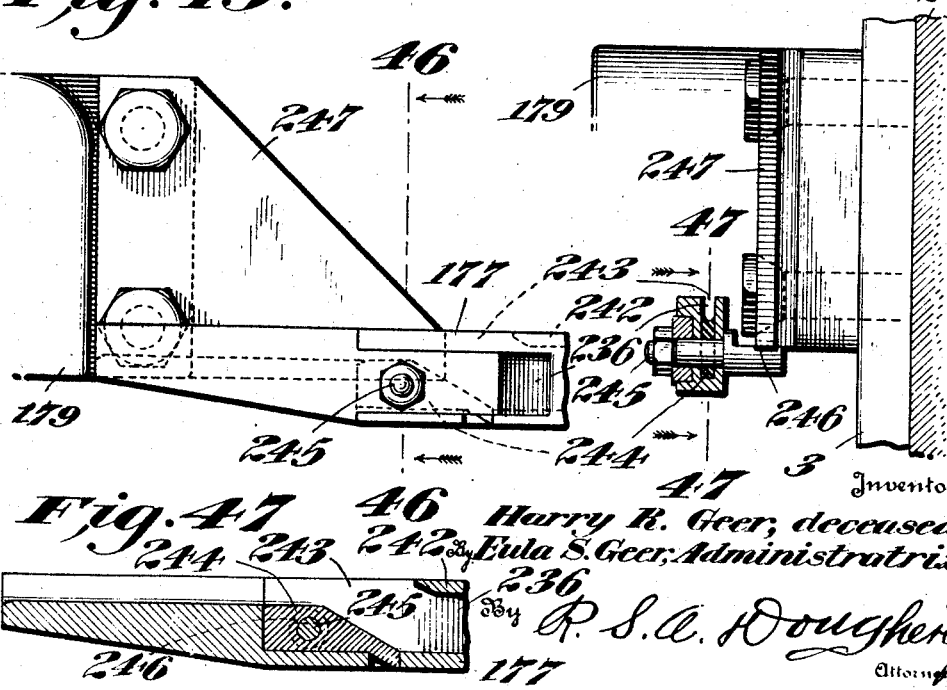
Inventor
Harry R. Geer, deceased.
Eula S. Geer, Administratrix.
By R. S. A. Dougherty
Attorney May 3, 1938.   H. R. GEER   2,116,169
WIRE BENDING MACHINE
Filed Nov. 23, 1936   29 Sheets-Sheet 18
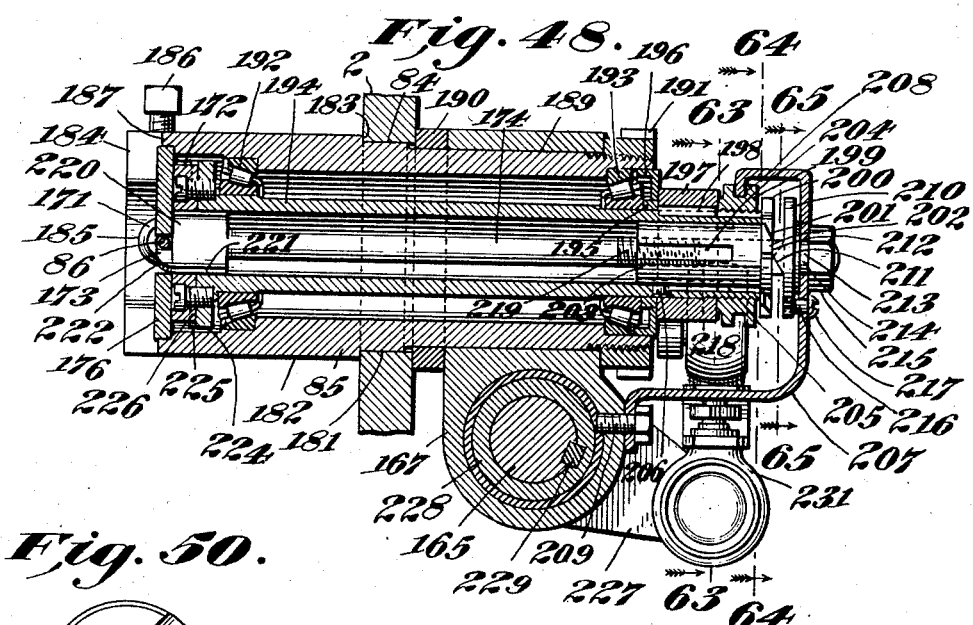
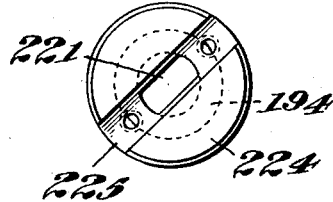
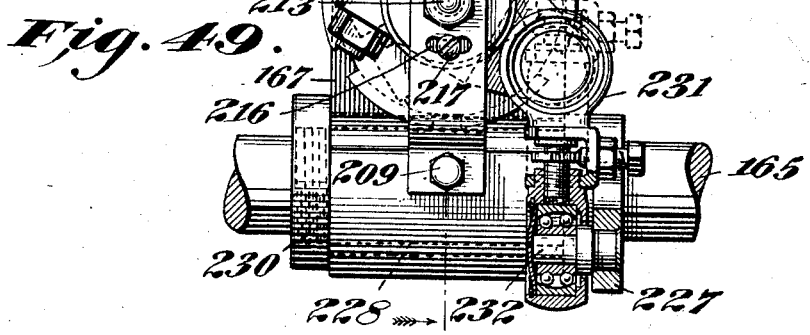

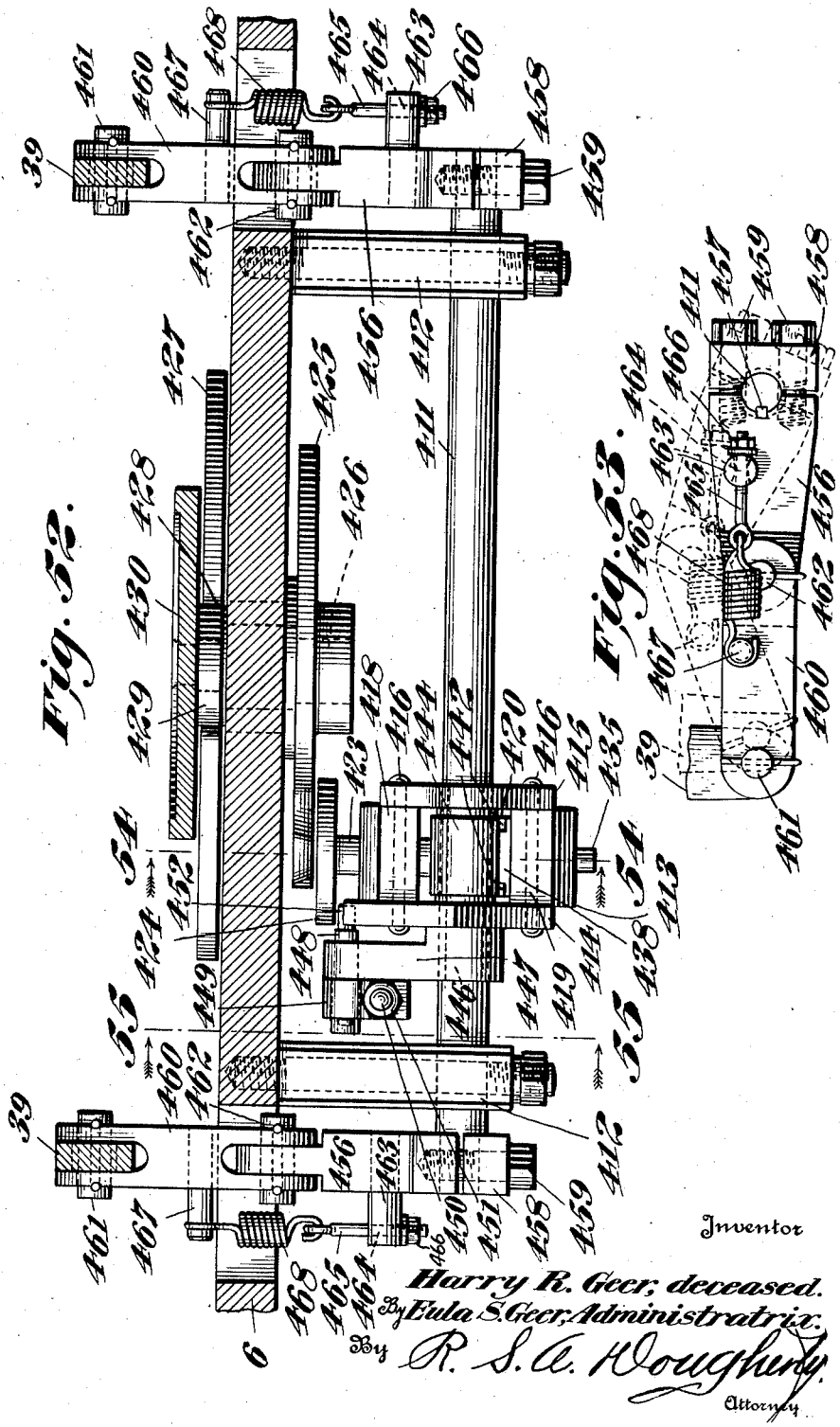

May 3, 1938.  H. R. GEER  2,116,169
WIRE BENDING MACHINE
Filed Nov. 23, 1936   29 Sheets-Sheet 20
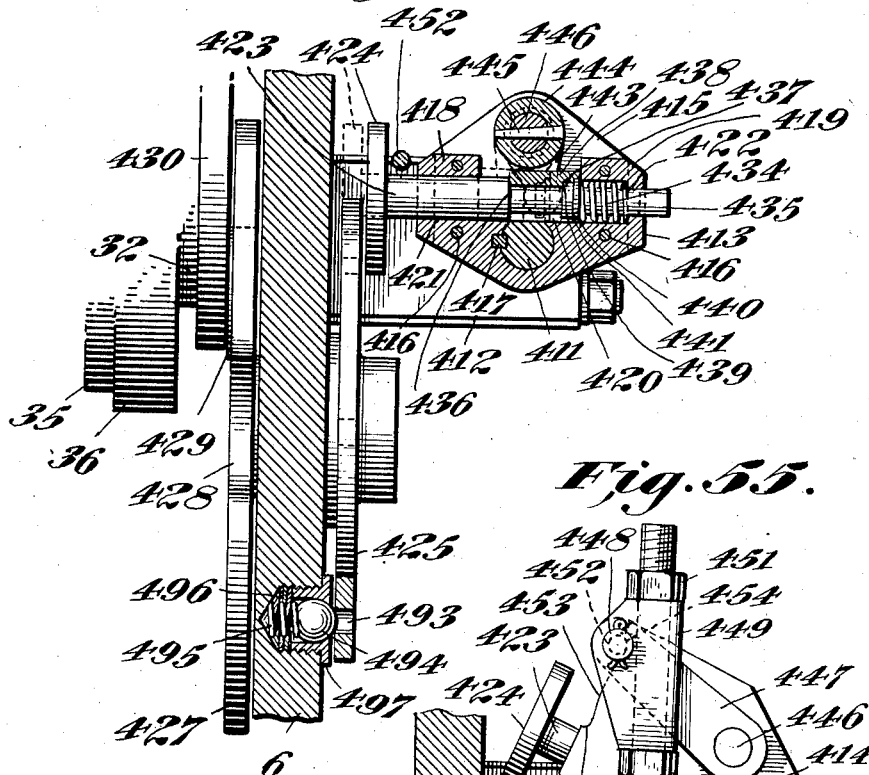
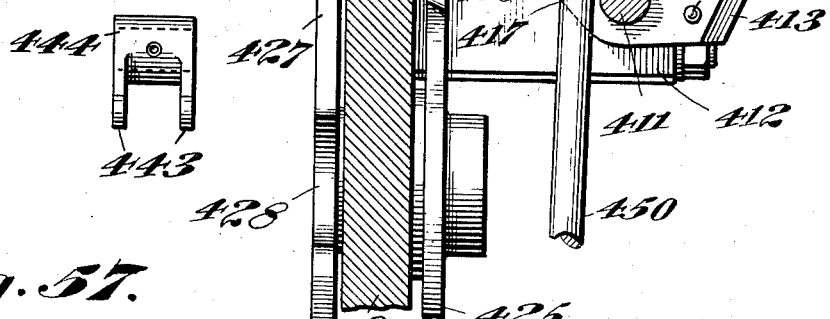
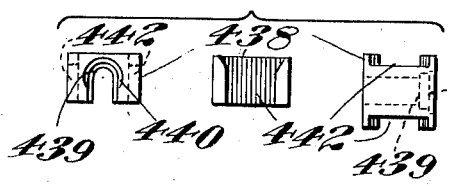

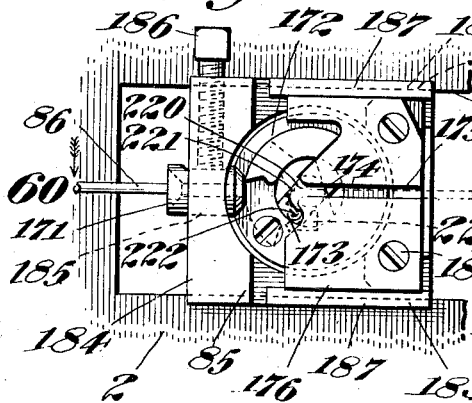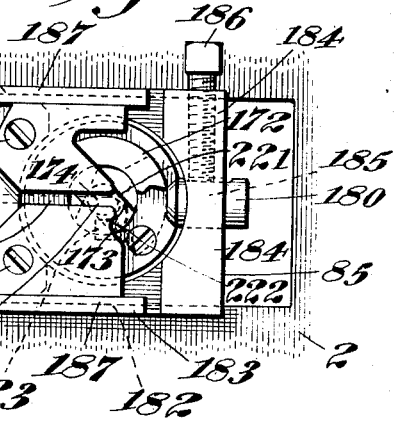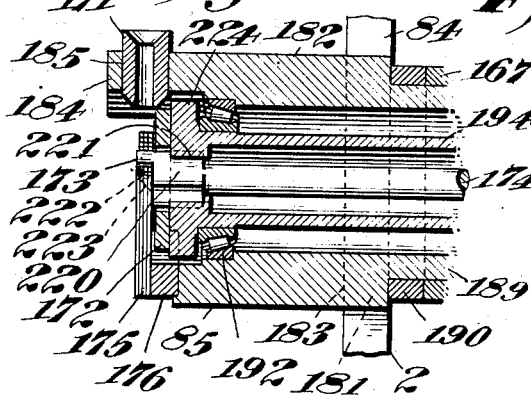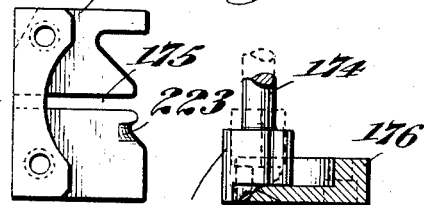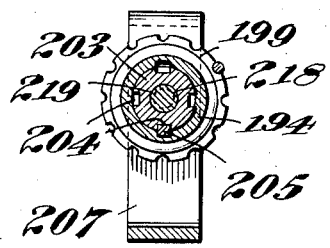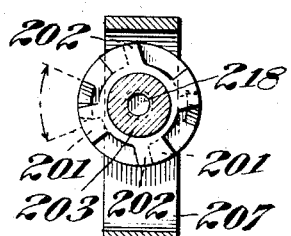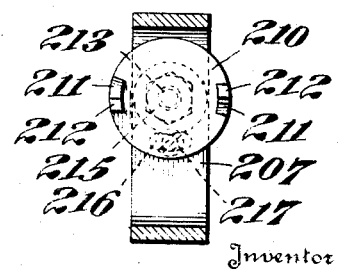

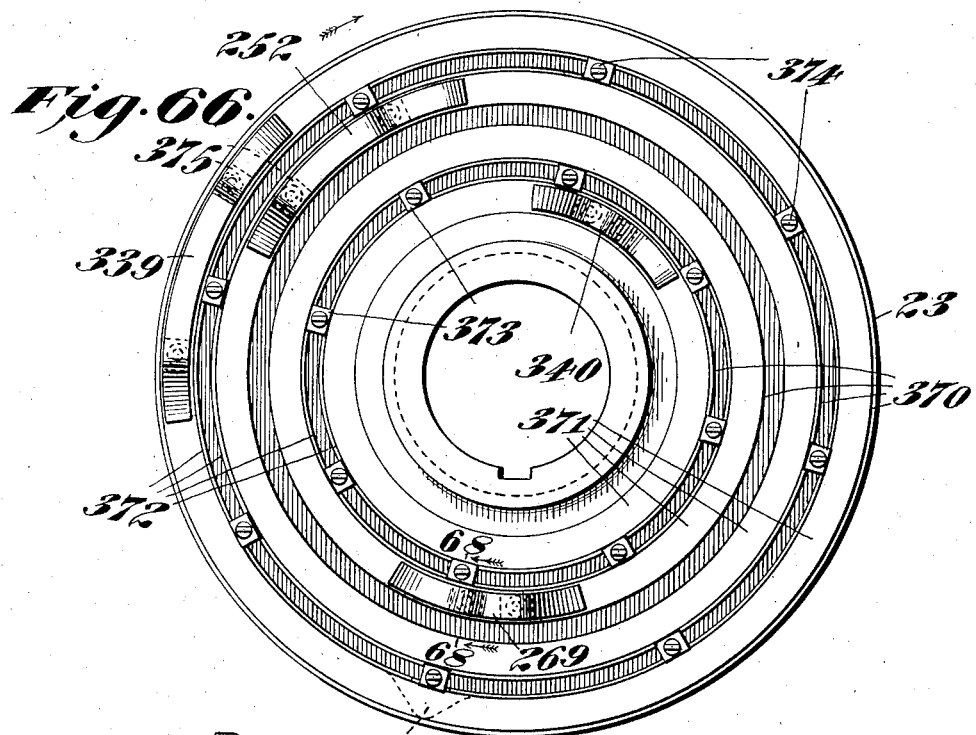
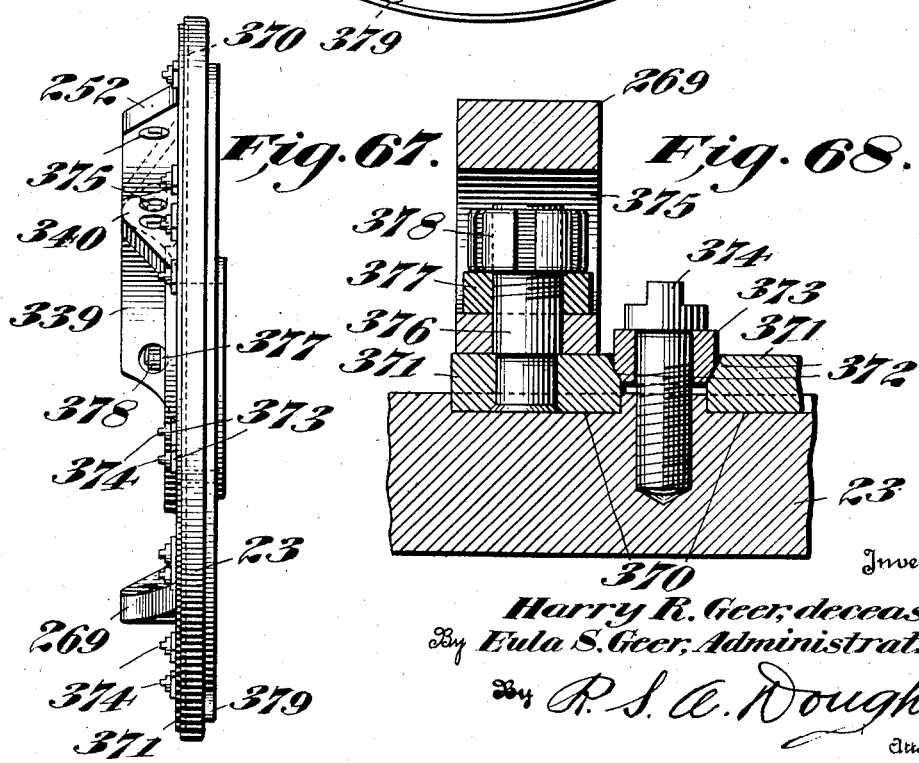

May 3, 1938. H. R. GEER 2,116,169
WIRE BENDING MACHINE
Filed Nov. 23, 1936 29 Sheets-Sheet 23
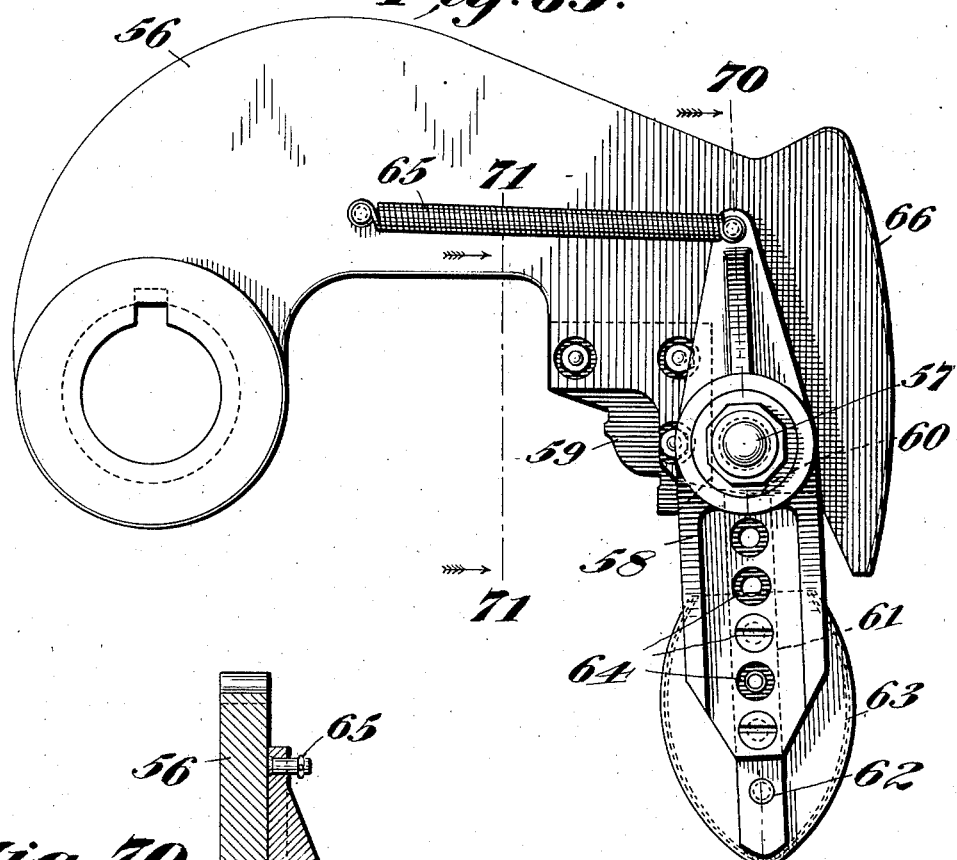
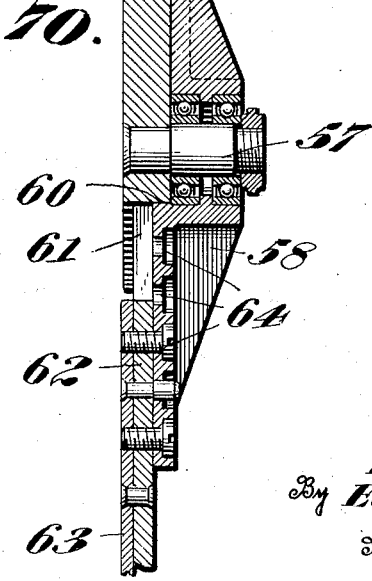
Inventor
Harry R. Geer, deceased.
By Eula S. Geer, Administratrix.
By R. S. A. Dougherty
Attorney May 3, 1938.  H. R. GEER  2,116,169
WIRE BENDING MACHINE
Filed Nov. 23, 1936  29 Sheets-Sheet 24

Inventor
Harry R. Geer, deceased.
By Eula S. Geer, Administratrix.

By R. S. A. Dougherty
Attorney

May 3, 1938.  H. R. GEER  2,116,169
WIRE BENDING MACHINE
Filed Nov. 23, 1936   29 Sheets-Sheet 25

Inventor
Harry R. Geer, deceased.
By Eula S. Geer, Administratrix.
By R. S. A. Dougherty,
Attorney May 3, 1938. H. R. GEER 2,116,169
WIRE BENDING MACHINE
Filed Nov. 23, 1936 29 Sheets-Sheet 26
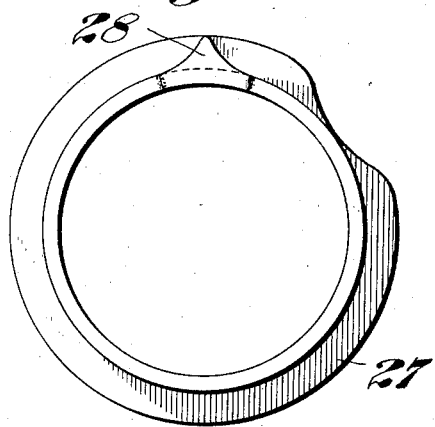
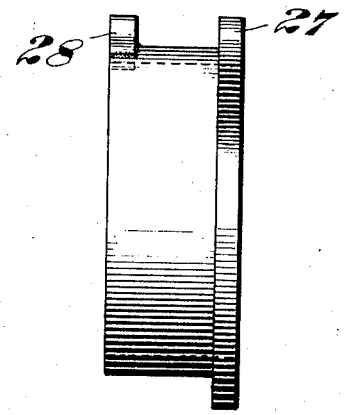
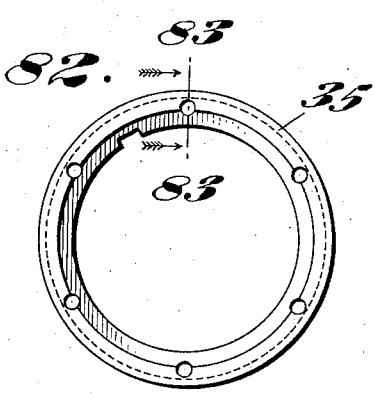
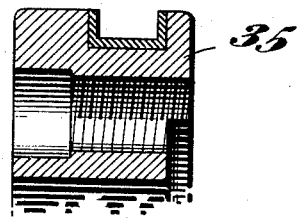
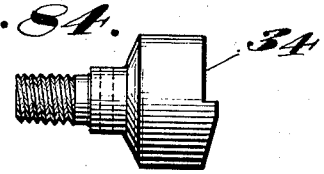
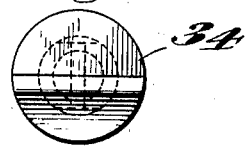
Inventor
Harry R. Geer, deceased.
By Eula S. Geer, Administratrix.
By R. S. A. Dougherty
Attorney

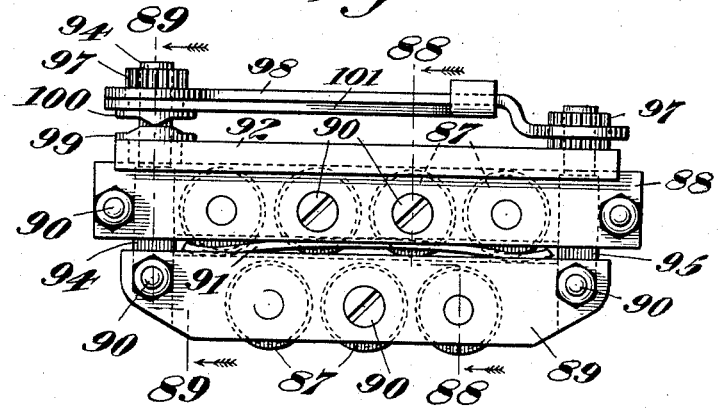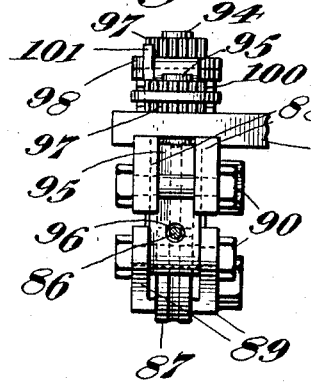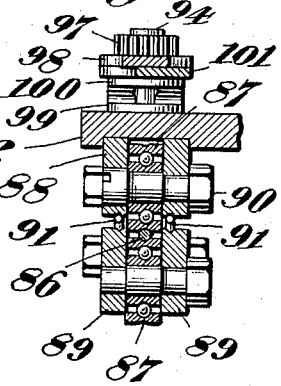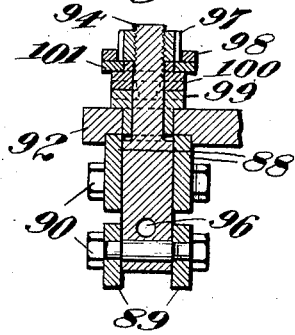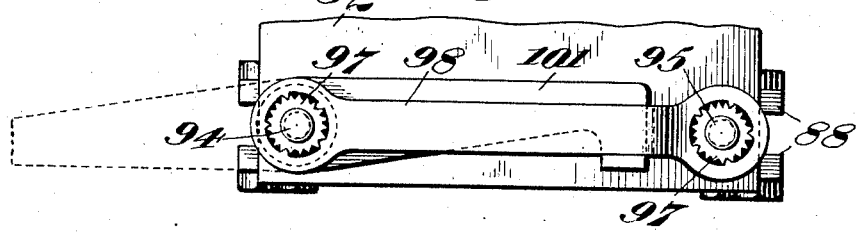

May 3, 1938.  H. R. GEER  2,116,169
WIRE BENDING MACHINE
Filed Nov. 23, 1936  29 Sheets-Sheet 28

Inventor
Harry R. Geer, deceased.
By Eula S. Geer, Administratrix.
By R. S. A. Dougherty
Attorney

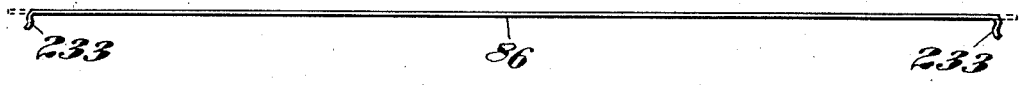
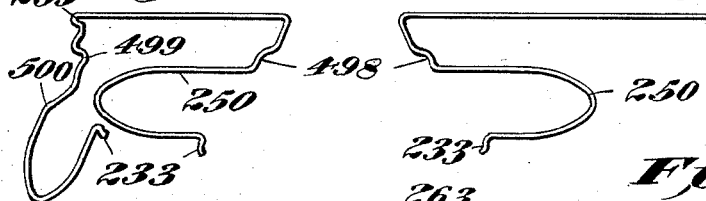
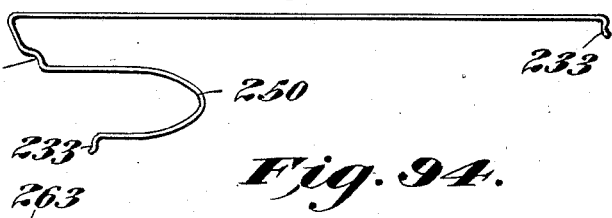
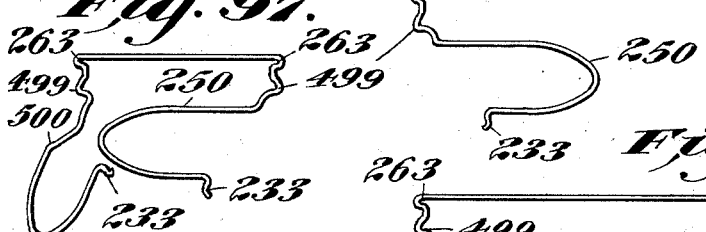
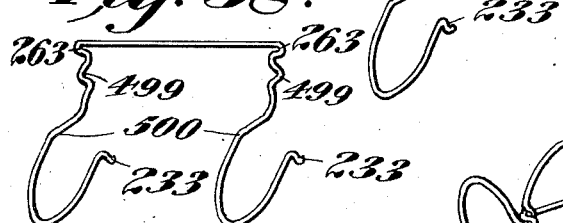
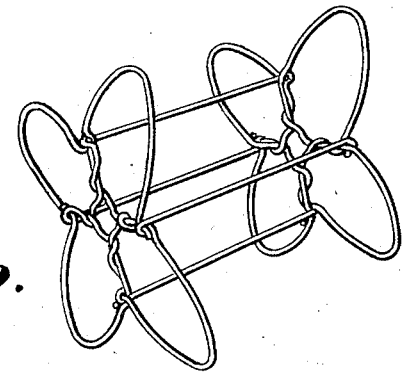

Patented May 3, 1938

2,116,169

UNITED STATES PATENT OFFICE 2,116,169

WIRE BENDING MACHINE

Harry R. Geer, deceased, late of Westmont, Pa., by Eula S. Geer, administratrix, Viewmont, Pa., assignor to Bethlehem Steel Company, a corporation of Pennsylvania Application November 23, 1936, Serial No. 112,403

112 Claims. (Cl. 140—71)

The invention relates to wire working machines and more particularly to a machine for making reel members for forming reels or spools of the collapsible type upon which barbed wire or wire is wound for shipment and commercial use.

One of the objects of the invention relates to the manner of controlling the feed of the wire to the machine.

Another object of the invention relates to the mechanism for operating the crank arms which are adapted to form the loops of the reel members.

Other objects of the invention relate to the mechanisms for operating the bending dies for forming recesses in the reel members and the bottom twisters for bending the looped ends of the reel member laterally.

Another object of the invention has reference to the manner of cutting the feed wire into lengths and then forming hooked ends simultaneously on opposite ends and then ejecting the hooked ends from the die plate.

Another object of the invention relates to the means for adjusting the die plates and loop formers so that reels or spool members of different sizes may be made.

Another object of the invention relates to the controlling means whereby the machine may be allowed to run continuously or intermittently as desired.

A further object of the invention relates to the trip mechanism which is adapted to stop the machine after four, or a predetermined number of reel members have been formed.

Another object of the invention relates to the kinking mechanism for bending the looped ends of the reel members into the desired angle to form the assembled reel.

Still another object of the invention relates to the mechanism whereby the formed reel members are automatically ejected from the machine.

Other objects will appear hereinafter.

Referring now to the accompanying twenty-nine sheets of drawings, which form a part of this specification, and on which like characters of reference indicate like parts:

Fig. 4 is a rear elevation of the main body of the machine with the back plate removed, part being shown in section.

Fig. 5 is a vertical transverse section taken on the line 5—5 of Fig. 2.

Fig. 6 is a vertical transverse section taken on the line 6—6 of Fig. 2.

Fig. 7 is a top plan view showing the connections for the feed and shearing mechanism with parts shown in section.

Fig. 8 is a detail view of the main driving connection.

Fig. 9 is a detail of one end portion of the machine showing the kinker mechanism.

Fig. 12 is an enlarged view taken on the same line as Fig. 10 but showing one half of said figure.

Fig. 13 is a longitudinal section taken on the line 13—13 of Fig. 14.

Fig. 14 is a vertical section through the top twister block taken on the line 14—14 of Fig. 13.

Fig. 15 is a top plan view of one of the bottom twisters.

Fig. 16 is a detail view of a twister former and a stationary side former.

Fig. 17 is a longitudinal section taken on the line 17—17 of Fig. 10.

Fig. 18 is a detail section taken on the line 18—18 of Fig. 17.

Fig. 19 is a detail showing a portion of the bracket for supporting a twister horn, kinker guide, and stationary side former.

Fig. 20 is a detail top plan view of the portion shown in Fig. 19.

Fig. 21 is a side elevation of the recess forming die.

Fig. 22 is an end elevation of the recess forming die.

Fig. 23 is a front elevation of the recess forming die.

Fig. 24 is a longitudinal section taken above one of the corner die slides on the line 24—24 of Fig. 25.

Fig. 25 is an end elevation of one of the corner die slides and the adjacent parts taken on the line 25—25 of Fig. 24.

Fig. 26 is a detail front elevation of one of the corner die slides and the adjacent parts.

Fig. 27 is a detail vertical section taken on the line 27—27 of Fig. 26.

Fig. 28 is a detail vertical section taken on the line 28—28 of Fig. 26.

Fig. 29 is an end elevation of one of the paralleling blades.

Fig. 30 is a front elevation of the paralleling blade shown in Fig. 29.

Fig. 31 is a detail view of the wire gripping dog.

Fig. 32 is a front elevation of one of the corner dies.

Fig. 33 is a rear elevation of one of the twister horns.

Fig. 34 is a longitudinal section in line with the top plungers taken on the line 34—34 of Fig. 1.

Fig. 35 is a detail section of the inner portion of one of the plunger ends.

Fig. 36 is a detail longitudinal section through one of the pairs of plunger actuating levers taken on the line 36—36 of Fig. 34.

Fig. 37 is a detail longitudinal section on a line with the lower plungers taken on the line 37—37 of Fig. 1.

Fig. 38 is a detail vertical section taken on the line 38—38 of Fig. 37.

Fig. 39 is a vertical section of the clutch mechanism taken on the line 39—39 of Fig. 44.

Fig. 40 is a side elevation of the clutch mechanism shown in Fig. 39 taken on the line 40—40 of Fig. 39.

Fig. 41 is a detail section taken on the line 41—41 of Fig. 40.

Fig. 42 is a detail through the lower feed roller bearing taken on the line 42—42 of Fig. 39.

Fig. 43 is a detail section taken on the line 43—43 of Fig. 39.

Fig. 44 is a rear elevation of the feed mechanism.

Fig. 45 is a detail view of the stop bracket and end of one of the swinging guiding arms.

Fig. 46 is a detail section of the parts shown in Fig. 45 taken on the line 46—46 of Fig. 45.

Fig. 47 is a detail section view of one end of one of swinging guiding arms taken on the line 47—47 of Fig. 46.

Fig. 48 is a vertical longitudinal section of the shearing and actuating mechanism therefor taken on the line 48—48 of Fig. 49.

Fig. 49 is a rear end elevation of the shear actuating mechanism.

Fig. 50 is a front end elevation of the sleeve to which the shear plate is attached.

Fig. 51 is a detail view of the adjusting screw for the pitman connection between the crank arms on the shear operating shaft and the one keyed to sleeve for the shear plate.

Fig. 52 is a top plan view of the trip mechanism with parts shown in section.

Fig. 53 is a side elevation of one of the toggle connections between the trip shaft and the clutch arm.

Fig. 54 is a transverse section through the trip mechanism taken on the line 54—54 of Fig. 52.

Fig. 55 is a transverse section through the trip mechanism taken on the line 55—55 of Fig. 52.

Fig. 56 is a detail view of the trip yoke.

Fig. 57 shows in detail a front end, side elevation and top plan views of the trip shoe.

Fig. 58 is a front elevation drawn on a larger scale of the shear housing with the shear and die plates mounted thereon for the incoming end of the wire.

Fig. 59 is a similar view to that of Fig. 58 for receiving the end of the wire at the opposite side of the machine showing the shear housing and the bending shear and die plate.

Fig. 60 is a longitudinal section taken on the line 60—60 of Fig. 58.

Fig. 61 is a rear elevation of one of the die plates.

Fig. 62 is a detail illustrating the manner of retracting the plunger by engaging the curved surface on the back of the die plate.

Fig. 63 is a transverse section through the rear of the shear sleeve and bracket taken on the line 63—63 of Fig. 48.

Fig. 64 is a detail transverse section through the ratchet nut taken on the line 64—64 of Fig. 48.

Fig. 65 is a detail sectional view of the ratchet plate and supporting bracket therefor taken on the line 65—65 of Fig. 48.

Fig. 66 is a front elevation of the cam disk.

Fig. 67 is a side elevation of the cam disk shown in Fig. 66.

Fig. 68 is a detail section through the cam disk and one of the cams and the attaching means therefor taken on the line 68—68 of Fig. 66 but drawn on a larger scale.

Fig. 69 is a front elevation of one of crank arms, with the former plate, loop former support and loop former attached thereto.

Fig. 70 is a vertical section taken on the line 70—70 of Fig. 69.

Fig. 71 is a detail section taken on the line 71—71 of Fig. 69.

Fig. 80 is a rear end elevation of the shear operating cams.

Fig. 81 is a side elevation of the shear operating cams.

Fig. 82 is a rear elevation of the clutch ring.

Fig. 83 is a transverse section of the clutch ring drawn on a larger scale taken on the line 83—83 of Fig. 82.

Fig. 84 is a detail view of one of the jaw studs which is adapted to be attached to the clutch ring.

Fig. 85 is a front elevation of the jaw stud.

Fig. 86 is a side elevation of the wire straightening and feeding mechanism for the machine.

Fig. 87 is an end elevation of the straightening and feeding mechanism.

Fig. 88 is a section taken on the line 88—88 of Fig. 86.

Fig. 89 is a section taken on the line 89—89 of Fig. 86.

Fig. 90 is a top plan view of the straightening and feeding mechanism.

Figs. 92 to 98, inclusive, illustrate the different steps in forming the reel member and Fig. 99 is a perspective view illustrating the finished reel.

Figure 76:
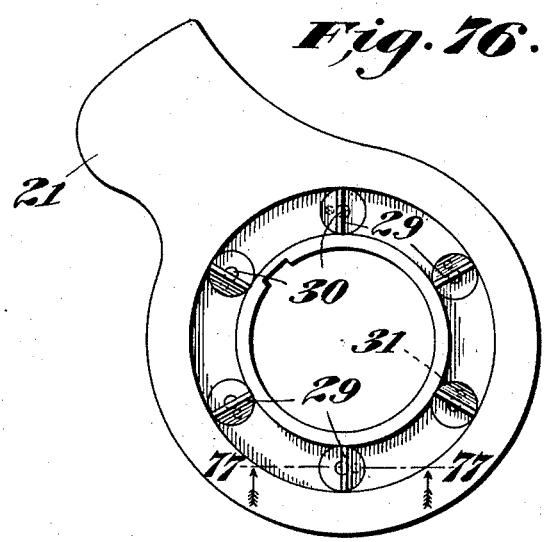
Fig. 76 is a rear elevation of the back loop forming cam.
Figure 77:
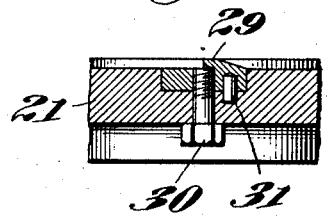
Fig. 77 is a detail section of a portion of the back loop forming cam drawn on a larger scale taken on the line 77—77 of Fig. 76.
Figure 78:
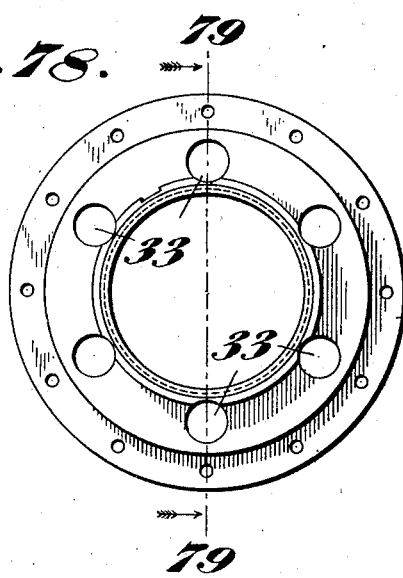
Fig. 78 is a rear elevation of the clutch spider.
Figure 79:
Fig. 79 is a vertical section of the clutch spider taken on the line 79—79 of Fig. 78.

Referring now to the various characters of reference on the drawings. The frame of the machine may be made in a single casting, but it is preferable to make it of plate metal as shown and comprises a base plate 1, front plate 2, provided with a reinforcing plate 3, vertical standards 4 and an annular housing 5, all made of rolled plate material which are formed into the desired shapes and then welded together. The annular housing 5 has a back plate 6 held in position by means of a retaining ring 7 engaging a groove 8 formed in the housing. To prevent the back plate from turning, a projection is formed on the back plate and extends into a notch formed in the top edge of the housing. A main shaft 9 is mounted in the annular housing slightly below the center having its ends supported in the back plate 6 and the front and reinforcing plates 2 and 3 and keyed thereto as at 10. Roller bearings 11—11 are mounted at intermediate points on the main shaft and are spaced apart by means of a bearing distance piece 12 and nuts 13 and 14. The nut 14 is locked in position by means of a pin 15 which engages the washer 16 for the main shaft securing nut 17. The roller bearings 11—11 support a cam sleeve 18 to which is keyed as at 19 the front and back loop forming cams 20 and 21. The feed operating cam 22 and cam disk 23 are also keyed to the cam sleeve 18 as at 24, these four cams being held in position between a shoulder 25 on the cam sleeve 18 which engages one side of the back loop forming cam and a nut 26 engaging the cam plate 23. Keyed to the front end of the cam sleeve 18 is a collar carrying a pair of shear operating cams 27 and 28 for cutting and bending the hooked ends on the length of wire. The rear side of the back loop forming cam 21 is grooved and provided with a plurality of clutch jaws 29 each attached to the side of the cam by means of a bolt 30 and a dowel pin 31, as illustrated in Figs. 76 and 77. As indicated more clearly in Figs. 78 and 79 a clutch spider 32 having a cylindrical portion is mounted on the rear end of the cam sleeve 18 and is provided with a flange having openings 33 therein for receiving jaw studs 34 which are secured to a clutch ring 35 mounted on the cylindrical portion of the spider. A trunnion ring 36 surrounds the clutch ring which is spliced as at 37 to allow for expansion and contraction or the like. The trunnion ring is provided with trunnions 38 on opposite sides which extend into the intermediate portions of the clutch yoke arms 39, said clutch yoke arms being connected together at their upper ends by means of a shaft 40 and clutch yoke bracket 41, the opposite ends of which are secured to the back plate 6 by means of pin connections 42. The lower ends of the clutch yoke arms 39 are connected to the trip operating mechanism which will be described hereinafter. The outer portion of the flange of the clutch spider 32 is reduced in thickness and has a gear 43 attached thereto by means of bolts 44. This gear is driven by means of a pinion 45 mounted or formed on a drive shaft 46 which is journaled in roller bearings 47 in a bearing sleeve 48 attached in any suitable manner to the back plate 6. To the extending end of the drive shaft 46 is mounted a pulley 49 which is connected by means of a belt 50 to a motor 51. The front and back cam shafts 52 and 53 for actuating the loop former are each provided with a roller 54 and 55, respectively, for engaging the front and back loop forming cams 20 and 21, said cam shafts being journaled in roller bearings in the front and back plates of the frame of the machine. The front ends of the cam shafts 52 and 53 each have a crank arm 56 of similar construction but rights and lefts keyed thereto, to each of which is pivoted as at 57 a loop former support 58 and former plate 59. The loop former support has a shoulder 60 for engaging the lower surface of the crank arm and is also provided on its lower inner surface with a vertical groove 61 for receiving a rib 62 of the loop former 63, as clearly shown in Figs. 69 and 70. To allow the loop former to be adjusted for making different sized reels the loop former support 58 is perforated as at 64 to allow the loop former to be adjusted so that the size of the loop formed may be varied. In order to provide a certain amount of resiliency for the loop former during the loop forming operation a helical spring 65 has one end connected to the upper end of the loop former support and the other end attached to the crank arm. The forward end of the crank arm is also provided with an arc shaped contact surface 66 for engaging the swinging guiding arm.

The front and back loop forming cams 20 and 21 are adapted to actuate the mechanism to lower the crank arms 56 in forming the loops of the reel member. After the loop and recess forming operations have been accomplished, the crank arms have to be raised to the normal position they assumed before the loop forming operation. This is accomplished in the following manner: Eccentric cam sheaves 67 and 68 of similar form but rights and lefts are attached to the rear ends of the front and back cam shafts 52 and 53, to which is attached by means of U-bolts 69 and clamp plate 70 the ends of a cable 71. The central portion of the cable extends downwardly in loop form and passes around a sheave weight 72 provided with supporting levers 73 on either side thereof which are connected centrally to the sheave weight 72 by means of a bolt 74. One end of the pair of supporting levers 73 is pivoted to one of the standards 4 as at 75 while the other ends of said supporting levers are connected by means of a distance piece 76 which is perforated centrally as at 77 for the passage of an adjusting rod 78. This adjusting rod is supported by means of a bracket 79 attached to the opposite standard 4 and has an adjusting nut 80 threaded therein through which the adjusting rod 78 extends and has a spring 81 interposed between the said adjusting nut 80 and a nut 82 on the lower end of the rod. The upper end of the adjusting rod 78 has nuts 83 threaded thereon adapted to form a stop to limit the upward movement of the sheave levers 73. By adjusting the nut 80 the position of the nut 83 will be raised or lowered thereby varying the movement of the swinging ends of the sheave levers. By this mechanism after either of the crank arms 56 has been swung down by cam action to form a loop the sheave weight 72 will return the crank arms to their normal position.

The front plate 2, extends longitudinally beyond each side of the annular housing 5 and is slotted at each side as at 84 to form slideways for receiving adjustable shear housings 85. Wire straightening and feeding mechanisms shown in Figs. 86 to 90 are supported on the left hand end portion of the longitudinally extending front plate as viewed from the front of the machine. The wire stock 86 is received from any suitable source of supply as from a reel and advanced between the grooved straightening rolls 87 which have their axles journaled in pairs of top and bottom roller plates 88 and 89, each of said pairs of plates being connected together by means of bolts 90 and spaced apart by means of springs 91. The top pair of roller plates 88 extend into a groove in a bracket 92 which is secured to the feed clutch housing 93. The pairs of top and bottom plates 88 and 89 are also connected together by means of suspension bolts 94 and 95 perforated as at 96 for the passage of the wire and are each provided with a serrated nut 97 on its upper end for adjustment by means of a wrench 98. To allow for a quick release of the straightening rolls, the suspension bolt 94 is provided with a cam disk 99 and a rider 100 which is attached to a lever 101.

After the wire stock 86 has passed through the straightening rolls it is advanced to the grooved feed rolls 102 and 103, geared together by means of gears 104 and 105 which are keyed to shafts 106 and 107. In order to control the pressure of the feed rolls 102 and 103 on the wire the shaft 107 is journaled in bearings seated in a bearing casting 108 which is pivoted at 109 to a bracket 110 extending from the clutch housing casing, as shown in Fig. 39. An oil cap 111 is secured to the inner side of the bearing casting 108 having a flanged edge 112 notched as at 113 to receive a bar 114 which is adapted to engage the hexagonal head of an adjusting screw 115 which is threaded into the boss 116 of a feed release lever 117. The hexagonal head of the adjusting screw 115 is also adapted to engage a notch 118 in an adjustable lock plate 119 having an arc shaped slot 120 formed therein through which a threaded stud 121 projecting from the feed release lever extends and is provided with a wing nut 122 for holding the lock plate clamped against the feed release lever 117 in its adjusted position. The boss 116 extends into a socket 123 in the outer end of the clutch center axle 124 and forms a pivotal point for the feed release lever, and a cam surface 125 is provided on the inner end of the boss for engaging a pin 126 which extends transversely through the clutch center axle. By setting the adjusting screw 115 and manipulating the feed release lever 117 the feed rolls 102 and 103 may be adjusted to stop the feeding operation or to give greater or less pressure on the wire as desired.

The shaft 106 having the gear 104 for the upper feed roll 102 which is keyed thereto is journaled in bearings in the projecting bracket 110 of the clutch housing 93 and is provided with a pinion 127 on its inner end meshing with a feed clutch gear 128 having a clutch ring 129 attached thereto by means of bolts 130. The clutch center axle 124 has its outer end fixed in the lower portion of the projecting bracket 110 of the clutch housing 93 and extends inwardly therefrom for receiving bearings upon which is mounted the hub 131 of a feed adjusting plate 132 adapted to be held in position by means of an adjusting screw 133 threaded into the inner end of the clutch center axle 124 and over which an oil cap 134 extends.

A ratchet wheel 135 is attached to the side of the feed adjusting plate within the clutch housing 93 by means of bolts 136 and is provided with friction rolls 137 each normally held in contact with the clutch ring 129 by means of a spring 138 and plunger 139. The clutch gear 128 is rotatably mounted on a roller bearing 140 on the hub 131 of the feed adjusting plate 132 adjacent to the ratchet wheel 135.

The feed adjusting plate 132 has a projecting portion extending beyond the rear of the clutch housing and is provided with a dovetailed slideway 141 adapted to receive a feed adjusting slide 142 and sliding nut 143 which are connected together by means of a link 144. The feed adjusting slide 142 is provided with a stub shaft 145 upon which is pivoted the outer end of a connecting rod 146 adapted to be held in position by means of a nut 147. In order to adjust the feed adjusting slide 142 to give greater or less longitudinal movement to the connecting rod 146 a feed adjusting screw 148 is threaded into the sliding nut 143 having a head 149 with a block 150 perforated as at 151 and mounted thereon and held in position by means of a collar 152, said block 150 being provided with a stud projection 153 extending into a hole 154 in the feed adjusting plate 132.

The wire stock 86 is fed to the machine intermittently in the following manner:

The feed operating cam 22 which is keyed to the cam sleeve 18 is adapted to engage the feed operating rollers 155 and 156 shown in Fig. 5 each journaled in a bracket arm 157 which is secured by means of a clamp 158 and bolts 159 to a longitudinally reciprocating yoke 160 which is supported between rollers 161 in the yoke guide bearings 162 attached to the annular housing 5. A stud-bolt 163 is attached to one end of the yoke 160 and extends outwardly therefrom to which is pivoted the inner end of the connecting rod 146 adapted to be held in position thereon by means of a nut 164.

Figure 91:
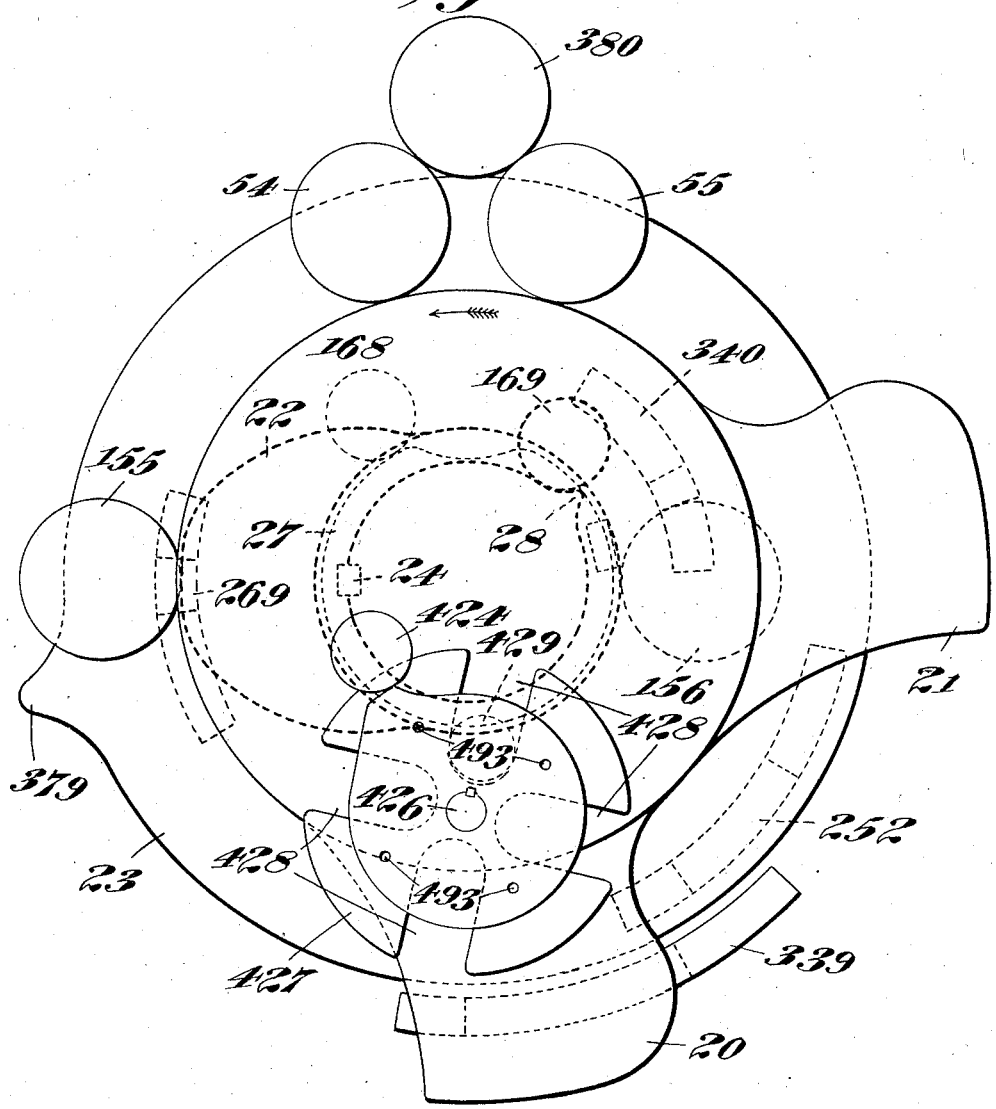
Fig. 91 is a diagrammatic view showing the relative positions of the operating cams looking from the rear of the machine.

The diagram illustrated in Fig. 91 indicates the relative positions of the operating cams, as viewed from the back of the machine at the end of the wire feeding operation and just before shearing off the length of wire to form a reel member. In this figure the feed operating cam 22 has engaged the feed operating roller 155 and slid the longitudinally reciprocating yoke 160 with the connecting rod 146 pivoted thereto and rotated the slide adjusting plate 132 from right to left into the position indicated more clearly in Figs. 4, 5 and 44. During this stroke the clutch will be in frictional engagement and rotate the feed clutch gear 128 and the feed rollers 102 and 103 through the ratchet wheel 135 and feed adjusting plate 132 attached thereto, which will be rotated from the dotted to the full line position as indicated in Fig. 44. At the end of this stroke a length of wire will have been fed into the machine. As it is necessary to produce several lengths of wire in forming reel members of different sizes the feed adjusting screw 148 may be rotated to adjust the feed adjusting slide 142 in relation to the clutch center axle 124. In this manner the amount of rotation of the feed rollers may be adjusted. After the length of wire has been fed into the machine the feed rollers 102 and 103 and the mechanism for operating the same remain stationary until the feed operating cam 22 again engages the feed operating roller 155. During this interval the feed operating cam 22 continues to rotate until it engages the roller 156 thereby reciprocating the yoke 160 with the connecting rod 146 attached thereto and rotate the feed adjusting plate 132 from left to right. In this movement the clutch will be released and the feed adjusting plate 132 will be rotated from the position shown in full lines to the dotted line position as indicated in Fig. 44 and adapted to feed an additional length of wire to the machine when the cam 22 again engages the feed operating roller 155. Immediately after a length of wire has been fed into the machine the rear end of the length of wire is sheared off. This mechanism is actuated by means of the cams 27 and 28 which are formed on the opposite end of a collar keyed to the forward end of the cam sleeve 18. Extending longitudinally of the machine above the collar provided with the cams 27 and 28 is a rock shaft 165 journaled in bearings 166 which are attached to the back of the front plate 2. The end portions of the rock shaft 165 extend beyond opposite sides of the annular housing 5 and are journaled in bracket arms 167 mounted on the shear housings 85, as indicated more clearly in Figs. 7, 48 and 49. Between the bearings 166 the sides of the rock shaft 165 are flattened and the lower portion arcuately formed to clear the collar for the cams 27 and 28. Rollers 168 and 169 are attached to opposite sides of the flattened portion of the rock shaft by means of bolts 170. The roller 168 is adapted to engage the cam 27 and hold the shear plate in the raised position, while the roller 169 engaging the cam 28 is adapted to shear the wire at the end of the wire feeding operation and form an offset hook portion at each end thereof. As the stock wire 86 is fed into the machine by means of the feed rolls 102 and 103 it first passes through the tubular plug 171, as shown in Figs. 58 to 60, then between the shear plate 172 and the ejecting end 173 of the plunger 174 and through the guideway 175 of the die plate 176 on the shear housing 85 at the left hand side of the machine. The wire is then advanced through a swinging guiding arm 177 located adjacent to said die plate then through the grooved passageway 178 formed in the under surface of the top twister block 179 secured to the reinforcing plate 3, and thence conducted through another similarly formed mechanism including the swinging guide arm 177, guide way 175, die plate 176, then passes between the shear plate 172, and ejecting end 173 of the plunger 174 until the forward end of the wire engages the solid plug 180 mounted on the housing 85 on the right hand side of the machine. The shear housings 85 on opposite sides of the machine with the parts mounted thereon, and the mechanism for operating the shear plates 172 and plungers 174 are of substantially the same construction but rights and lefts and a description of one will apply to both and where the parts are similar the same reference numerals are used.

The intermediate portion of the shear housing 85 is formed rectangular as at 181 for engaging the slot 84 forming a slideway in the longitudinally extending front plate 2 for supporting the shear housing 85 centrally with its ends extending from opposite sides of the front plate.

The front extending portion 182 of the shear housing 85 is also formed rectangular but slightly larger vertically than the surface 181 engaging the slot 84, to form a shoulder 183 to engage the outer side of the front plate 2, and is also formed at its forward end with a vertical flange 184 having a cylindrical opening 185 formed centrally therein for receiving the plug 171 which is held in position by means of a set bolt 186, and a pair of horizontal flanges 187 at the top and bottom edges between which the die plate 176 having the guide way 175 is mounted and held in position by means of screws 188.

The rearwardly extending portion of the shear housing 85 is formed cylindrical as at 189 having mounted thereon a filler ring 190 adapted to engage the inner surface of the front plate 2, a bracket arm 167, and a retaining nut 191 threaded on the inner end of the cylindrical portion 189 for holding the shear housing 85 clamped in the desired adjusted position against the shoulder 183.

As shown in Fig. 48, roller bearings 192 and 193 are mounted within the opposite ends of the shear housing 85 for supporting a sleeve 194 having mounted on its rear end filler and retaining rings 195 and 196, respectively, which are engaged by means of a crank arm 197 keyed to the sleeve 194 as at 198, and a nut 199 is threaded on the inner end of the said sleeve for holding the parts in position. A ratchet wheel 200 provided with four teeth each having inclined and flat engaging surfaces 201 and 202 is attached to the rear end of the sleeve 194. The ratchet wheel 200 is provided with a cylindrical portion 203 extending within the sleeve which is provided on its surface with a plurality of keyways 204 to allow for adjustment, one of said keyways being adapted to receive a key 205 having one end secured to the sleeve as at 206. A bracket 207 having a flanged upper end is seated in a groove 208 formed in the periphery of the nut 199 and is provided with an offset lower portion attached to the bracket arm 167 by means of a bolt 209 and is adapted to support a ratchet plate 210 provided with a pair of teeth having inclined and flat engaging surfaces 211 and 212 adjacent to the teeth of the ratchet wheel 200 for engaging the same. The ratchet plate 210 is secured to the bracket by means of a threaded stud projection 213 which is adapted to extend through a perforation 214 in the bracket 207 and a nut 215 is screwed on the threaded end of the stud for clamping the ratchet plate 210 to said bracket. The bracket 207 also has an arc shaped slot formed therein as at 216 through which a set screw 217 extends and is threaded into the ratchet plate 210 to allow for adjustment.

The cylindrical portion 203 of the ratchet wheel 200 has a central perforation 218 which is threaded to receive the inner threaded end 219 of the plunger 174, while the outer end of said plunger is formed with an elongated head portion as at 220 adapted to be seated in a similar shaped slide way 221 formed in the forward end of the sleeve. The extension 173 on the forward elongated end portion of the head of the plunger has one edge provided with a curved or inclined cam surface 222 adapted to engage the cam surface 223 on the inner surface of the die plate 176, when the plunger 174 is rotated into engagement with the same to force it backward, while the teeth of the ratchet wheel 200 engaging the teeth of the ratchet plate 210 and project the plunger 174 forward to advance the end of the wire beyond the side face of the die plate 176 after the hook has been formed. The forward end of the sleeve 194 is provided with a flange 224 having its outer face grooved as at 225 for receiving a rib 226 formed on the rear surface of the shear plate 172 which is attached thereto by means of screws as shown in Fig. 48.

A crank arm 227 having a tubular hub 228 extending from one side thereof is keyed to the rock shaft 165 as at 229 and journaled in the bracket arm 167 and is provided with a nut 230 on the end of the hub for holding the parts against longitudinal movement. The crank arm 197 keyed to the sleeve 194 is connected to the rock shaft 165 by means of a pitman 231, the ends of which are provided with roller bearings for engaging stud pins 232 extending from the crank arms 197 and 227.

As stated above the construction of the shear housings and parts mounted thereon are of similar construction, but rights and lefts so that some of the parts operate in the reverse direction. It will be noticed however although the shear plates are alike the forward end of the wire engaging the solid plug 180 is not sheared off during the shearing and bending operation, but is only bent into a hook by the shear plate.

As the cam sleeve 18 rotates the roller 168 engages the cam 27 thereby rotating the rock shaft 165, sleeves 194 and ratchet wheels 200 keyed thereto until the flat surfaces 202 of the teeth of the ratchet wheels 200 engage the flat surfaces 212 of the teeth of the ratchet plates 210 thereby holding the plungers 174 in the forward or ejecting position. After the roller 168 has passed over the cam 27 the roller 169 engages the shearing cam 28, the rock shaft 165 and sleeves 194 will then be rotated in the reverse direction thereby shearing the stock wire 86 and forming hooks on the ends, and at the same time the plunger 174 will be retracted until the sides of the ratchet wheels 200 and ratchet plates 210 are in engagement with each other by means of the cam surfaces 222 on the projecting ends 173 of the plungers engaging and riding over the cam surfaces 223 formed on the inner surfaces of the die plates 176. After the roller 169 passes over the shearing cam 28 and the roller 168 again engages the cam 27 the operation above described will be repeated.

After the hooked ends 233 have been formed on the ends of the wire blank, the opposite end portions are operated upon in succession to produce the desired reel forming member. At the commencement of the operation the central portion of the blank is supported in the grooved passageway 178 in the top twister block 179 on the offset ends 234 of the bending dies 235, while the end portions of the blank are retained in the channels 236 of swinging guiding arms 177 one of which is located on either side of the top twister block 179. Each swinging guiding arm 177 is pivoted on a shaft 237 journaled in a bracket 238 attached to the shear housing 85 and is normally held in a horizontal position by means of a weight 239 on a vertically disposed rod 240 having its upper end attached to an arm 241 extending from the shaft 237 connected to the swinging guiding arm. The intermediate portion of each channel 236 of the swinging guiding arms 177 have their tops closed as at 242 while the inner ends are open as at 243 to allow the hooked end 233 of the blank to pass out of the guiding channel 236 and is also provided with a hardened insert 244 having an inclined surface for guiding the wire. The inner end of each swinging guiding arm is spliced to allow for replacement by means of a bolt 245 which extends through each swinging guiding arm near the end having a projecting stud with a flat surface 246 adapted to engage a stop bracket 247 extending from the top twister block 179 to limit the upward swinging movement.

Both end portions of the reel member are formed by similar mechanism but are rights and lefts and therefore operate in the reverse direction and are located on opposite sides of the machine and the reference numerals and detailed description of one set will apply to both.

Figure 1:
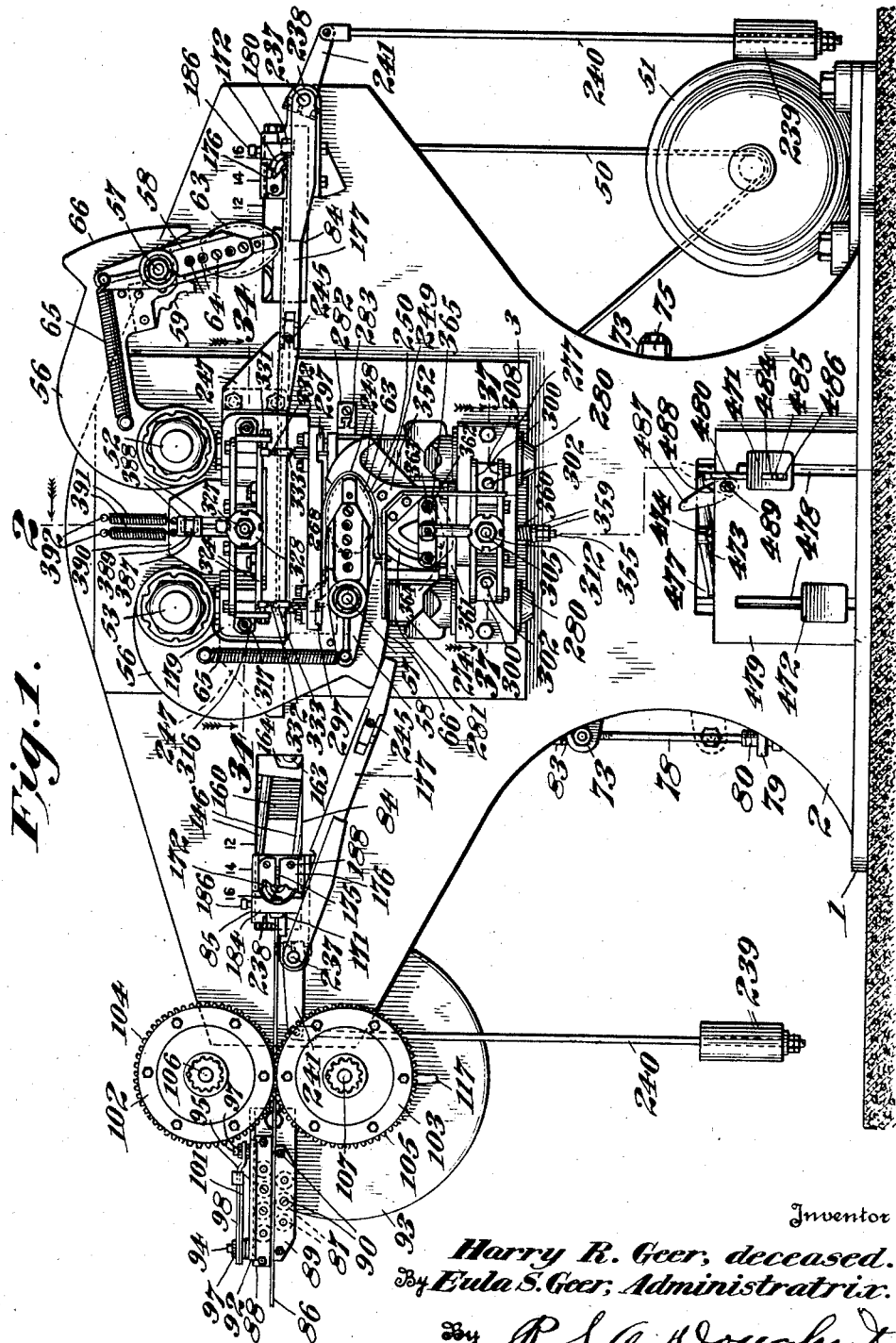
Figure 1 is a front elevation of the improved machine showing the left hand crank arm in the down position in the act of forming a loop.
Figure 11:
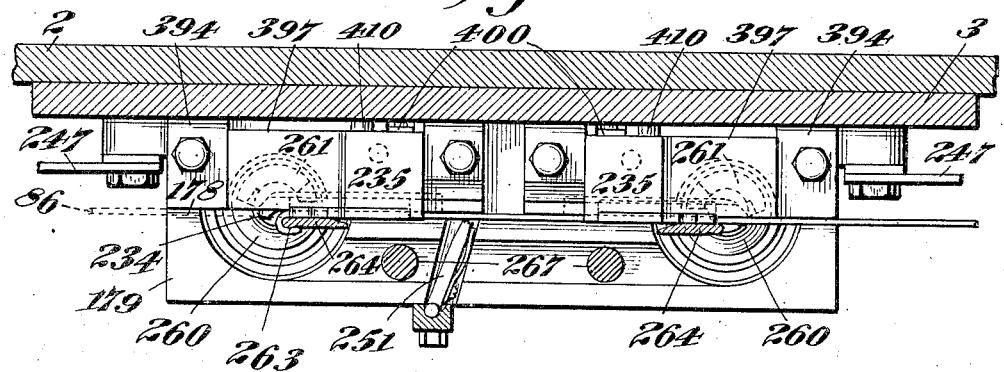
Fig. 11 is a transverse section taken on the line 11—11 of Fig. 10.

As indicated in Fig. 1 the left hand end portion of the blank is formed first, this is accomplished in the following manner: The back loop forming cam 21 is adapted to engage the roller 55 on the back cam shaft 53 and rotate the same so that the crank arm 56 and loop former 63 carried thereby are swung downwardly depressing the end of the pivoted swinging guiding arm 177, and in so doing the loop former 63 engages the end portion of the wire blank and pulls it out of the channel 236 through the opening 243 and bends it on the loop former 63 as it engages the curved recessed surface 248 of the pivoted anvil 249 into the loop shape 250 shown in Fig. 1 and it also crimps the wire between the former plate 59 and the corner die 393. In order to prevent the central portion of the blank from slipping a pivoted spring pressed dog 251 is provided mounted within the central under surface of the top twister head as indicated in Fig. 11. While the crank arm 56 and former 63 are down in the position indicated in Fig. 1, the cam 252 on the cam disk 23 engages the roller 253 and reciprocates the plunger 254 which has a rack 255 formed thereon meshing with a pinion 256 supported in roller bearings 257 in the top twister block 179.

A bolt 258 extends vertically through the pinion 256 having a head grooved at the sides to receive a spanner wrench and has its lower end threaded as at 259 and screwed into the upper end of a recess forming die 260 provided with an arc shaped extension 261 grooved as at 262 to engage the side of the wire and bend it to form a U-shaped recess 263 on the twister horn 264 when the pinion is rotated substantially a quarter of a revolution. In order to support the twister horn 264 in spaced relation with the top twister block 179 it is bolted as at 265 to a supporting bracket 266, which is in turn bolted as at 267 to the top twister block and provided with an extending portion 268.

While the roller 253 is still on the cam 252, the cam 269 on the cam disk 23 engages the roller 270 and reciprocates the plunger 271 which has a rack 272 formed thereon adapted to mesh with a toothed portion 273 formed near the bottom end of the bottom twister 274. The bottom end portion of the bottom twister is journaled in roller bearings 275 and 276 which are mounted in a bottom twister block 277 and located one on either side of the toothed portion 273. A nut 278 is screwed on the lower end of the bottom twister to hold the parts in position and these parts are further provided with a dust ring 279 and oil cover 280.

The main body of the bottom twister 274 is of segmental shape as at 281 and is supported near its upper end by means of a double bearing member 282 which is bolted to the front plates 2 and 3 and provided with an arc shaped bearing block 283 having a vertical groove 284 to receive the end of a pin 285 and an inner grooved surface 286 to receive the ends of pins 287. These grooves and pins allow the bearing blocks 283 to partially rotate with the bottom twister 274 in the manner indicated in Fig. 17. The upper end of the bottom twister 274 is formed with an arm 288 having flanges 289 and 290 extending from opposite sides of the top surface, between which is secured by means of screws 291 a twister former 292 having a head portion 293 and a projection 294 which is adapted to engage and bend the wire between the twister horn 264 and the formed loop 250, as indicated in Fig. 13.

As the cam 269 engages the roller 270 and reciprocates the plunger 271 with the rack 272 formed thereon which meshes with the toothed portion 273 on the bottom twister 274, it rotates the bottom twister slightly more than a quarter of a revolution as indicated in Fig. 13. In this manner the formed loop portion 250, and the part between the recess formed therein and loop portion are bent at substantially right angles to the central straight portion of blank, in so doing the wire is bent around a pintle projection 295 which extends from the lower corner edge of the twister horn 264 and the wire is also offset between the projection 294 on the twister former 292 and a similar projection 296 on a stationary side former 297 which is seated in a recess 298 in the extending portion 268 of the supporting bracket 266 near one end and secured thereto by means of bolts 299. After the roller 270 passes over the cam 269 the plunger 271 has to be returned to the position it assumed before engagement therewith. To accomplish this a bracket 300 is secured to the outer end of the plunger 271 by means of a bolt 302 having an arc shaped socket 303 formed in its outer side face. The inner end of the bracket is flanged as at 304 to engage the opposite sides of the outer end of the plunger to prevent its rotation. Threaded into the central portion of the bottom twister block 277 is a rod 305 which extends outwardly therefrom and is provided at an intermediate point with a sliding trunnion block 306 mounted thereon, having its trunnions 307 pivoted centrally in a pair of spaced levers 308. These levers are connected together near the trunnion block and the ends by means of bolts 309. The bolts 309 at the opposite ends of the levers 308 are provided with tubular sleeves 310 for engaging the sockets 303 in the bracket 300 attached to the plungers on opposite sides of the machine. The outer end of the rod is threaded as at 311 to receive a nut 312 and an adjustable flanged spring engaging nut 313 for supporting one end of a spring 314, the opposite end of said spring is supported by a flanged washer 315 on the rod 305 which is in contact with the outer end of the trunnion block 306. When the roller 270 engages the cam 269 the plunger 271 will be reciprocated outwardly thereby compressing the spring 314. After the roller 270 passes over the cam 269 the spring 314 acting on the sliding trunnion block 306 and the levers 308 will return the plunger and the connecting parts to the position they assumed before engaging the cam.

Immediately after the roller 270 passes over the cam 269 and the plunger 271 is retracted the roller 253 passes off the cam 252 and the plunger 254 is retracted by mechanism similar to that used in connection with the plunger 271, but as this mechanism also actuates the kinkers for bending the formed loop ends to the desired angle for the assembled reel a detailed description of the same will be given. As shown in Fig. 34, a bracket 316 is attached to the outer end of the plunger 254 by means of a bolt 317 having a downwardly extending flange 318 to which the kinker is attached and inwardly projecting flanges 319 for engaging the outer ends of the plunger to prevent the bracket from turning, and an arc shaped socket 320 formed on the inner side face. Threaded into the central portion of the top twister block 179 is a rod 321 which extends outwardly therefrom and has slidably mounted thereon at an intermediate point a trunnion block 322 having its trunnions 323 pivoted in the central portion of a pair of spaced levers 324. These spaced levers are connected together near the trunnion block 322 and at the ends by means of bolts 325. The bolts 325 at the ends of the levers 324 are provided with tubular sleeves 326 for engaging the sockets 320 in the brackets 316 which are attached to the plungers on opposite sides of the machine. The outer end of the rod 321 is threaded to receive a nut 327 and an adjustable flanged nut 328 for engaging and supporting one end of a spring 329, the opposite end of said spring is supported by a flanged washer 330 on the rod 321 which is in contact with the outer end of the trunnion block 322.

As shown in Fig. 9, a ball pin 331 is secured to the downwardly extending flange 318 of the bracket 316 for engaging an eye bolt 332 which is screwed into the top tubular portion of a kinker 333 which is provided with a lower flattened portion 334 grooved at its lower edge as at 335 and adapted to extend through a slot 336 in a guide 337 attached to the top of the extending portion 268 of the supporting bracket 266 near one end thereof. An opening 338 registering with the slot 336 extends through the portion 268 of the bracket 266 at the side of the bending face of the stationary former 297. When the plunger 254 is projected forward the kinker will be raised out of engagement with the formed wire as indicated in dotted lines in Fig. 9, but when the plunger 254 is retracted as shown in full lines in this figure, the lower end of the kinker will then extend through the slot 336 in the guide 337 and the opening 338 and engage the inner portion of the loop thereby bending it slightly downward.

The operations above described complete the formation of one end portion of the reel member, the other end of the reel member is now operated on in a like manner by similar mechanism but in the reverse direction, and brief description of the operation will be given.

As the roller 253 passes off the cam 252 and the plunger 254 is retracted, the loop forming cam 20 engages the roller 54 carried by the cam shaft 52 and swings the crank arm 56 and loop former carried thereby on the right hand side of the machine downwardly depressing the movable end of the swinging guiding arm 177. The loop former 63 engages the end portion of the wire blank and pulls it out of the channel 236 through the opening 243 and bends it on the loop former 63 as it engages the recessed surface 248 of the mandrel 249 which is rocked thereby from right to left. While the crank arm 56 and former 63 are down in this position the cam 339 on the cam disk 23 engages the roller 253 and reciprocates the plunger 254 and rotates the pinion 256 carrying the forming die 260 thereby engaging the side of the wire and bending it on the twister horn 264 to form a U-shaped recess. The cam 340 on the cam disk 23 now engages the roller 270 and reciprocates the plunger 271 which has a rack 272 formed thereon meshing with a toothed portion 273 formed on the bottom twister 274 which is provided with a swinging arm 288 having a twister former 292 with a head portion 293 and a side projection adapted to engage and bend the wire at substantially right angles between the twister horn 264 and the formed loop 250. This arm further bends the wire around the pintle projection 295 which extends from the lower corner edge of the twister horn 264 and the projection 296 on the stationary side former 297 as indicated in Figs. 12 and 13.

At the end of this operation the roller 270 has passed over the cam 269 and the plunger 271 has been returned to its original position by means of the spring actuated levers 308. By this time the roller 253 will have passed over the cam 239 and the plunger 254 has been returned to its original position by means of the spring actuated levers 324, and the sheave weight 72 will have raised the crank arm 56 to the position indicated on the right hand side of Fig. 1.

The reciprocation of the plungers 254 control the movement of the kinkers 333. As the plungers 254 are projected outwardly the lower ends of the kinkers 333 will be raised out of engagement with the wire and assume the position indicated in dotted lines in Fig. 9. When the said plungers are retracted as indicated in full lines the lower end of the kinker will extend below the extending portion 268 of the supporting bracket 266 and engage the formed wire and bend it downwardly so that it will be at a proper angle when assembled to form a symmetrical reel.

The plungers 254 and 271 are all formed and mounted in a similar manner, each plunger is formed cylindrical with a rack at one side. This cylindrical portion with the rack is adapted to reciprocate in a bushing 341 in the top or bottom twister blocks 179 and 277. The inner ends of the plungers are bifurcated as at 342 to receive the cam engaging rollers 253 and 270 which are mounted on an axle 344 having rollers bearing 343 and secured in position by means of a split wedge nut 345 adapted to be held in position by means of a nut lock 346.

This bifurcated end of the plunger is further provided at one side with a slide 347 for engaging a slideway 348 in a supporting bracket 349 which is flanged as at 350 and attached to the inner side of the front plate 2 by means of bolts 351.

As illustrated in Fig. 1 the machine is set as indicated to form sixteen inch reels but a plurality of sizes may be formed by adjusting the shear housings 85 inwardly to the scales indicated, fourteen inch, twelve inch or even smaller reels can be made, in so doing the spliced inner ends of the swinging guiding arms 177 have to be removed and replaced by shorter ones and in each case another anvil 249 is secured to the bracket 352 which is pivoted as at 353 to the upper head end 354 of a spring rod 355 which is adapted for vertical movement in a groove 356 formed in a block 357. The spring rod 355 extends vertically downward through the bottom twister block 277, which is provided with a socket 358 and has adjusting nuts 359 at the lower end wtih a spring 360 on the rod interposed between the nuts 359 and the upper end of the socket 358.

The anvil 249 and bracket 352 for supporting the same are adapted for rocking movement and are retained in position by means of a front angle bracket 361 having a reinforcing bar attached to its upper edge as at 362 and secured thereto at its opposite ends by means of bolts 363 which extend through arc shaped openings 364 in the anvil bracket 352 and secured to the block 357. If desired a shield 365 may be used attached to the bottom portion of the anvil 249 so that the formed reel member may be properly discharged from the machine without interference with any of the mechanism.

In order to guide the lower spring actuating mechanism for the lower plungers 271 a post 366 is attached to the upper trunnion 307 of the lower trunnion block 306 having a perforation 367 near its upper end through which a rod 368 extends; the inner end of said rod is threaded into the reinforcing bar attached to the upper end of the angle bracket 361 while the outer end has adjusting nuts 369 mounted thereon to limit the movement of the trunnion block 306.

By referring to Figs. 66 to 68, inclusive, it will be noted that the cams 252, 269, 339 and 340 are all mounted on the cam disk 23 in such a manner that they can readily be adjusted in relation to each other to allow them to engage the rollers of the plungers in the desired timed relation. For this purpose the front of the cam disk 23 is provided with four concentric grooves 370, in each one of which is seated a flat cam ring 371 each beveled at one edge as at 372 for engaging clamps 373 which are adapted to engage the beveled edges of a pair of rings and clamp them to the disk by means of a screw 374 thereby holding the rings in position. Each of the cams 252, 269, 339 and 340 has a pair of spaced perforations 375 extending transversely thereof. A stud bolt 376 having its lower end riveted to the rings 371 extends upwardly therefrom through a hole in the base of the cam into each of the transverse perforations and is threaded on its upper end to receive a washer 377 and nut 378. When it is desired to adjust the cams in relation to each other all that is necessary is to loosen the clamps 373 and rotate the cam rings so that the cams will assume the desired relative position and then tighten the screws 374.

After the reel member has been formed it has to be ejected from the machine. The cam disk 23 is provided with a cam 379 on its rear side which is adapted to engage a roller 380 having its shaft 381 journaled in a cylindrical portion 382 of the kick out lever 383 which is pivoted on the shaft 384 and supported in bearings 385 attached to the rear side of the front plate 2. The outer portion of the kick out lever extends outwardly through an opening 386 in the front plates 2 and 3 and is formed cylindrical at its outer end as at 387 for engaging shoes 388 which are inserted in an opening 389 in the top portion of a reciprocating kick out plate 390 provided with a grooved lower edge to engage the wire and having extensions at opposite sides at its lower end adapted to extend under the bending dies 260. For every revolution of the cam disk 23 the roller 380 passes over the cam and depresses the kick out plate 390 and ejects the formed reel member from the grooved passageway 178 in the top twister block. After the roller 380 passes the cam a pair of helical springs 391 attached to the top of the kick out plate 390 and to the front reinforcing plate 3 of the machine by means of posts 392 return the plate to its original position.

In order to eject the formed reel member from the machine it is necessary for the corner dies 393 to move laterally during this operation and then to be immediately returned to the original position after the operation. A pair of corner die slides 394 are secured by means of bolts to the lower inner surface of the top twister block 179 each having arc shaped openings 395 for the recess forming die and a slideway 396 for receiving a corner die holder 397. Grooves are formed in the corner die slides 394 for receiving the ribs 398 of the bending dies 235 which are each attached thereto by means of a bolt 399 and held in position by means of a nut 400. Each corner die slide 394 and its corner die holder are grooved as at 401 and 402 to receive a paralleling blade 403 which is notched as at 404 to receive the nut 400 of the bolt 399 for attaching the bending dies to the corner die holders 397. The corner dies 393 have their outer surfaces beveled and their rear faces ribbed as at 405 and seated in a recess 406 in the front surface of the corner die holders 397 and are each attached thereto by means of a screw 407. A spring 408 is seated in a socket 409 in each of the corner die holders 397 and is adapted to engage a plunger 410 which contacts with the reinforcing front plate 3 and normally holds the corner dies 393 against the inner face of the supporting bracket 266, and the twister horn. When the kick out plate 390 is reciprocated downwardly by means of cam action it engages the beveled surface of the corner dies 393 and pushes the corner die holders 397 inwardly thereby allowing the formed reel member to pass. After it has been retracted by means of the spring 408, the spring pressed plungers 410 advance the corner die holders until the corner dies are again in engagement with the rear face of the supporting bracket 266.

This machine is provided with a trip mechanism which is adapted to automatically stop the machine after four reel members have been formed, which is the number required to construct a reel. The operator then assembles the reel manually by interlocking the end portions together and then starts the machine by placing his foot on the operating pedal.

Figure 72:
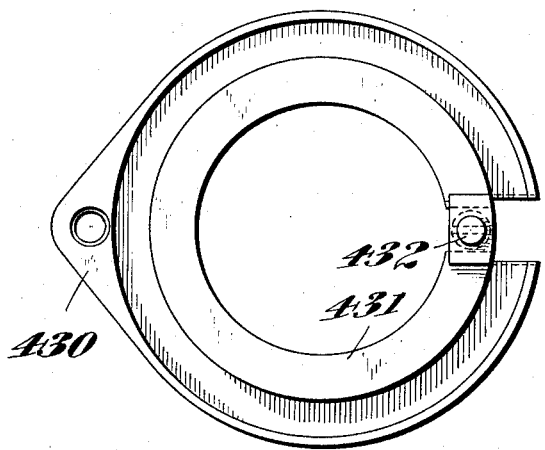
Fig. 72 is a rear elevation of the collar upon which the trip roller is mounted.
Figure 73:
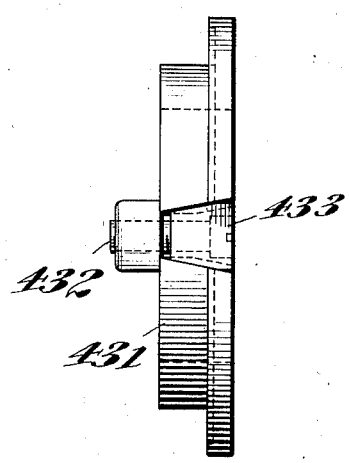
Fig. 73 is a side elevation of the collar shown in Fig. 72.
Figure 74:
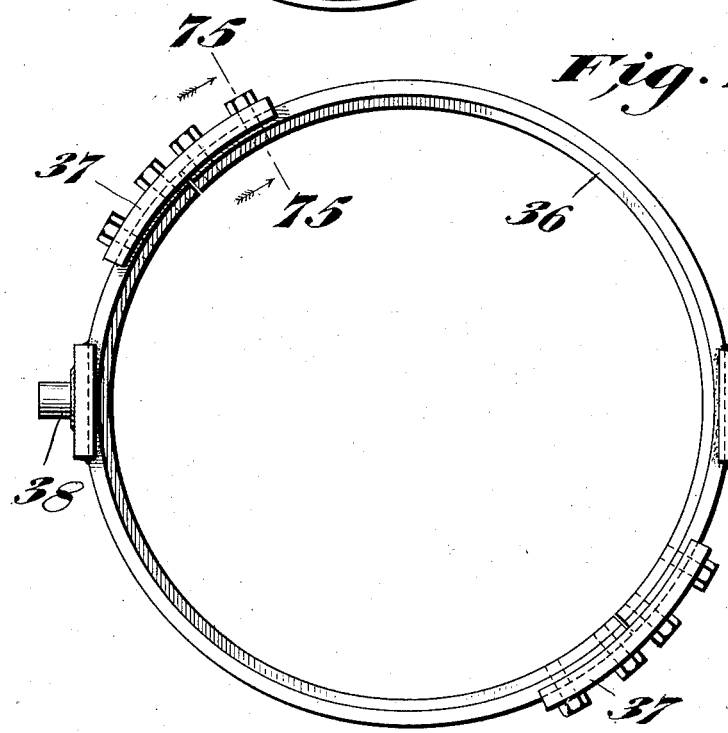
Fig. 74 is a side elevation of the trunnion ring.
Figure 75:
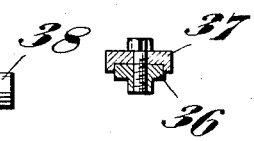
Fig. 75 is a transverse section through a portion of the trunnion ring taken on the line 75—75 of Fig. 74.

This trip mechanism will now be described: On the back of the machine a shaft 411 is journaled in a pair of bearings 412 attached to the back plate 6. A trip bracket 413 has bracket plates 414 and 415 at each side thereof which are connected together by means of rivets 416 and are keyed to the shaft at an intermediate point between the bearings 412 as at 417. The trip bracket 413 is provided on its upper surface at each end with upwardly extending arms 418 and 419 and a central slideway 420. The extending arms 418 and 419 have openings 421 and 422 formed therein for receiving a trip plunger 423 provided with a trip roller 424 at one end for engaging a stop cam 425 which has its axle 426 journaled in the back plate 6 and extending inwardly beyond the same to which is rigidly secured an intermittent transmission disk 427 having a plurality of spaced slots formed therein as at 428 adapted to be engaged by a roller 429 attached to the flanged arm 430 of a collar 431, which extends into the inner end of the cam sleeve 18, and is secured thereto by means of the bolt 432 and wedge 433, as shown in Figs. 72 and 73.

The opening 422 in the arm 419 of the trip bracket is of smaller size than the opening in the arm 418 and is provided with a socket to receive a spring 434. The end of the trip plunger 423 which extends through the opening 422 in the arm 419 is reduced in size as at 435 to form an abutment 436 and a shoulder at an intermediate point as at 437. A bifurcated sliding shoe 438 is mounted on the reduced end portion 435 between the abutment 436 and shoulder 437 having its legs extending downwardly to engage the top of the slideway 420. One end of the shoe 438 is provided with a seating groove 439 for receiving the shoulder 437 and another 440 for receiving a washer 441 for engaging one end of the spring 434. The opposite sides of the sliding shoe are provided with guideways 442 for receiving the downwardly extending spaced arms 443 of a trip yoke 444 which is keyed as at 445 to the trip lever shaft 446 which is provided at one end with a trip lever 447. The swinging end of this trip lever 447 is pivoted by means of a pin 448 to a coupling 449 mounted on the upper end of a coupling rod 450 and adjustably held in position by means of nuts 451. The pin 448 extends beyond one side of the trip lever 447 and is reduced in size as at 452 and extends into an arc shaped way 453 which is provided with limit abutments 454 and 455.

The opposite ends of the shaft 411 are each connected to a clutch yoke arm 39 by means of a toggle, each comprising a crank arm 456, keyed at one end as at 457 to the shaft 411 and held in position by means of a cap 458 and bolts 459. A link 460 having bifurcated ends is pivoted at one end as at 461 to the bottom end of each clutch yoke arm 39 with the opposite end pivoted as at 462 to the extending end of the crank arm 456. A post 463 is attached to each crank arm 456 which is perforated at the outer end as at 464 to receive the threaded end of an eye bolt 465 and adjustably secured thereto by means of a washer and nut 466. Each link 460 has a pin 467 secured thereto and projecting outwardly therefrom provided with a groove for receiving the hooked end of a helical spring 468, the opposite end of said spring being secured in the eye of the eye bolt 465.

A bracket 469 is secured to the lower central surface of the annular housing 5 having a shaft 470 extending from opposite sides thereof adapted to receive an operating pedal 471 and a setting pedal 472. An equalizing link 473 is pivoted centrally as at 474 to the bracket 469 having its opposite ends ball shaped as at 475 and extending into perforations 476 in the pedals 471 and 472. The pedals extend outwardly through an opening 477 in the front plate 2 and through slots 478 in a latch plate 479. The outer end of the operating pedal 471 is provided with a bell crank shaped latch arm 480 pivoted thereto as at 481. One end of the latch 480 extends upwardly and is provided with a catch 482 for engaging the beveled top edges 483 of the latch plate 479, while the other arm of the latch extends horizontally and is provided with a foot engaging end 484 which extends through a slot 485 in the tread of the pedal and is projected upwardly by means of a leaf spring 486 which has one end attached to the latch and the other end engaging the outer end of the slot 485. A latch dog 487 having oppositely inclined contact surfaces 488 is pivoted as at 489 to the latch plate 479 adjacent to the latch arm 480. As shown in Fig. 1 the upper end of the latch dog 487 has been swung from right to left until the left hand side of the oppositely inclined contact surface 488 is in engagement with the top edge of the latch plate. In this position the catch 482 will engage the beveled top edge 483 of the latch plate 479, and the machine will run continuously. When it is desired to use the trip mechanism to stop the machine after every four reel members have been made, the latch dog 487 is swung in the opposite direction so that the upper portion will be in the path of the catch 482 of the latch arm 480 so that it will not engage the beveled top edge 483 of the latch plate 479 in the upward movement of the operating pedal 471.

The operating pedal 471 is also provided with a rearwardly extending arm 490 pivoted as at 491 to a clevis 492 attached to the lower end of the coupling rod 450.

The operation of the trip mechanism is as follows: When the pedals are set in the position indicated in full lines in Fig. 2 the machine will run continuously and the trip mechanism will not be in operation, as the trip roller 424 will be out of engagement with the stop cam 425 and in the position illustrated in Figs. 2, 52 and 54 of the drawings. In order to throw the trip mechanism into operation the operator places his foot on the tread end of the operating pedal 471 thereby disengaging the catch 482 from the beveled edge 483 of the latch plate 479 and then depresses the operating pedal until the trip roller 424 is in engagement with the stop cam disk 425. During this movement the setting pedal 472 will be raised by the action of the equalizing link 473. The latch dog 487 is then swung into the path of the catch 482 to prevent it from engaging the beveled edge 483. In pushing down the front end of the operating pedal its rearwardly extending arm 490 which is connected to the rod 450 is swung upwardly and in so doing rotates the trip lever 447, shaft 446 and trip yoke 444 which engages the sliding shoe 438 on the trip plunger 423 thereby advancing the trip roller 424 until it is in vertical alignment with the stop cam 425.

For each revolution of the cam sleeve 18 the roller 429 attached to the flanged arm 430 of the collar 431 engages a slot 428 in the intermittent transmission disk 427 and rotates it and the stop cam a quarter of a revolution. In order to secure accuracy so that the stop cam will rotate exactly a quarter of a revolution for each rotation of the cam sleeve 18, the stop cam 425 is provided with four perforations 493, each spaced 90° apart which are adapted to be engaged by a ball 494 which is held in contact with the edge of the perforations by means of a spring 495 seated in a socket 496 and held in position by means of a retaining plug 497.

At the fourth revolution of the cam sleeve 18 the trip roller 424 rides up on the cam surface of the stop cam 425 thereby throwing the clutch jaws 29 and 34 out of engagement and stopping the machine.

Figure 2:
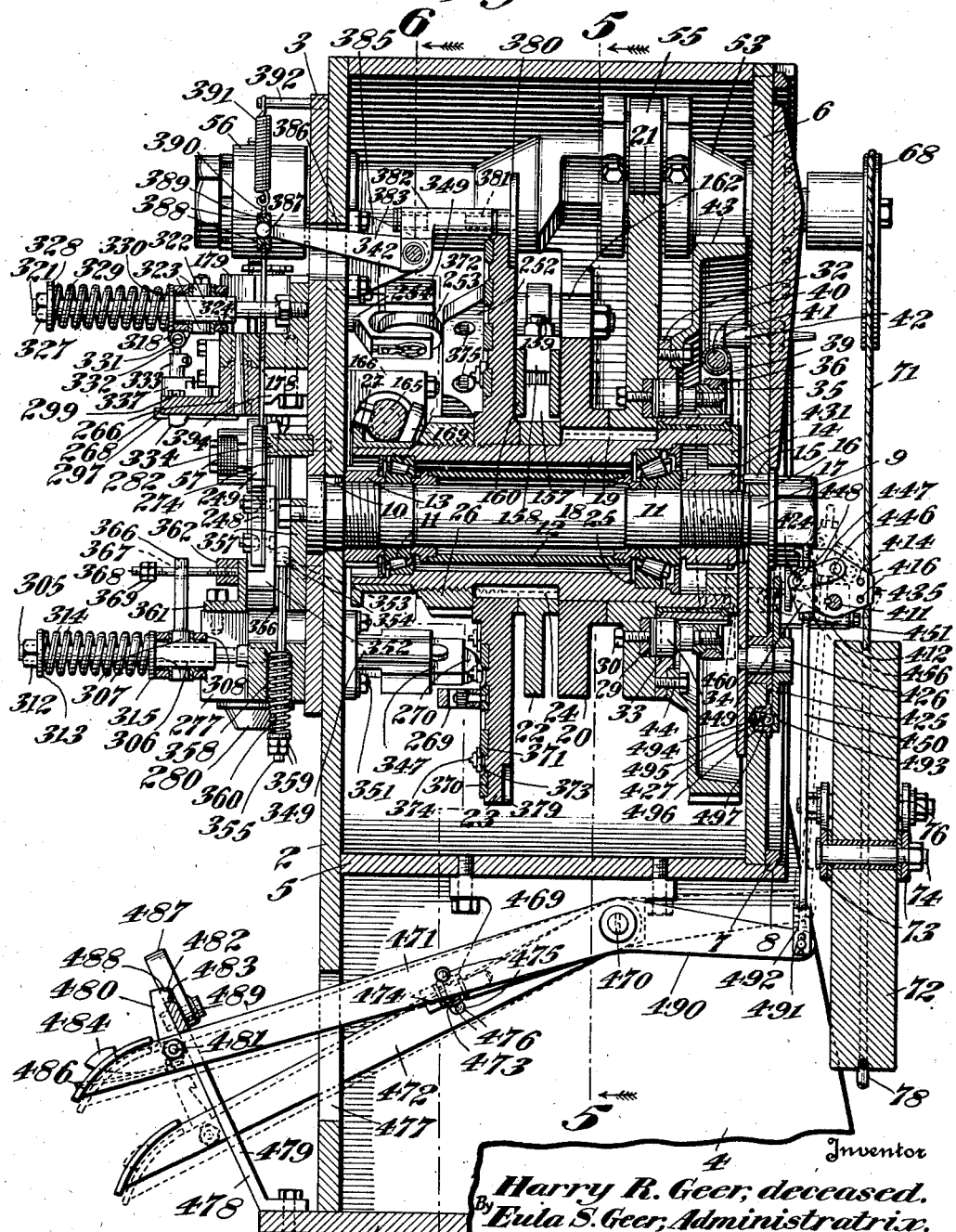
Fig. 2 is a vertical section taken substantially on the line 2—2 of Fig. 1 with the loop forming mandrel and trip mechanism shown in elevation.

When the trip mechanism and pedals are in the position indicated in Figs. 2, 52 and 54 the reduced end of pin 448 will be in contact with the limiting abutment 455 of the bracket plate 414. In depressing the operating pedal to bring the trip roller 424 into alignment with the stop cam 425 the pin 448 is raised on the arc shaped way 453. As the trip roller 424 rides up on the cam surface of the stop cam 425 it swings the movable end of the trip bracket 413 and the parts mounted thereon upwardly. By the time the trip roller 424 has reached the top of the cam surface, the toggle link and spring connections between the end of the trip shaft 411 and the lower ends of the clutch yoke arms 39 will assume the position shown in dotted lines in Fig. 53, thereby raising the trip roller 424 slightly above the stop cam 425 as illustrated in Fig. 55. As the lower end of the clutch yoke arm 39 swings rearwardly, it slides the trunnion ring 36, clutch ring 35 and jaws 34 with it thereby disengaging the jaws 34 from the clutch jaws 29 on the back loop forming cam 21 thereby allowing the gear 43 and parts connected therewith to run free and stopping the machine.

When the setting pedal 472 is depressed the trip roller 424 will be brought into alignment with the stop cam 425 and the clutch yoke arms 39 and the movable clutch jaws will be swung forward to allow the clutch jaws 29 and 34 to engage.

Although I have shown a trip mechanism applied to this machine I may if I so desire dispense with it and the controlling pedals and key the hub of the gear 43 directly to the cam sleeve 18 and rely upon other means for controlling the driving power for operating the machine, as a switch, clutch, belt tightener or the like.

Having thus given the foregoing general and detailed description of my invention, I will now describe the operation:—The wire stock 86 is supplied to the machine from a large coil or reel (not shown) located near the machine. In starting the operation the lever 101 is rotated so that the rider 100 will engage the lower portion of the cam disk 99. The springs 91 will then raise the upper set or row of straightening rolls to allow the end of the wire to be inserted between them. The feed release lever 117 is then manipulated to allow the bottom feed roll 103 to swing slightly downward, the wire is then advanced manually into the tubular plug 171 until the end of the wire in in alignment with its inner end. The levers 101 and 117 are then swung back to their original positions to allow the straightening and feed rolls to firmly grip the wire. The cams mounted on and rotated by the movement of the cam sleeve 18 are all adjusted to engage and actuate different sets of mechanisms in timed relation. Assuming that the feed adjusting plate 132 which is connected to the longitudinally reciprocating yoke 160 by means of the connecting rod 146 is in the position indicated in dotted lines in Fig. 44 and the feed operating cam 22 engages the feed operating roller 155 the longitudinally reciprocating yoke 160 will be slid from right to left and the parts will be in the position indicated in full lines in Figs. 4, 5, 44 and 91. During this stroke the clutch will be in frictional engagement and will rotate the feed rolls 102 and 103 and a length of wire will be fed into the machine through the guideways 175 in the die plates 176, swinging guiding arms 177 and the grooved passageway 178 in the top twister block 179 until the forward end of the wire engages the solid plug 180. The feed rolls 102 and 103 will now remain stationary. After the cam sleeve 18 has rotated another half a revolution the feed operating cam 22 engages the feed operating roller 156 and slides the longitudinally reciprocating yoke 160 from left to right. In this stroke the clutch will be out of frictional engagement and the feed rolls 102 and 103 will continue to remain stationary until the feed operating cam 22 again engages the feed operating roller 155.

The shear operating cam 28 will then engage the roller 169 and rock the shaft 165 and through its connections rotate the two shear plates 172 downwardly but in the reverse direction across the inner faces of the plugs 171 and 180, thereby shearing off a length of wire and simultaneously forming a hook 233 on the opposite ends of the wire by bending it between the shear face ends and the forming surfaces of the die plates 176 as indicated in dotted lines in Figs. 58 and 59. At the end of this operation the blank will be in the form shown in Fig. 92. During the shearing and hook forming operations the plungers 174 with their ejecting ends 173 will be retracted by means of the cam surfaces 222 on the ejecting ends 173 of the plungers 174 engaging similar surfaces 223 on the inner faces of the die plates 176. After the hook forming operation the roller 169 passes over the cam 28 and the roller 168 again engages the cam 27 and rocks the shaft 165 in the reverse direction to that for the shearing and hook forming operations. The inclined surfaces 201 of the teeth of the ratchet wheel 200 will then engage the inclined surfaces 211 of the ratchet plate 210 and slide up on them until the flat surfaces 202 and 212 of the ratchet wheel 200 and ratchet plate 210 are in contact with each other as indicated in Fig. 48, thereby projecting the hooked ends of the blank beyond the front surfaces of the shear and die plates 172 and 176.

Figure 3:
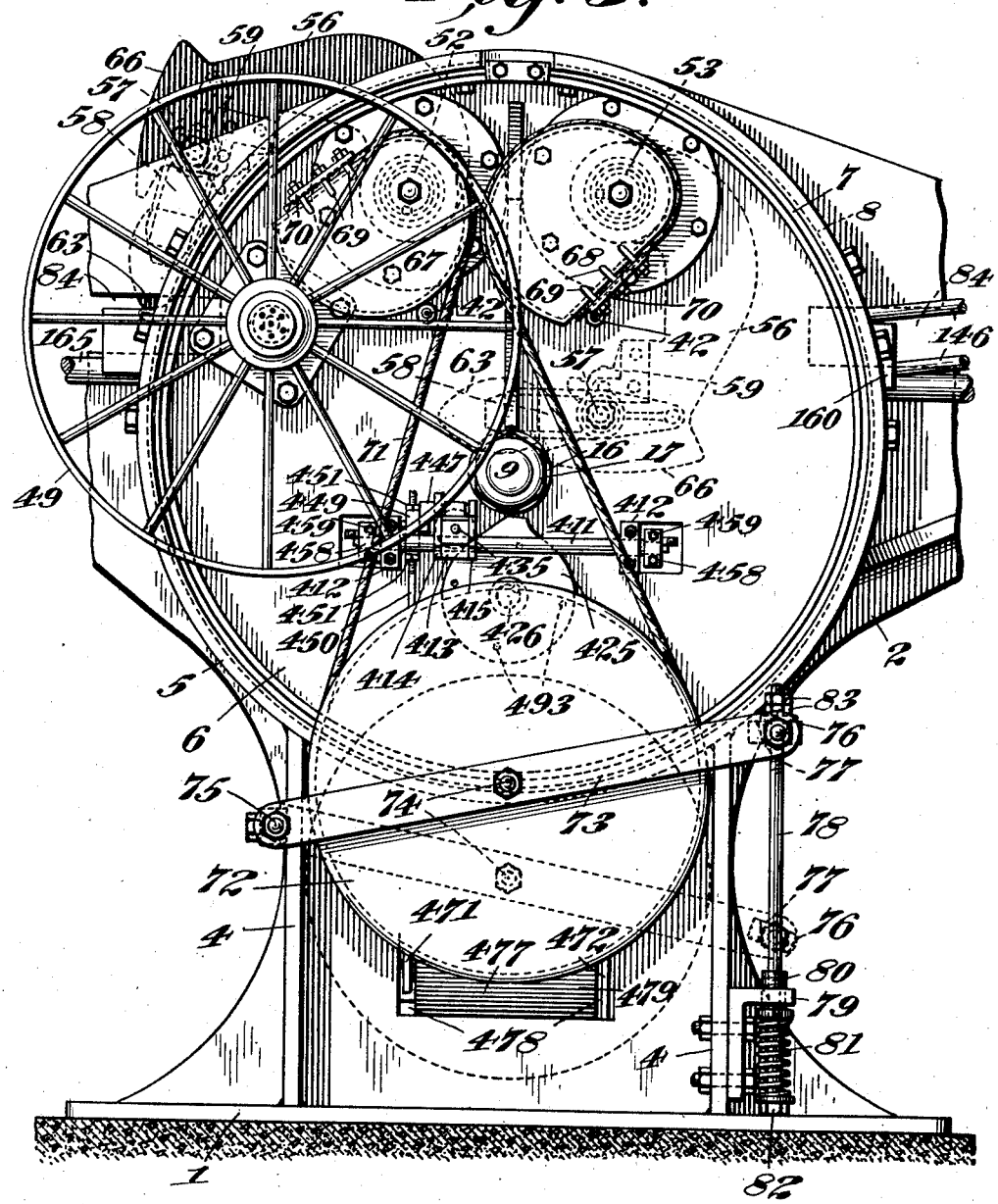
Fig. 3 is a rear elevation of the main body of the machine.
Figure 10:
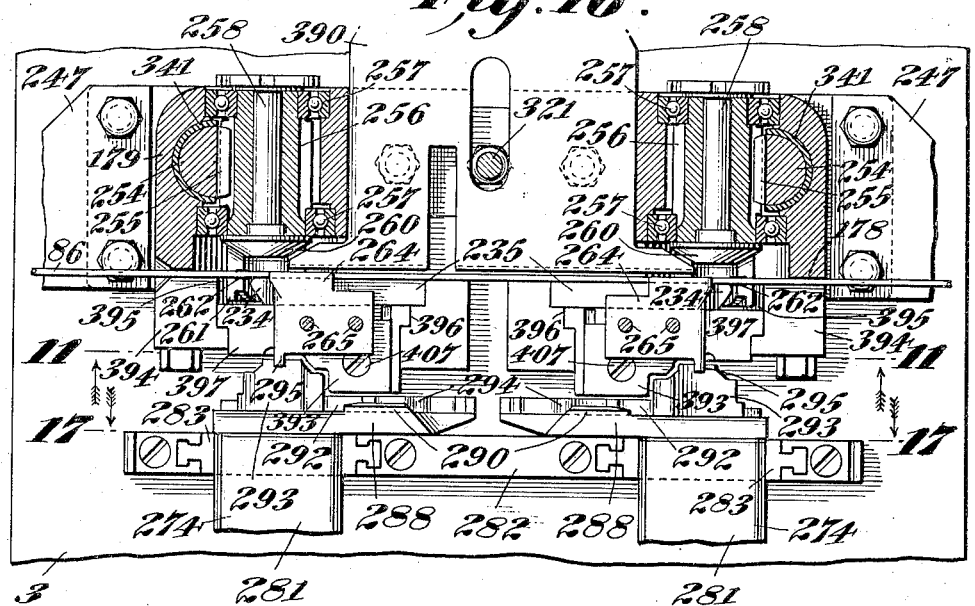
Fig. 10 is a vertical section through the top twister block taken on the line 10—10 of Fig. 34.

The ends of the blank are now formed independently in succession. As shown in Fig. 1 the left hand end portion of the blank is formed first, although this is immaterial as the machine could be adapted to form either end portion of the blank first if desired. The roller 55 carried by the back cam shaft 53 now engages the back loop forming cam 21 raising the sheave weight 72 to the position shown in full lines in Fig. 3, and swings the crank arm 56 carrying the former plate 59 downwardly for engagement with the swinging guiding arm 177 and together with the arc shaped contact surface 66 on the crank arm 56 depresses its inner end. The curved end of the loop former 63 engages the end portion of the blank at an intermediate point and pulls it out of the guiding channel 236 through the opening 243 and it is then bent to form a loop 250 on the curved recess 248 of the anvil 249 as the said anvil is rocked from its normal vertical position to the right as shown in Fig. 1. At the same time the former plate 59 and coacting corner die 393 crimps the wire as at 498 and bends the end portion of the blank in the manner shown in Fig. 93. While the crank arm 56 is down in the loop forming position, the cam 252 on the cam disk 23 will engage the roller 253 on the rear end of the plunger 254 and project it outwardly, the rack 255 formed on said plunger and meshing with the pinion 256 will rotate the recess forming die 260 and bend the wire on the twister horn 264 to form a substantially U-shaped recess 263 as indicated in Figs. 11, 13, 24 and 94. By this time the roller 55 will have passed over the cam 21 and the sheave weight 72 will assume the position shown in dotted lines in Fig. 3, thereby raising the crank arm 56.

This end portion of the blank is now formed as shown in Fig. 94. During this operation the left hand ends of the spring pressed levers 324 will be swung outwardly by means of the tubular sleeves 326 engaging the socket 320 formed in the bracket 316, and the kinker 333 will also be raised to the position indicated in dotted lines in Fig. 9. The cam 269 on cam disk 23 now engages the rollers 270 carried on the inner end of the plunger 271 which is provided with the rack 272 meshing with the toothed portion 273 of the bottom twister 274 and projects it outwardly thereby rotating the twister slightly more than a quarter of a revolution as indicated in Fig. 13 and in doing so the twister former 292 engages the formed end portion of the blank between the pintle projection 295 of the twister horn 264 and the formed loop 250 thereby bending it at right angles to the central portion of the blank and the same time the wire is bent partially around the pintle projection and the loop slightly offset as at 500 between the projection 294 on the twister former 292 and the projection 296 on the stationary former 297. During this operation the left hand ends of the spring pressed levers 308 will be swung outwardly by means of the tubular sleeve 310 engaging the arc shaped socket 303 formed in the bracket 300. At the end of this operation the roller 270 passes off the cam 269 and the plunger 271 will be returned to its normal position by means of the pressure of the spring 314. The roller 253 will now pass off the cam 252 and the plunger 254 will be returned to its normal position by means of the pressure of the spring 329 at the same time the kinker 333 will be projected downwardly to bend the formed loop 250 to the desired angle as indicated in full lines in Fig. 9.

This completes the formation of one end portion of the blank as shown in Fig. 95.

The opposite end portion of the blank is now formed in a similar manner but in the reverse direction.

The roller 54 carried by the front cam shaft 52 engages the front loop forming cam 20 and again raises the sheave weight 72 and swings the crank arm 56 carrying the loop former 63 and former plate 59 downwardly engaging the swinging guiding arm 177, depressing its inner end and pulling the hooked end from its guiding channel 236 through the opening 243, and as the crank arm 56 continues to rotate the arc shaped contact surface 66 further depresses the swinging guiding arm and the crimp 498 and the loop 250 are formed as above described. As the end of the loop former 63 forces the bent wire into the curved recess 248 in the anvil 249 it is rocked from its normal vertical position to the left. This end portion of the wire is now bent to the form indicated in Fig. 96. At this point the cam 339 on the cam disk 23 engages the roller 253 which is carried by the inner end of the plunger 254 having a rack 255 meshing with the pinion 256 on the right hand side of the machine thereby rotating the recess forming die 260 to form a recess 263 as shown in Fig. 97. The roller 54 carried by the front cam shaft 52 now passes off the loop forming cam 20, and the sheave weight 72 assumes the position indicated in dotted lines in Fig. 3, thereby raising the crank arm 56. Roller 270 now engages the cam 340 projecting the plunger 271 having the rack 272 meshing with the toothed portion 273 of the twister 274 outwardly bending the crimped and looped formed end at right angles to the central portion of the blank, also bending the wire around the pintle projection 295 and offsetting the looped end between the projections 294 and 296. After the roller 270 passes over the cam 340 the spring actuated levers 308 return the plunger to its normal position. The roller 253 now passes off the cam 339 and the spring actuated levers 324 return the plunger 254 to its normal position and at the same time the kinker 333 bends the formed looped end to the desired angle.

The reel member is now in the completed form as indicated in Fig. 98, but is still in the machine and has to be ejected therefrom. To accomplish this the back of the cam disk 23 is provided with a cam 379 for engaging the roller 380 which is mounted on the rear end of a pivoted kickout lever 383, the forward end of the kickout lever 383 being pivotally connected to the top end of a kickout plate 390 which normally has its lower end located above the central portion of the blank and is adapted to reciprocate into the grooved passageway 178. At the end of the forming operations the cam 379 engages the roller 380 and slides the kickout plate 390 downwardly, thereby engaging the straight central portion of the reel member and the beveled faces of the corner dies 393 and in so doing sliding the corner die holder 397 laterally and ejecting the reel member from the machine. After the roll 380 passes over the cam 379, the springs 391 retract the kickout plate and the springs 408 and the plungers 410 return the corner die holders 397 to their normal position.

This machine is equipped with a trip mechanism which if desired will stop the machine after four reel members have been made which is the number required to form the finished reel. The operator can then assemble the reel and afterwards start the machine and continue the operation.

As indicated in Figs. 2, 52 and 54 the trip mechanism is not in use as the trip roller 424 is retracted back of the stop cam 425 and in this position the machine will run continuously.

When it is desired to use the trip mechanism the latch arm 480 is released by the operator placing his foot on the foot engaging portion 484 and pressing down on the operating pedal 471 until the trip roller 424 is advanced into vertical alignment with the stop cam 425. By this movement of the operating pedal 471 the setting pedal 472 is raised. The roller 429 carried by the flanged arm 430 of the collar 431 which is attached to the rear end of the cam sleeve 18 engages the slots 428 formed in the transmission disk 427 and rotates said transmission disk and the stop cam 425 a quarter of a revolution for each rotation of the cam sleeve 18. At the end of each fourth revolution of the sleeve 18 the trip roller 424 passes over the high cam surface on the stop cam 425 and raises the coupling rod 450 with the coupling 449 and the pin 448 until its reduced end 452 engages the limit abutment 454 on the bracket plate 414 and then continues upwardly and rotates the trip bracket 413 and the shaft 411. By the time the trip roller 424 has reached the top of the cam surface on the stop cam 425 the springs 468 on the toggle links will raise the trip roller 424 above the stop cam 425 to the position indicated in Fig. 55 and in so doing the lower ends of the clutch yoke arms 39 having the trunnions 38 of the trunnion ring pivoted therein will be swung rearwardly carrying the clutch ring 35 and disengaging the jaw studs 34 from the clutch jaws 29 on the back loop forming cam 21, so that the gear 43 and the clutch spider 32 will run free on the cam sleeve 18 and the machine will be stopped. To start the machine again the operator places his foot on the setting pedal 472 and depresses it until the clutch is again thrown into engagement. It will be noted that in depressing the setting pedal 472 the reduced end 452 of the pin 448 first engages the limit abutment 455 on the bracket plate 414, the trip bracket 413 and the parts mounted thereon will then swing downwardly until the trip roller 424 is in vertical alignment with the stop cam 425.

The assembled reel is shown in Fig. 99. This reel forms the subject matter of a co-pending application filed by Harry R. Geer December 5, 1934, Serial No. 756,064.

Although I have described and illustrated my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described the invention, what is claimed as new and desired to be secured by Letters Patent is:

1. In a wire article forming machine of the class described, means for feeding a length of wire to the machine, shear plates for shearing off the length of wire, die plates coacting with the shear plates for simultaneously forming a hook at each end of the length of wire, and means for forming each end portion of the length of wire in succession.

2. In a wire article forming machine of the class described, means for feeding a length of wire to the machine, means for shearing off the length of wire to form a blank, means coacting with the shearing means for forming a hook at each end of the blank, means for forming each end portion of the blank in succession in substantially the same plane as the central portion of the blank, and twister formers for bending the formed end portions at right angles to the central portion of the blank.

3. In a wire article forming machine of the class described, means for feeding a length of wire to the machine, means for shearing off the length of wire to form a blank, means coacting with the shearing means for forming a hook at each end of the blank, loop formers for forming a loop in each end portion of the blank in the same plane as the central portion of the blank, dies for forming a recess between each formed loop and the central portion of the blank, and twister formers for bending the formed end portions of the blank adjacent to the recesses at right angles to the central portion of the blank.

4. In a wire article forming machine of the class described, means for feeding a length of wire to the machine, means for shearing off the length of wire to form a blank, means coacting with the shearing means for simultaneously forming a hook at each end of the blank, loop formers for forming in succession a loop in each end portion of the blank in a vertical plane with the central portion of the blank, means for forming a recess between each formed loop and the central portion of the blank in a horizontal plane to the central portion of the blank, means for bending the formed end portions of the blank adjacent to the recesses at right angles to the central portion of the blank, and means for offsetting the formed looped end portions.

5. In a wire article forming machine of the class described, means for intermittently feeding a length of wire to the machine, means for shearing off the length of wire to form a blank, means coacting with the shearing means for simultaneously forming a hook at each end of the blank, loop formers for forming in succession a loop in each end portion of the blank in the same plane as the central portion of said blank, means for forming a U-shaped recess in the blank between each formed loop and the central portion of the blank by bending the wire at right angles to the formed loops, means for bending the loop formed ends at right angles to the central portion and for offsetting the formed looped end portions, and means for laterally bending the formed looped end portions.

6. In a wire article forming machine of the class described, means for intermittently feeding a length of wire to the machine, means for shearing off the length of wire to form a blank, means coacting with the shearing means for simultaneously forming a hook at each end of the blank, means for forming each end of the blank in succession, comprising means for forming a loop and a crimp in each end portion in substantially the same plane as the central portion of the blank, means for forming a U-shaped recess in the blank between each formed loop and the central portion of the blank by bending the wire at right angles to the formed loops, means for offsetting the formed looped end portions, means for laterally bending the formed looped end portion and means for automatically ejecting the formed article from the machine.

7. In a wire article forming machine of the class described, feed rolls adapted to advancing the wire in the machine, bending dies adapted to support the central portion of the wire length, shear plates for forming a blank by cutting the wire into lengths and simultaneously forming hooks at the ends of the blank, loop formers for forming the end portions of the blank into loops, coacting dies for forming a recess in the blank between each loop formed end and the central portion of the blank, dies for forming and twisting the wire between each recess and each loop formed end, dies for bending the looped ends at right angles to the central portion of the blank, and kinkers for laterally bending the looped formed ends.

8. In a wire article forming machine of the class described, feed rolls adapted to advance a length of wire into the machine, stationary bending dies adapted to support the central portion of the wire length, rotary shears coacting with die plates for forming a blank by cutting the wire into lengths and for simultaneously forming a hook on each end portion of the blank, swinging loop formers for bending the end portions of the blank into loops, rotary dies and coacting stationary dies for forming a recess in the blank between each loop formed end and the central portion of the blank, a former plate and a corner die for bending the wire between each of the loops and the central portion of the blank, twister formers for bending the looped ends adjacent to the recesses at right angles to the central portion of the blank, and kinkers for laterally bending the looped ends.

9. In a wire article forming machine of the class described, feed rolls adapted to advance a length of wire into the machine, stationary bending dies adapted to support the central portion of the wire length, rotary shears for forming a blank by cutting the wire into lengths and simultaneously forming hooks on the ends of the blank, swinging loop formers for forming the end portions of the blank into loops, a pair of rotating dies each coacting with a twister horn for forming a recess in the blank between each loop formed end and the central portion of the blank, a former plate and a corner die for crimping the wire between each of the loops and the central portion of the blank, twister formers each having a projection for bending the looped ends at right angles to the central portion of the blank, pintle projections adapted to coact with the twister formers to form a twist in the wire between each loop and the central portion of the blank, stationary formers each having a projection adapted to coact with the projections on the twister formers to offset the looped end portions, and kinkers for laterally bending the looped ends.

10. In a wire article forming machine of the class described, feed rolls adapted to intermittently advance the wire in the machine, means for adjusting and controlling the rotation of the feed rolls, stationary bending dies each having an offset portion adapted to support the central portion of the wire in the machine, means for forming a blank by cutting the wire into lengths and simultaneously forming hooks on the ends of the blank, loop formers for forming the end portions of the blank into loops, means for forming a U-shaped recess in the blank between each loop formed end and the central portion of the blank, means for crimping the wire between the central portion of the blank and the looped formed ends, means for bending the formed end portions between the U-shaped recesses and the ends at right angles to the central portion of the blank, means for offsetting the looped ends, and means for laterally bending the looped ends.

11. In a wire article forming machine of the class described, feed rolls intermittently actuated for advancing a length of wire to the machine, bending dies for supporting the central portion of the wire length, shear plates for cutting the length of wire to form blanks, die plates coacting with the shear plates adapted to simultaneously form hooks on the ends of the blank, means for ejecting the hooked ends from between the shear and die plates, means for forming the opposite end portions of the blank in succession, comprising loop formers adapted to form loops on the end portions of the blank, coacting dies for forming a recess between each looped end and the central portion of the blank, dies for crimping the blank between the loop formed ends and the recesses, twister formers adapted to bend the formed end portions adjacent to the recesses at substantially right angles to the central portion of the blank and offset the loop formed ends, and kinkers for laterally bending the looped formed ends.

12. In a wire article forming machine of the class described, feed rolls intermittently actuated for advancing the wire in the machine to form blanks, coacting shear and die plates at each side of the machine adapted to simultaneously form hooks on the ends of the blank, means for forming the end portions of the blank in succession, comprising swinging loop formers, an anvil coacting with the loop formers adapted to form loops on the end portions of the blank, twister horns, a rotating recess forming die coacting with each twister horn for bending the wire to form a U-shaped recess between the central portion of the blank and each of the loop formed ends, coacting relatively stationary and movable dies for crimping the wire between the loop formed ends and the recesses, rotating twister formers adapted to bend the formed end portions adjacent to the recesses at substantially right angles to the central portion and offset the loop formed ends, and kinkers for laterally bending the formed loop ends.

13. In a wire article forming machine of the class described, a frame, a main shaft having its ends supported in the frame, a cam sleeve mounted on the main shaft, loop forming cams secured to the cam sleeve, feed rolls intermittently actuated for advancing lengths of wire to the machine to form blanks, bending dies for supporting the central portion of the blank, coacting shear and die plates adapted to simultaneously form hooks on the ends of the blank, cam shafts journaled in the frame, a roller carried by each cam shaft adapted to engage a loop forming cam, means for rotating the cam sleeve, loop formers actuated by the loop forming cams for forming loops in succession in the end portions of the blank, means for forming a recess at the ends of the central portion of the blank, coacting sets of dies for crimping and twisting the blank between the loops and the recesses, twister formers for bending the formed end portions adjacent to the recesses at substantially right angles to the central portion of the blank, means for offsetting the formed looped ends, and means for laterally bending the formed looped ends.

14. In a wire article forming machine of the class described, means for feeding the wire to the machine intermittently, coacting shear and die plates adapted to shear the fed length of wire to form a blank and simultaneously form hooks on the ends of the blank, bending dies for supporting the central portion of the blank, means for forming the end portions of the blank in succession, comprising an anvil, swinging loop formers adapted to bend the wire into loop form on the anvil, independent means for swinging the loop formers in opposite directions, rotating dies coacting with stationary dies for forming a U-shaped recess in the blank between the central portion and each of the loop formed ends, rotating twister formers for bending the formed end portions adjacent to the recesses at substantially right angles to the central portion of the blank, and means for individually actuating each of the movable bending dies and twister formers.

15. In a wire article forming machine of the class described, means for feeding a length of wire to the machine intermittently, coacting shear and die plates adapted to shear the fed length of wire to form a blank and simultaneously form hooks on the ends of the blank, bending dies for supporting the central portion of the blank, reciprocating plungers each having an ejecting end extension adapted to engage the hooked ends and eject them from between the shear and die plates, means for reciprocating the plungers, coacting dies for forming a loop and a recess in each end portion of the blank in succession, a pair of twister formers actuated in succession for bending the formed end portion adjacent to the recesses at substantially right angles to the central portion of the blank, stationary formers coacting with the twister formers for offsetting the looped formed ends, and kinkers for laterally bending the loop formed ends.

16. In a wire article forming machine of the class described, a main-shaft, a cam sleeve mounted on the main-shaft, means for rotating the cam sleeve, a feed operating cam secured to the cam shaft, shear operating cams secured to the cam shaft, feed rolls for advancing a length of wire into the machine, a clutch mechanism for controlling the rotation of the feed rolls, a yoke connected to the clutch mechanism and reciprocated by the feed operating cam to intermittently rotate the feed rolls to advance the wire to the machine, a coacting shear and die plate at opposite sides of the machine, a rock shaft actuated by the shear operating cams adapted to shear a fed length of wire in the machine to form a blank and simultaneously form a hook on each end of the blank, means for supporting the central portion of the blank, a plurality of coacting pairs of dies for forming each end portion of the blank in succession, and twister formers actuated in succession for bending the formed end portions at substantially right angles to the central portion of the blank.

17. In a wire article forming machine of the class described, means for feeding a length of wire to the machine intermittently, coacting shear and die plates adapted to shear the fed length of wire to form a blank and simultaneously form a hook at each end thereof, means for forming each end of the blank in succession, comprising means for forming a loop in the end portions of the blank, means for forming a recess between each loop formed end and the central portion, means for bending the formed end portions adjacent to the recesses at substantially right angles to the central portion of the blank, and means for automatically stopping the machine after a predetermined number of articles have been formed.

18. In a wire article forming machine of the class described, means for feeding a length of wire to the machine intermittently, coacting shear and die plates adapted to shear the fed length of wire to form a blank and form a hook on each end thereof, a plurality of coacting sets of dies for forming each end portion of the blank in succession, means for bending the formed end portions at substantially right angles to the central portion of the blank, means for ejecting the formed article from the machine, and means for automatically stopping the machine after a predetermined number of articles have been formed.

19. In a wire article forming machine of the class described, means for feeding a length of wire to the machine intermittently, coacting shear and die plates adapted to shear the fed length of wire to form a blank and simultaneously form a hook at each end thereof, bending dies for supporting the central portion of the blank, means for forming each end of the blank in succession, loop formers each adapted to form a loop in the end portion of the blank, between the hooked ends and the central portion, coacting dies for forming a recess between the formed looped end portions and the central portion, twister formers for bending the formed ends at right angles to the central portion of the blank, kinkers for bending the formed end portions laterally, a kickout plate adapted to eject the formed article from the machine, and a trip mechanism for automatically stopping the machine after forming a predetermined number of articles.

20. In a wire article forming machine of the class described, a main shaft, a cam sleeve mounted on the main shaft, a pair of loop forming cams keyed to the cam sleeve, a cam shaft carrying a roller for engaging each loop forming cam, a crank arm attached to one end of each cam shaft, a loop former support pivoted to each crank arm, a loop former attached to each loop former support, means for feeding a length of wire to the machine intermittently, coacting shear and die plates adapted to shear off the fed length of wire to form a blank and simultaneously form a hook at each end thereof, bending dies for supporting the central portion of the blank, means for rotating the loop forming cams to swing the loop formers into engagement with the blank between the hook formed ends and the central portion of the blank, coacting dies for forming a recess at opposite ends of the central portion of the blank, twister formers for bending the formed ends at right angles to the central portion of the blank, and means for automatically ejecting the formed article from the machine.

21. In a wire article forming machine of the class described, means for feeding a length of wire to the machine, shear plates for shearing off the length of wire, die plates coacting with the shear plates for simultaneously forming a hook at each end of the length of wire, coacting sets of dies actuated in sequence for independently forming each end portion of the length of wire, and means for forming the end portions of the length of wire in succession.

22. In a wire article forming machine of the class described, means for intermittently feeding a length of wire to the machine, means for shearing off the length of wire to form a blank and to simultaneously form a hook at each end of the blank, a plurality of sets of dies actuated in sequence for forming each end portion of the blank, and means for independently forming each end of the blank in succession.

23. In a wire article forming machine of the class described, coacting rolls for feeding a length of wire to the machine, a clutch adapted to control the rotary movement of the coacting rolls, a feed operating cam, means for rotating the feed operating cam, a reciprocating yoke carrying feed operating rollers near each end for engaging the feed operating cam, a connection between the reciprocating yoke and the clutch, means for shearing off the length of wire to form a blank and to simultaneously form a hook at each end of the blank, and means for forming each end of the blank in succession.

24. In a wire article forming machine of the class described, coacting rolls for feeding a length of wire to the machine, a clutch adapted to control the rotary movement of the coacting rolls, a feed operating cam, means for rotating the feed operating cam, a reciprocating yoke carrying feed operating roller near each end for engaging the feed operating cam, a rod having its opposite ends pivoted to the clutch and reciprocating yoke, means for adjusting the pivotal connection on the clutch to control the rotary movement of the coacting feed rolls, means for shearing off the length of wire to form a blank and to simultaneously form a hook at each end of the blank, and means for forming each end of the wire blank in succession.

25. In a wire article forming machine of the class described, coacting rolls for feeding a length of wire to the machine, a clutch adapted to control the rotary movement of the coacting rolls, a feed operating cam, means for rotating the feed operating cam, a reciprocating yoke carrying feed operating rollers near each end for engaging the feed operating cam, a feed adjusting plate secured to the clutch, a slideway formed in the adjusting plate, a slide in the slideway having a stub shaft projection, a rod having one end pivoted on the stub shaft and the opposite end pivoted to the reciprocating yoke, means for adjusting the slide to control the rotary movement of the coacting feed rolls, means for shearing off the length of wire to form a blank and to simultaneously form a hook at each end of the blank, and means for forming each end of the wire blank in succession.

26. In a wire article forming machine of the class described, coacting rolls for feeding a length of wire to the machine, means for adjusting the coacting rolls, a clutch adapted to limit the rotary movement of the coacting rolls, a feed operating cam, means for rotating the feed operating cam, a reciprocating yoke carrying feed operating rollers near each end for engaging the feed operating cam, a feed adjusting plate secured to the clutch, a dovetailed slideway formed in the adjusting plate, a slide in the dovetailed slideway having a stub shaft projection, a rod having one end pivoted on the stub shaft and the opposite end pivoted to the reciprocating yoke, a link having one end mounted on the stub shaft, a nut extending from the opposite end of the link, an adjusting screw rotatably secured to the feed adjusting plate and threaded into the nut adapted to adjust the slide and stub shaft to control the rotary movement of the coacting rolls, means for shearing off the length of wire to form a blank and to simultaneously form a hook at each end of the blank, and means for forming each end of the wire blank in succession.

27. In a wire article forming machine of the class described, means for feeding a length of wire to the machine, a shear plate, means for rotating the shear plate to cut off a length of wire to form a blank, a die plate coacting with the shear plate to form a hook on the cut end portion of the blank, a plunger having a projecting end portion adapted to be projected between the shear and die plate to advance the hooked end of the blank beyond the faces of the shear and die plates, means for reciprocating the plunger, and means for forming the end portions of the wire in sequence.

28. In a wire article forming machine of the class described, means for intermittently feeding a length of wire to the machine, a rock shaft, a sleeve connected to the rock shaft, a shear plate attached to the sleeve, cams for actuating the rock shaft to rotate the shear plate to cut off a length of wire to form a blank, a die plate coacting with the shear plate to form a hook at the end of the blank, a plunger having a projecting end portion mounted within the sleeve and reciprocated by the rotation of the rock shaft to advance the hooked end of the blank beyond the front faces of the shear and die plates, independently actuating means for the forward and backward stroke of the plunger, and means for forming the end portions of the blank in sequence.

29. In a wire article forming machine of the class described, means for intermittently feeding a length of wire to the machine, a front plate, a slideway formed in the front plate, a shear housing adjustably mounted in the slideway, a sleeve mounted in the shear housing, a shear plate attached to the sleeve, means for rotating the shear plate to cut off a length of wire to form a blank, a die plate coacting with the shear plate to form a hook at the end of the blank, a plunger having a projecting end portion mounted within the sleeve and reciprocated simultaneously with the rotation of the sleeve to advance the formed hooked end of the blank beyond the front faces of the shear and die plates, independently actuating means for the forward and backward stroke of the plunger, and a plurality of coacting sets of dies acting in sequence for forming the end portions of the blank.

30. In a wire article forming machine of the class described, means for intermittently feeding a length of wire to the machine, a front plate, a slideway formed in the front plate, a shear housing adjustably mounted in the slideway, a flanged sleeve mounted in the shear housing, means for rotating the flanged sleeve in opposite directions, a shear plate attached to the flange of the sleeve and movable therewith, means for rotating the sleeve in one direction to cut off a length of wire to form a blank, a die plate coacting with the shear plate adapted to form a hook at the end of the blank after the shearing operation, a cam surface formed on the inner face of the die plate, a plunger having a projecting end portion mounted within the sleeve and reciprocated simultaneously with the rotation of the sleeve, a cam surface on the front end of the projecting end portion of the plunger adapted to engage the cam surface on the inner face of the die plate for retracting the plunger during the shearing and hook forming operations, a ratchet wheel attached to the rear end of the plunger for engaging a ratchet plate for advancing the plunger when the flanged sleeve is rotated in the reverse direction to that for the shearing and hook forming operations to advance the formed hooked end of the blank beyond the front faces of the shear and die plates, and a plurality of coacting sets of dies acting in sequence for forming the end portions of the blank.

31. In a wire article forming machine of the class described, means for intermittently feeding a length of wire to the machine, a front plate, a slideway formed in the front plate, a shear housing adjustably mounted in the slideway, a sleeve mounted in the shear housing, a shear plate attached to the sleeve and movable therewith, a die plate attached to the shear housing, means for rotating the sleeve in one direction to cut off a length of wire to form a blank and adapted to coact with the die plate to form a hook at the end of the blank after the shearing operation, means for rotating the sleeve in the reverse direction to that for the shearing and hook forming operation, means operated by the reverse movement of the sleeve for advancing the hook formed end of the blank beyond the front faces of the shear and die plates, and a plurality of coacting sets of dies acting in sequence for forming the end portions of the blank.

32. In a wire article forming machine of the class described, means for intermittently feeding a length of wire to the machine, a front plate, a slideway formed in the front plate, a shear housing adjustably mounted in the slideway, a sleeve mounted in the shear housing, a shear plate attached to the sleeve, a die plate attached to the shear housing, a rock shaft connected to the sleeve, a cam for rotating the rock shaft and shear plate in one direction to cut off a length of wire to form a blank, said shear plate adapted to coact with the die plate to form a hook at the end of the blank, a cam for rotating the rock shaft in the reverse direction to that for the shearing and hook forming operations to advance the hook formed end of the blank beyond the front faces of the shear and die plates, and a plurality of coacting sets of dies acting in sequence for forming the end portions of the blank.

33. In a wire article forming machine of the class described, means for intermittently feeding a length of wire to the machine, a frame having a front plate extending laterally from opposite sides of the main body of the machine, a slideway formed in each extending portion of the front plate, a shear housing adjustably mounted in each slideway, a die plate attached to each shear housing, a sleeve mounted in each shear housing, a shear plate attached to each sleeve, a rock shaft mounted on the face plate, a crank arm on each end of the rock shaft, a crank arm on each sleeve, a pitman connection between the crank arm on each sleeve and one of the crank arms on the rock shaft, a cam adapted to rotate the rock shaft in one direction to shear the fed length of wire to form a blank and to coact with the die plates to form a hook at opposite ends of the blank, a cam adapted to rotate the rock shaft in the reverse direction to eject the hooked ends of the blank from between the shear and die plates, a plurality of coacting sets of dies acting in sequence for forming each end portion of the blank, and means for forming the opposite end portions of the blank in succession.

34. In a wire article forming machine of the class described, means for intermittently feeding a length of wire to the machine, a frame having a front plate extending laterally from the opposite sides of the main body of the machine, a slideway formed in each extending portion of the front plate, a shear housing adjustably mounted in each slideway, a die plate attached to each shear housing, a sleeve mounted in each shear housing, a shear plate secured to each sleeve, means for rotating the sleeve to shear the fed length of wire to form a blank and to coact with the die plates to form a hook at opposite ends of the blank, means for rotating the sleeve in the opposite direction to eject the hooked ends of the blank from between the shear and die plates, a plurality of coacting sets of dies acting in sequence for forming each end portion of the blank, and means for forming the opposite end portions of the blank in succession.

35. In a wire article forming machine of the class described, means for intermittently feeding a length of wire to the machine, coacting shear and die plates adapted to shear the fed wire into lengths to form blanks and to simultaneously form a hook on opposite ends of the blank, means for ejecting the hooked ends of the blank from between the shear and die plates, a plurality of coacting sets of dies acting in sequence for forming each end portion of the blank, and means for forming the opposite end portions of the blank in succession.

36. In a wire article forming machine of the class described, means for intermittently feeding a length of wire to the machine, a frame having a front plate extending laterally from opposite sides of the main body of the machine, a main shaft supported by the frame, a cam sleeve mounted on the main shaft, shear operating cams mounted on the cam sleeve, means for rotating the main shaft, a slideway formed in each extending portion of the front plate, a shear housing adjustably mounted in each slideway, a die plate secured to each shear housing, a cam surface formed on the inner face of each die plate, a sleeve mounted in each shear housing, a shear plate attached to each sleeve adapted to coact with the die plates to form a hook on each end of the fed length of wire, a bracket arm mounted on each shear housing, a plunger having a slide mounted to reciprocate within each sleeve, a projection extending from each plunger having a cam surface adapted to engage the cam surface on the inner faces of the die plates, a slideway formed in each sleeve for engaging the slide on the plungers, a rock shaft mounted on the front plate, having its ends journaled in the bracket arms mounted on the shear housings, a crank arm mounted on each shear housing, a crank arm mounted on each end of the rock shaft, an adjustable pitman connection between the crank arm on each sleeve and one of the crank arms on the rock shaft, a rotating ratchet wheel attached to each plunger, a stationary ratchet plate adapted to engage each ratchet wheel, a plurality of coacting sets of dies acting in sequence for forming each end portion of the blank, and means for forming the opposite end portions of the blank in succession.

37. In a wire article forming machine of the class described, means for intermittently feeding a length of wire to the machine, coacting shear and die plates adapted to shear the fed length of wire to form a blank and simultaneously form a hook at opposite ends of the blank, bending dies for supporting the central portion of the blank, a swinging guiding arm at opposite sides of the machine, guiding channels in the swinging guiding arms for supporting the end portions of the blank, swinging loop formers adapted to engage the swinging guiding arms and draw the end portions of the wire from the channels, an anvil adapted to coact with the swinging loop formers to form loops in the end portions of the blank, means for bending the wire to form a recess at opposite ends of the central portion of the blank, and means for bending the formed end portions adjacent to the recesses at right angles to the central portion of the blank.

38. In a wire article forming machine of the class described, means for intermittently feeding a length of wire to the machine, shear plates adapted to cut off the fed length of wire to form a blank and to coact with die plates to form a hook simultaneously at opposite ends of the blank, bending dies for supporting the central portion of the blank, swinging guiding arms having guiding channels formed therein for supporting the end portions of the blank, movable loop formers adapted to engage the swinging guiding arms in succession and draw the end portions of the wire from the guiding channels, an anvil adapted to coact with the movable loop formers to form loops in the end portions of the blank, means for bending the wire to form a recess at opposite ends of the central portion of the blank, means for bending in succession the formed end portions adjacent to the recesses at right angles to the central portion of the blank, and means for offsetting the formed looped end portions.

39. In a wire article forming machine of the class described, means for intermittently feeding a length of wire to the machine, shear plates adapted to cut off the fed length of wire to form a blank and to coact with die plates to form a hook simultaneously at opposite ends of the blank, stationary means for supporting the central portion of the blank, movable means for supporting the end portions of the blank, an anvil, movable loop formers operated in succession adapted to engage the end portions of the blank and to coact with the anvil to form a loop in each end portion, dies for bending the wire to form a recess at opposite ends of the central portion of the blank, means for bending the looped formed end portions adjacent to the recesses at right angles to the central portion of the blank, and means for offsetting the formed looped ends.

40. In a wire article forming machine of the class described, means for intermittently feeding a length of wire to the machine, shear plates adapted to cut off the fed length of wire to form a blank and to coact with die plates to form a hook simultaneously at opposite ends of the blank, bending dies for supporting the central portion of the blank, a swinging guiding arm for supporting each end of the blank, an anvil mounted for rocking movement in opposite directions, swinging loop formers adapted to be operated in succession to engage the end portions of the blank and to coact with the anvil to form a loop in each end portion, a rotary die coacting with a twister horn adjacent to each end of the central portion of the blank adapted to bend the wire to form recesses, twister formers coacting with stationary formers for bending the formed looped ends at right angles to the central portion of the blank and to offset the looped ends, and kinkers for bending the looped ends laterally.

41. In a wire article forming machine of the class described, means for feeding a length of wire to the machine, means for shearing off the length of wire to form a blank, means for forming a hook at each end of the blank, stationary means for supporting the central portion of the blank, movable means for supporting the end portions of the blank, a main shaft, a cam sleeve mounted on the main shaft, loop forming cams secured to the cam sleeve, cam shafts each carrying a roller for engaging each loop forming cam, a crank arm secured to one end of each cam shaft, a loop former connected to each crank arm, means for rotating the cam sleeve to bring the loop forming cams into engagement with the rollers on the cam shaft in succession to swing the loop formers into engagement with the end portions of the blank to form loops, means for bending the ends of the central portion of the blank to form recesses, and means for bending the formed end portions adjacent to the recesses at right angles to the central portion of the blank.

42. In a wire article forming machine of the class described, means for intermittently feeding a length of wire to the machine, shear plates and coacting die plates adapted to cut off and bend the ends of the fed length of wire and to form a blank with hooked ends, bending dies for supporting the central portion of the blank, swinging guiding arms for supporting the end portions of the blank, a main shaft, a cam sleeve mounted on the main shaft, loop forming cams secured to the cam sleeve, a cam shaft carrying a roller for engaging each loop forming cam, a crank arm secured to one end of each cam shaft, a loop former support pivoted to each crank arm, a loop former secured to each loop former support, means for rotating the cam sleeve to bring the loop forming cams into engagement with the rollers on the cam shaft in succession to rotate the cam shafts and swing the loop formers into engagement with the end portions of the blank to form loops therein, coacting dies for bending the ends of the central portion of the blank to form recesses, coacting dies for crimping the wire between each recess and the loop formed end, and coacting dies for bending the formed end portions adjacent to the recesses at right angles to the central portion of the blank.

43. In a wire article forming machine of the class described, means for intermittently feeding a length of wire to the machine, shear plates and coacting die plates adapted to cut off the fed length of wire and form a blank with hooked ends, bending dies each having an offset end portion adapted to support the central portion of the blank, swinging guiding arms for supporting the end portions of the blank, a main shaft, loop forming cams secured to the cam sleeve, a cam shaft carrying a roller for engaging each loop forming cam, a crank arm secured to one end of each cam shaft, a loop former support pivoted to each crank arm, a loop former secured to each loop former support, means for rotating the cam sleeve to bring the loop forming cams into engagement with the rollers on the cam shafts in succession to rotate the cam shafts in one direction to swing the loop formers into engagement with the end portions of the blank to form loops therein, independent means for rotating the cam shafts to swing the loop formers in the opposite direction to that for the loop forming operation, coacting dies for bending the ends of the central portion of the blank to form recesses, coacting dies for crimping the wire between each recess and the loop formed end, and coacting dies for bending the formed end portions adjacent to the recesses at right angles to the central portion of the blank.

44. In a wire article forming machine of the class described, means for intermittently feeding a length of wire to the machine, shear plates and coacting die plates adapted to cut off the fed length of wire and form a blank with hooked ends, bending dies each having an offset end portion adapted to support the central portion of the blank, swinging guiding arms for supporting the end portions of the blank, a main shaft, loop forming cams secured to the cam sleeve, a cam shaft carrying a roller for engaging each loop forming cam, a crank arm secured to one end of each cam shaft, a loop former support pivoted to each crank arm, a loop former secured to each loop former support, means for rotating the cam sleeve to bring the loop forming cams into engagement with the rollers on the cam shafts in succession to rotate the cam shafts in one direction to swing the loop formers into engagement with the end portions of the blank to form loops therein, an eccentric cam sheave attached to the opposite end of each cam shaft to that of the crank arm, a cable connecting the eccentric cam sheaves, a sheave weight on the cable adapted to rotate the cam shafts to swing the loop formers in the opposite direction to that for the loop forming operation, coacting dies for bending the ends of the central portion of the blank to form U-shaped recesses, coacting dies for crimping the wire between each recess and the loop formed end, and coacting dies for bending the formed end portions adjacent to the recesses at right angles to the central portion of the blank.

45. In a wire article forming machine of the class described, means for intermittently feeding a length of wire to the machine, shear plates and coacting die plates adapted to cut off the fed length of wire and form a blank with hooked ends, bending dies each having an offset end portion adapted to support the central portion of the blank, swinging guiding arms for supporting the end portions of the blank, a main shaft, loop forming cams secured to the cam sleeve, a cam shaft carrying a roller for engaging each loop forming cam, a crank arm secured to the outer end of each cam shaft, a loop former support pivoted to each crank arm, a resilient connection between each loop former support and the crank arm, a shoulder on each loop former support for engaging the crank arm to limit its movement, a loop former adjustably secured to each loop former support, means for rotating the cam sleeve to bring the loop forming cams into engagement with the rollers on the cam shaft in succession to rotate the cam shafts in one direction to swing the loop formers into engagement with the end portions of the blank to form loops therein, an eccentric cam sheave attached to the rear end of each cam shaft, a flexible connection between the eccentric cam sheaves, a sheave weight supported on the flexible connection adapted to rotate the cam shafts to swing the loop formers in the opposite direction to that for the loop forming operation, pivotal levers for guiding the sheave weight, coacting dies for bending the ends of the central portion of the blank to form U-shaped recesses, coacting dies for crimping the wire between each recess and the loop formed end, coacting dies for bending the formed end portions adjacent to the recesses at right angles to the central portion of the blank and offset the loop formed ends, and kinkers for bending the loops laterally.

46. In a wire article forming machine of the class described, means for feeding a length of wire to the machine, means for cutting off the fed length of wire to form a blank, means for supporting the central and end portions of the blank, means for forming the end portions of the blank in succession, a twister horn attached to the machine adjacent to each end of the central portion of the blank, a recess forming die adjacent to each twister horn having a projection adapted to coact with the twister horns to form a recess between the central and formed end portions of the blank, and twister formers for bending the formed end portions at right angles to the central portion of the blank.

47. In a wire article forming machine of the class described, means for feeding a length of wire to the machine, means for cutting off the fed length of wire to form a blank and to simultaneously form a hook at each end of the blank, independent means for supporting the central and end portions of the blank, means for forming the blank in sequence and in succession, a twister horn attached to the machine adjacent to each end of the central portion of the blank, a recess forming die mounted adjacent to each twister horn each having a projection adapted to coact with the twister horns to form a recess between the central and formed end portions of the blank, a plunger for rotating each recess forming die, independent means for advancing and retracting the plungers, and means for bending the formed end portions adjacent to the recesses at right angles to the central portion of the blank.

48. In a wire article forming machine of the class described, means for intermittently feeding a length of wire to the machine, means for cutting the fed length of wire to form a blank and to simultaneously bend the ends of said blank into hook form, means for independently supporting the central and end portions of the blank, means for forming a loop in each end portion of the blank, a twister horn attached to the machine adjacent to each end of the central portion of the blank, a recess forming die mounted adjacent to each twister horn each having a projection adapted to coact with the twister horns to form a U-shaped recess between the central and loop formed end portions of the blank, a plunger for rotating each recess forming die, independent means for advancing and retracting the plungers, means for bending the formed end portions adjacent to the recesses at right angles to the central portion of the blank, and kinkers actuated by the movement of the plungers for bending the loop formed ends laterally.

49. In a wire article forming machine of the class described, means for intermittently feeding a length of wire to the machine, means for cutting the fed length of wire to form a blank and to simultaneously bend the ends of said blank into hook form, means for independently supporting the central and end portions of the blank, means for forming a loop in each end portion of the blank, a twister horn attached to the machine adjacent to each end of the central portion of the blank, a top twister block, a pinion journaled in the top twister block adjacent to each twister horn, a recess forming die secured to each pinion having a projection adapted to coact with the twister horns to form a recess between the central and each loop formed end portion of the blank, a plunger having a rack for meshing with each pinion, independent means for advancing and retracting the plungers, and means for bending the formed end portions adjacent to the recesses at right angles to the central portion of the blank.

50. In a wire article forming machine of the class described, means for intermittently feeding a length of wire to the machine, means for cutting off the fed length of wire to form a blank and to simultaneously bend the ends of said blank into hook form, means for independently supporting the central and end portions of the blank, means for forming a loop in each end portion of the blank, a twister horn attached to the machine adjacent to each end of the central portion of the blank, a top twister block, a pinion journaled in the top twister block adjacent to each twister horn, a recess forming die secured to each pinion having a projection adapted to coact with the twister horns to form a recess between the central and each loop formed end portion of the blank, reciprocating plungers each having a rack for meshing with one of the pinions, cam actuating means for one stroke of the plungers, resiliently actuating means for the other stroke of the plungers, means for bending the formed end portions adjacent to the recesses at right angles to the central portion of the blank, and kinkers actuated by the movement of the plungers for bending the loop formed ends laterally.

51. In a wire article forming machine of the class described, means for intermittently feeding a length of wire to the machine, means for cutting off the fed length of wire to form a blank and to simultaneously bend the ends of said blank into hook form, means for independently supporting the central and end portions of the blank, means for forming a loop in each end portion of the blank, a twister horn attached to the machine adjacent to each end of the central portion of the blank, a top twister block, a pinion journaled in the top twister block adjacent to each twister horn, a recess forming die secured to each pinion each having a projection adapted to coact with the twister horns to form a U-shaped recess between the central and each loop formed end portion of the block, plungers mounted to reciprocate in the top twisted block each having a rack for meshing with one of the pinions, cams adapted to advance the plungers in forming the U-shaped recesses, lever connections between the plungers, resilient means acting on the levers for retracting the plungers, means for bending the formed end portions adjacent to the recesses at right angles to the central portion of the blank, and a kinker connected to each of the plungers and actuated by the movement of the plungers for bending the loop formed ends laterally.

52. In a wire article forming machine of the class described, a frame, a main shaft mounted on the frame, a cam sleeve mounted on the main shaft, a top twister block mounted on the frame, means for intermittently feeding a length of wire to the machine, means for cutting off the fed length of wire to form a blank and simultaneously bend the ends of said blank into hook form, means for forming a loop in each end portion of the blank, a supporting bracket attached to the top twister block, a twister horn attached to the supporting bracket adjacent to each end of the central portion of the blank, a pinion journaled in the top twister block adjacent to each twister horn, a recess forming die secured to each pinion having a projection adapted to coact with the twister horns to form a U-shaped recess between the central and each loop formed end portion of the blank, plungers mounted to reciprocate in the top twister block each having a rack for meshing with one of the pinions, a cam disk secured to the cam sleeve, cams adjustably secured to the cam disk, a roller carried by each plunger, means for rotating the cam sleeve to bring the rollers intermittently into engagement with the cams to advance the plungers, levers connecting the plungers, and resilient means acting on the levers adapted to retract the plungers.

53. In a wire article forming machine of the class described, means for feeding a length of wire to the machine, means for cutting off the fed length of wire to form a blank and to simultaneously bend the ends of the said blank to form hooks, means for independently supporting the central and end portions of the blank, a twister horn attached to the machine adjacent to each end of the central portion of the blank, recess forming dies adapted to coact with the twister horns, a plunger for actuating each recess forming die adapted to be advanced by cam action to bend the wire into U-shaped recesses on the twister horns, resiliently actuated means for retracting the plunger, means for bending and offsetting the formed end portions adjacent to the recesses at right angles to the central portion of the blank, and means for bending the loop formed ends laterally.

54. In a wire article forming machine of the class described, means for intermittently feeding a length of wire to the machine, coacting shear and die plates adapted to shear the fed length of wire to form a blank and bend the ends of said blank into hook form, means for supporting the central and end portions of the blank independently, a plurality of sets of coacting dies for forming each end portion of the blank in sequence, and means for forming one of said end portions in succession to the opposite end portion of the blank.

55. In a wire article forming machine of the class described, coacting rolls for intermittently feeding a length of wire to the machine, a coacting shear and die plate at opposite sides of the machine adapted to shear the fed length of wire to form a blank and simultaneously bend the ends of said blank into hook form, bending dies for supporting the central portion of the blank, a swinging guiding arm for supporting each end portion of the blank, loop formers adapted to engage the end portions of the blank supported by the swinging guiding arms and form loops therein, a plurality of sets of dies for forming the blank between the central portion of the blank and the formed loops, coacting means for forming each end portion in sequence, and means for forming the opposite end portions in succession.

56. In a wire article forming machine of the class described, means for intermittently feeding a length of wire to the machine, means for cutting off the fed length of wire to form a blank and to simultaneously bend the ends of said blank into hook form, means for independently supporting the central and end portions of the blank, means for bending each end portion of the blank into loop form, means for forming crimps in the wire between the central portion and the loop formed ends, means for forming a recess at the ends of the central portion of the blank, a bottom twister block, twisters journaled in the bottom twister block, toothed portions formed on each twister, a plunger for each twister each having a rack meshing with the toothed portion of the twister, a twister former carried by each twister and means for reciprocating the plungers to rotate the twisters and formers to bend the formed end portions at right angles to the central portion of the blank.

57. In a wire article forming machine of the class described, means for intermittently feeding a length of wire to the machine, means for cutting off the fed length of wire to form a blank, means for supporting the central and end portions of the blank, means for forming the end portions of the blank, a bottom twister block, twisters each having a toothed portion journaled in the bottom twister block, a plunger for rotating each twister, a rack on each plunger for meshing with the toothed portion of each twister, an arm extending from each twister, a twister former mounted on each twister for engaging the formed end portions, and means for reciprocating the plungers to rotate the twisters to bend the end portions at right angles to the central portion of the blank.

58. In a wire article forming machine of the class described, means for intermittently feeding a length of wire to the machine, means for cutting off the fed length of wire to form a blank, means for supporting the central and end portions of the blank independently, means for forming the end portions of the blank, a bottom twister block, twisters each having a toothed portion journaled in the bottom twister block, a plunger for rotating each twister, a rack on each plunger for meshing with the toothed portions of the twisters, an arm extending from the top of each twister, a twister former having a projection mounted on the arm of each twister for engaging the formed end portions, a stationary former having a projection coacting with each twister former, cams adapted to advance the plungers to rotate the twisters to bend the formed end portions at right angles to the central portion of the blank, and resilient means for retracting the plungers.

59. In a wire article forming machine of the class described, means for intermittently feeding a length of wire to the machine, means for cutting off the fed length of wire to form a blank, means for supporting the central and end portions of the blank independently, coacting shear and die plates adapted to cut off the length of wire to form a blank and simultaneously form hooks at the ends thereof, means for forming loops in the end portions, means for forming a recess between the central portion of the blank and each looped end, a bottom twister block, a pair of twisters each having a toothed portion journaled in the bottom twister block, a reciprocating plunger for rotating each twister having a rack for meshing with the toothed portion on the twister, a twister former mounted on each twister, cam actuating means for one stroke of the plunger to rotate the twister and former to bend the formed ends at right angles to the central portion of the blank, and spring actuating means for the return stroke of the plungers.

60. In a wire article forming machine of the class described, means for intermittently feeding a length of wire to the machine, means for cutting the wire into lengths to form blanks and to simultaneously form a hook at each end of the said blanks, means for forming loops in the end portions of the blank, means for forming a recess between the central portion of the blank and each loop formed end, a bottom twister block, a pair of twisters having their lower end portions journaled in the bottom twister block, a toothed portion formed on the twisters between the journal bearings, a bearing for supporting the upper portions of the twisters, a twister former having a head and a projection secured to the upper end of each twister, a stationary former adapted to coact with each twister former, a plunger for rotating each twister, a rack on each plunger for meshing with the toothed portion of each twister, rotating cams for advancing each plunger adapted to rotate the twisters and formers to bend the formed end portions of the blank at right angles to the central portion of the blank and offset the looped ends between the projections on the stationary and twister formers, a lever connection between the plungers, and a spring coacting on the lever to retract the plungers.

61. In a wire article forming machine of the class described, means for intermittently feeding a length of wire to the machine, means for cutting off the fed length of wire to form a blank and to simultaneously bend the ends of said blank into hook form, means for independently supporting the central and end portions of the blank, dies arranged to form the end portions of the blank into a predetermined shape, and twister formers adapted to bend the formed ends at right angles to the central portion of the blank.

62. In a wire article forming machine of the class described, means for intermittently feeding a length of wire to the machine, means for cutting off the fed length of wire to form a blank and to simultaneously bend the ends of said blank into hook form, means for independently supporting the central and end portions of the blank, a plurality of pairs of coacting forming dies arranged to form the end portions of the blank into a predetermined shape, and movable twister formers coacting with stationary formers adapted to offset and bend the formed ends at right angles to the central portion of the blank.

63. In a wire article forming machine of the class described, means for intermittently feeding a length of wire to the machine, means for cutting off the fed length of wire to form a blank and simultaneously bend the ends of the blank into hook form, means for independently supporting the central and end portions of the blank, a plurality of pairs of coacting forming dies arranged to form the end portions of the blank into a predetermined shape, a bottom twister block, twisters journaled in the bottom twister block, a twister former secured to each twister, and means for rotating the twisters in succession to bend the formed ends at right angles to the central portion of the blank.

64. In a wire article forming machine of the class described, means for intermittently feeding a length of wire to the machine, means for cutting off the fed length of wire to form a blank and simultaneously bend the ends of the blank into hook form, means for independently supporting the central and end portions of the blank, a plurality of pairs of coacting forming dies arranged to form the end portions of the blank into a predetermined shape, a bottom twister block, twisters having toothed portions journaled in the bottom twister block, a twister former secured to each twister, reciprocating plungers each carrying a roller mounted in the bottom twister block for actuating the twisters, said plungers each having a rack meshing with the toothed portion of one of the twisters, rotating cams each adapted to engage a roller for the working strokes of the plungers adapted to rotate the twisters and formers to offset and bend the formed ends at right angles to the central portion of the blank, and resilient means for the reverse stroke of the plungers.

65. In a wire article forming machine of the class described, means for intermittently feeding a length of wire to the machine, means for cutting off the fed length of wire to form a blank and simultaneously bend the ends of the blank into hook form, means for independently supporting the central and end portions of the blank, a plurality of pairs of coacting forming dies arranged to form the end portions of the blank into a predetermined shape, a bottom twister block, a pair of twisters each having a toothed portion journaled in the bottom twister block, a twister former secured to each twister, a reciprocating plunger mounted in the bottom twister block for actuating each twister, each having a rack meshing with the toothed portion of the twister, a roller carried by each plunger for engaging a rotating cam for the working stroke of each plunger adapted to rotate the twisters and formers in succession to offset and bend the formed ends at right angles to the central portion of the blank, a lever connection between the plungers, and resilient means acting on the lever for the reverse stroke of the plungers.

66. In a wire article forming machine of the class described, means for intermittently feeding a length of wire to the machine, means for cutting off the fed length of wire to form a blank and to simultaneously bend the ends of said blank into hook form, means for independently supporting the central and end portions of the blank, a plurality of pairs of coacting forming dies arranged to form the end portions of the blank into a predetermined shape in the same plane as the central portion of the blank, a bottom twister block, a pair of twisters having toothed portions journaled in the bottom twister block, a twister former secured to each twister, reciprocating plungers each carrying a roller mounted in the bottom twister block, a rack formed on each plunger for meshing with one of the toothed portions of the twisters, a twister horn having a pintle projection secured to the machine adjacent to each twister former, a rotating cam adapted to engage rollers for the working stroke of the plungers for rotating the twisters and formers to twist the wire on the pintle projections and offset and bend the formed ends at right angles to the central portion of the blank, a socket at the end of each plunger, levers having tubular sleeves at the ends of the levers engaging the sockets, and a spring acting on the central portion of the levers for the reverse stroke of the plungers.

67. In a wire article forming machine of the class described, means for intermittently feeding a length of wire to the machine, shear plates and coacting die plates adapted to cut off the fed length of wire to form a blank and to simultaneously bend the ends of said blank into hook form, means for independently supporting the central and end portions of the blank, a plurality of pairs of coacting forming dies arranged to form the end portions of the blank into a predetermined shape, twister formers adapted to bend the formed end portions at right angles to the central portion of the blank, a top twister block, a pair of reciprocating plungers mounted in the top twister block, a bracket secured to each plunger, a flange extending from each bracket, and a kinker pivotally connected to each bracket and actuated by the movement of the plungers to laterally bend the formed end portions.

68. In a wire article forming machine of the class described, means for intermittently feeding a length of wire to the machine, shear plates and coacting die plates adapted to cut off the fed length of wire to form a blank and to simultaneously bend the ends of said blank into hook form, means for independently supporting the central and end portions of the blank, a plurality of pairs of coacting forming dies arranged to form the end portions of the blank in succession into a predetermined shape in the same plane as the central portion of the blank, twister formers adapted to bend the formed end portions at right angles to the central portion of the blank, a top twister block, a pair of reciprocating plungers mounted in the twister block, a bracket secured to each plunger, a flange extending from each bracket, a kinker pivotally connected to each bracket and actuated in succession by the movement of the plungers to laterally bend the formed end portions, and means for automatically ejecting the formed wire article from the machine.

69. In a wire article forming machine of the class described, means for intermittently feeding a length of wire to the machine, shear plates and coacting die plates adapted to cut off the fed length of wire to form a blank and to simultaneously bend the ends of said blank into hook form, means for independently supporting the central and end portions of the blank, a plurality of pairs of coacting forming dies arranged to form the end portions of the blank into a predetermined shape, twister formers adapted to bend the formed end portions at right angles to the central portion of the blank, a frame, a main shaft supported in the frame, a cam sleeve mounted on the main shaft, a cam disk secured to the cam sleeve, a cam on the cam disk, a top twister block attached to the frame, a slideway formed therein, a reciprocating kickout plate mounted in the slideway, a kickout lever having its central portion pivotally attached on the frame, a roller mounted on one end of the kickout lever for engaging the cam on the cam disk, a pivoted connection between the opposite end of the kickout lever and the kickout plate, means for rotating the cam disk for ejecting the formed article from the machine, and resilient means for the return movement of the kickout plate.

70. In a wire article forming machine of the class described, a frame, a main shaft supported by the frame, a cam sleeve mounted on the main shaft, means for rotating the cam sleeve, means for intermittently feeding a length of wire to the machine to form a blank, means for supporting the central and end portions of the blank, a plurality of pairs of dies arranged to form the end portions of the blank into a predetermined shape, a plurality of cams carried by the cam sleeve adapted to close the pairs of dies, a clutch mounted on the cam sleeve, and means controlled by the rotation of the cam sleeve for throwing the clutch out of engagement to stop the machine after a predetermined number of rotations of said cam sleeve.

71. In a wire article forming machine of the class described, a frame, a main shaft supported by the frame, a cam sleeve mounted on the main shaft, means for intermittently feeding a length of wire to the machine to form a blank, means for supporting the central and end portions of the blank, a plurality of pairs of dies arranged to form the end portions of the blank into a predetermined shape, a plurality of cams carried by the cam sleeve each adapted to close a pair of dies, a clutch member secured to the cam sleeve, clutch jaws attached to the clutch member, a clutch spider having openings formed therein mounted to rotate with or on the cam sleeve, a clutch ring mounted on the clutch spider and adapted to rotate therewith, jaw studs secured to the clutch ring adapted to exend through the openings in the clutch spider to engage the clutch jaws on the clutch member, and means actuated by the number of rotations of the cam sleeve for automatically reciprocating the clutch ring on the clutch spider to throw the jaw studs out of engagement with the clutch jaws on the clutch member.

72. In a wire article forming machine of the class described, a frame, a main shaft supported by the frame, a cam sleeve mounted on the main shaft, means for rotating the cam sleeve, a plurality of cams secured to the cam sleeve for actuating the wire feeding, shearing, forming and ejecting mechanism, a clutch member secured to the cam sleeve, clutch jaws attached to the clutch member, a clutch spider having openings formed therein mounted to rotate with or on the cam sleeve, a clutch ring mounted on the clutch spider and adapted to rotate therewith, jaw studs secured to the clutch ring adapted to extend through the openings in the clutch spider to engage the clutch jaws on the clutch member, a trunnion ring mounted on the clutch ring, clutch yoke arms on each side of the trunnion ring having one of their ends pivoted to the frame, a trunnion extending from opposite sides of the trunnion ring and pivoted in the clutch yoke arms at an intermediate point, and a cam actuated by the rotation of the cam sleeve for swinging the other end of each clutch yoke arm to that pivoted to the frame for automatically reciprocating the clutch ring on the clutch spider to throw the jaw studs out of engagement with the clutch jaws on the clutch member.

73. In a wire article forming machine of the class described, a frame, a main shaft supported by the frame, a cam sleeve mounted on the main shaft, a plurality of cams secured to the cam sleeve for actuating the wire feeding, shearing, forming and ejecting mechanism, a clutch member secured to the cam sleeve, clutch jaws attached to the clutch member, a clutch spider having openings formed therein mounted to rotate on the cam sleeve, a gear wheel secured to the clutch spider, a driving pinion meshing with the gear, a clutch ring mounted on the clutch spider and adapted to rotate therewith, jaw studs secured to the clutch ring adapted to extend through the openings in the clutch spider to engage the clutch jaws on the clutch member, and means for throwing the clutch jaws into or out of engagement with each other.

74. In a wire article forming machine of the class described, a frame, a main shaft supported by the frame, a cam sleeve mounted on the main shaft, a plurality of cams secured to the cam sleeve for actuating the wire feeding, shearing, forming and ejecting mechanism, a clutch member secured to the cam sleeve, clutch jaws attached to the clutch member, a clutch spider having openings formed therein mounted to rotate on the cam sleeve, a gear wheel secured to the clutch spider, a driving pinion meshing with the gear, means for rotating the driving pinion to rotate the clutch spider, a clutch ring mounted on the clutch spider and adapted to rotate therewith, jaw studs secured to the clutch ring adapted to extend through the openings in the clutch spider to engage the clutch jaws on the clutch member, means for throwing the clutch jaws into engagement to rotate the cam sleeve, and means actuated by the rotation of the cam sleeve for automatically throwing the clutch jaws out of engagement with each other to stop the rotation of the cam sleeve.

75. In a wire article forming machine of the class described, a frame, a main shaft supported by the frame, a cam sleeve mounted on the main shaft, a plurality of cams secured to the cam sleeve for actuating the wire feeding, shearing, forming and ejecting mechanism, a clutch member secured to the cam sleeve, clutch jaws secured to the clutch member, a clutch ring slidably mounted in relation to the cam sleeve, jaw studs secured to the clutch ring, means for rotating the clutch ring on the cam sleeve, means for throwing the jaws of the studs secured to the clutch ring into engagement with the jaws on the clutch member to rotate the cam sleeve, and means actuated by the rotation of the cam sleeve for automatically throwing the said clutch jaws out of engagement with each other to stop the rotation of the cam sleeve.

76. In a wire article forming machine of the class described, a frame, a main shaft supported by the frame, a cam sleeve mounted on the main shaft, a plurality of cams secured to the cam sleeve for actuating the wire feeding, shearing, forming and ejecting mechanism, a clutch member secured to the cam sleeve, clutch jaws secured to the clutch member, a clutch spider having openings formed therein mounted on the cam sleeve, a gear wheel secured to the clutch spider, a driving pinion meshing with the gear, means for rotating the pinion to rotate the clutch spider, a clutch ring mounted on the clutch spider and adapted to rotate therewith, jaw studs secured to the clutch ring adapted to extend through the openings in the clutch spider to engage the clutch jaws on the clutch member, a trunnion ring mounted on the clutch ring, a trunnion extending from opposite sides of the trunnion ring, a clutch yoke arm on each side of the trunnion ring pivoted at an intermediate point on the trunnions, a bracket for pivotally supporting one of the ends of the clutch yoke arms to the frame and manually operated means for swinging the opposite movable ends of the clutch yoke arms in one direction to throw the coacting clutch jaws into engagement to rotate the cam sleeve, and means actuated by the rotation of the cam sleeve for automatically swinging the movable ends of the clutch yoke arms in the reverse direction to throw the said clutch jaws out of engagement with each other to stop the rotation of the cam sleeve.

77. In a wire article forming machine of the class described, a frame, a main shaft supported by the frame, a cam sleeve mounted on the main shaft, a plurality of cams secured to the cam sleeve for actuating the wire feeding, shearing, forming and ejecting mechanism, a clutch member having jaws secured to the cam sleeve, a clutch ring having jaws adapted for rotation on the cam sleeve, means for continuously rotating the clutch ring, means for reciprocating the clutch ring on the cam sleeve to throw the jaws carried thereby into or out of engagement with the jaws on the clutch member, and means actuated by the rotation of the cam sleeve to automatically throw the jaws carried by the clutch ring out of engagement with the jaws carried by the clutch member.

78. In a wire article forming machine of the class described, a frame, a main shaft supported by the frame, a cam sleeve mounted on the main shaft, a plurality of cams secured to the cam sleeve for actuating the wire feeding, shearing, forming and ejecting mechanism, a clutch member provided with jaws secured to the cam sleeve, a clutch ring provided with jaws mounted for rotation on the cam sleeve, means for rotating the clutch ring, a pedal connected through mechanism to the clutch ring, and means when the pedal is raised or depressed for reciprocating the clutch ring to throw the jaws of the clutch ring into or out of engagement with the jaws of the clutch member.

79. In a wire article forming machine of the class described, a frame, a main shaft supported by the frame, a cam sleeve mounted on the main shaft, a plurality of cams secured to the cam sleeve for actuating the wire feeding, shearing, forming and ejecting mechanism, a clutch member provided with jaws secured to the cam sleeve, a clutch ring provided with jaws mounted for rotation and reciprocation on the cam sleeve, a pedal connected through mechanism to the clutch ring, means for raising the pedal to throw the clutch into engagement, a catch for holding the pedal in the raised position, means adapted for releasing the catch and depressing the pedal to throw the clutch out of engagement.

80. In a wire article forming machine of the class described, a frame, a main shaft supported by the frame, a cam sleeve mounted on the main shaft, a plurality of cams secured to the cam sleeve for actuating the wire feeding, shearing, forming and ejecting mechanism, a clutch member provided with jaws secured to the cam sleeve, a clutch ring provided with jaws mounted for rotation and reciprocation on the cam sleeve, a front plate, a setting pedal and an operating pedal connected through mechanism to the clutch ring adapted to throw the clutch into or out of engagement, a catch adapted to engage the front plate for holding the operating pedal in the raised position, a latch dog pivoted to the front plate adapted to be thrown into or out of the path of the catch, and an equalizing link connecting the setting pedal with the operating pedal adapted to raise one pedal when the other is depressed.

81. In a wire article forming machine of the class described, a frame, a main shaft supported by the frame, a cam sleeve mounted on the main shaft, a plurality of cams secured to the cam sleeve for actuating the wire feeding, shearing, forming and ejecting mechanism, a clutch member provided with jaws secured to the cam sleeve, a clutch spider mounted to rotate on the cam sleeve, a clutch ring slidably mounted on the clutch spider provided with jaws adapted to engage the jaws on the clutch member, a trunnion ring mounted on the clutch ring, means for rotating the clutch spider thereby rotating the clutch ring within the trunnion ring, a trunnion extending outwardly from opposite sides of the trunnion ring, clutch yoke arms pivoted at an intermediate point on the trunnions, means for pivoting one end of the clutch yoke arms to the frame, a trip shaft journaled in bearings mounted on the frame, toggle links for connecting the opposite end of the clutch yoke arms to the trip shaft, a spring adapted to assist in flexing each of the toggle links, a slotted intermittent transmission disk having its axle journaled in the frame, a roller carried by the cam sleeve adapted to engage one of the slots formed in the intermittent transmission disk to turn it a partial revolution for each rotation of the cam sleeve, a stop cam secured to the axle of the intermittent transmission disk, means mounted on the trip shaft adapted to engage the stop cam to throw the clutch out of engagement.

82. In a wire article forming machine of the class described, a frame, a main shaft supported by the frame, a cam sleeve mounted on the main shaft, means for rotating the cam sleeve, a plurality of cams mounted on and secured to the cam sleeve for actuating the wire feeding, shearing, forming and ejecting mechanism, a clutch member provided with jaws secured to the cam sleeve, a clutch ring provided with jaws adapted to rotate on the cam sleeve, pedals adapted to be manually operated for throwing the jaws of the clutch ring into or out of engagement with the jaws of the clutch member, and means actuated by the rotation of the cam sleeve for automatically throwing the jaws of the clutch ring out of engagement with the jaws of the clutch member.

83. In a wire article forming machine of the class described, a frame, a main shaft supported by the frame, a cam sleeve mounted on the main shaft, a plurality of cams mounted on and secured to the came sleeve for actuating the wire feeding, shearing, forming and ejecting mechanism, a clutch member provided with jaws secured to the cam sleeve, a clutch spider having openings formed therein mounted to rotate on the cam sleeve, means for rotating the clutch spider, a clutch ring slidably mounted on the clutch spider and adapted to rotate therewith, jaw studs secured to the clutch ring and adapted to extend through the openings in the clutch spider to engage the jaws on the clutch member, a trunnion ring mounted on the clutch ring, means for rotating the clutch spider thereby rotating the trunnion ring, a trunnion extending outwardly from opposite sides of the trunnion ring, a clutch yoke arm pivoted at an intermediate point on each of the trunnions, means for pivoting one end of the clutch yoke arms to the frame, a trip shaft journaled in bearings mounted on the frame, toggle links for connecting the opposite end of the clutch yoke arms to the trip shaft, a trip bracket secured to the trip shaft, a plunger slidably mounted in the trip bracket, a trip roller mounted on the plunger, a stop cam having its axle journaled in the frame adapted to engage the trip roller and rotate the trip shaft and throw the clutch jaws out of engagement, an intermittent transmission disk secured to the axle of the trip roller, and a roller carried by the cam sleeve adapted to engage and rotate the intermittent transmission disk.

84. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, a clutch member provided with jaws secured to the cam sleeve, a clutch ring rotatably and slidably mounted on the cam sleeve having jaws adapted to engage the jaws of the clutch member secured to the cam sleeve, a trip shaft journaled in bearings mounted on the frame, a toggle connection between the trip shaft and the clutch ring, a trip bracket secured to the trip shaft, a plunger slidably mounted in the trip bracket, a trip roller mounted on the plunger, a stop cam having its axle journaled in the frame adapted to engage the trip roller and rotate the trip shaft and throw the clutch jaws out of engagement, an intermittent transmission disk secured to the axle of the trip roller, and a roller carried by the cam sleeve adapted to engage and rotate the intermittent transmission disk a partial revolution for each rotation of the cam sleeve.

85. In a wire article forming machine of the class described, means for intermittently feeding a length of wire to the machine, shear plates for shearing off the length of wire to form a blank, die plates coacting with the shear plates for forming a hook at each end of the blank, bending dies for supporting the central portion of the blank, a dog for gripping the central portion of the blank during the bending operation, swinging guiding arms for initially supporting the end portions of the blank, means for normally holding the swinging guiding arms in a horizontal position, a plurality of coacting sets of dies for forming each end portion of the blank in sequence, and means for forming the completed end portions in succession.

86. In a wire article forming machine of the class described, coacting rolls adapted to intermittently feed a length of wire to the machine, stationary bending dies for supporting the central portion of the wire length, shear plates and coacting die plates for forming a blank by cutting the wire into lengths and for simultaneously forming a hook on each end portion of the blank, swinging guiding arms for supporting the end portions of the blank, swinging loop formers for bending the end portions of the blank into loop form, rotary dies coacting with stationary dies for forming a recess in the blank between each loop formed end and the central portion of the blank, a former plate coacting with a corner die for bending the wire between each of the loops and the central portion of the blank, a corner die holder for the corner die adapted for lateral sliding movement, and twister formers for bending the looped ends adjacent to the recesses at right angles to the central portion of the blank.

87. In a wire article forming machine of the class described, coacting rolls adapted to intermittently feed a length of wire to the machine, stationary bending dies for supporting the central portion of the wire length, shear plates and coacting die plates for forming a blank by cutting the wire into lengths and for simultaneously forming a hook on each end portion of the blank, swinging guiding arms for supporting the end portions of the blank, swinging crank arms, means for rotating the crank arms, a loop former connected to each crank arm adapted to bend the end portions of the blank into loop form, a former plate carried by each crank arm coacting with a corner die for bending the wire between each of the loops and the central portion of the blank, a slidably mounted corner die holder for each corner die, a slide for supporting each corner die holder, rotary dies coacting with stationary dies for forming a recess in the blank between each loop formed end and the central portion of the blank, twister formers for bending the loop formed ends adjacent to the recesses at right angles to the central portion of the blank, and kinkers for laterally bending the loop formed ends.

88. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, a trip mechanism adapted to automatically disengage the driving means at the completion of a forming operation, comprising a trip shaft journaled in bearings mounted on the frame, a toggle link connection between the clutch and the trip shaft, and means for rotating the trip shaft to flex the toggle link connection to throw the clutch out of engagement.

89. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, a trip mechanism adapted to automatically disengage the driving means at the completion of a plurality of article forming operations, comprising a trip shaft journaled in bearings mounted on the frame, a toggle link connection between the clutch and the trip shaft, a trip bracket mounted on the trip shaft, a plunger adapted to reciprocate in the trip bracket, a trip roller mounted on the plunger, a stop cam adapted to engage the trip roller to rotate the trip shaft, and means actuated by the cam sleeve adapted to intermittently rotate the stop cam.

90. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, a trip mechanism adapted to automatically disengage the driving means at the completion of a plurality of article forming operations, comprising a trip shaft journaled in bearings mounted on the frame, a toggle link connection between the clutch and the trip shaft, a trip bracket secured to the trip shaft, a plunger adapted to reciprocate in the trip bracket, a trip roller mounted on the plunger, a stop cam adapted to engage the trip roller to rotate the trip shaft and flex the toggle link connection, an axle for the stop cam journaled in the frame, an intermittent transmission disk secured to the axle, slots formed in the intermittent transmission disk, and a roller carried by the cam sleeve adapted to engage one of the slots for each revolution of the cam sleeve and rotate the intermittent transmission disk a partial revolution.

91. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, a trip mechanism adapted to automatically disengage the driving means for the cam sleeve after the completion of a plurality of article forming operations, comprising a shaft journaled in bearings mounted on the frame, toggle link connections between the clutch and the shaft, a spring connecting the links of each toggle to assist in flexing the links, a trip bracket secured to the trip shaft, a plunger adapted to reciprocate in the trip bracket, a spring in the trip bracket for engaging the plunger, a trip roller mounted on the plunger, a stop cam adapted to engage the trip roller and thereby rotate the shaft and flex the toggle link connections, an axle for the stop cam journaled in the frame, an intermittent transmission disk secured to the axle, radial slots formed in the intermittent transmission disk, a roller carried by the cam sleeve adapted to engage one of the slots for each revolution of the cam sleeve and rotate the intermittent transmission disk a partial revolution, and means for throwing the trip roller into and out of engagement with the stop cam.

92. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, a roller connected to the cam sleeve, and a trip mechanism actuated by the roller during the rotation of the cam sleeve adapted to automatically disengage the driving means for the cam sleeve.

93. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, a roller connected to the cam sleeve, a trip mechanism intermittently actuated by the roller during the rotation of the cam sleeve adapted to automatically disengage the driving means for the cam sleeve after the completion of a plurality of article forming operations.

94. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, a roller connected to the cam sleeve, a trip mechanism intermittently actuated by the roller during the rotation of the cam sleeve adapted to automatically disengage the driving means for the cam sleeve after the completion of a plurality of article forming operations, and independent means operated manually for throwing the clutch into or out of engagement.

95. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, a trip mechanism adapted to be actuated by the rotation of the cam sleeve to automatically disengage the driving means for the cam sleeve after the completion of the article forming operation, comprising a shaft journaled in bearings mounted on the frame, toggle link connections between the clutch and the shaft, a trip bracket secured to the shaft, a bracket plate secured to opposite sides of the trip bracket, an arc shaped way having a limit abutment at opposite ends formed in one of the bracket plates, a slideway formed centrally in the trip bracket, a sliding shoe mounted in the slideway, guideways formed on opposite sides of the sliding shoe, a trip plunger having a reduced end portion and an abutment mounted to reciprocate in the trip bracket, a spring on the reduced end portion of the plunger interposed between the trip bracket and the abutment on the plunger, a trip roller attached to one end of the plunger, a trip lever shaft journaled in the bracket plates, a trip yoke secured to the trip lever shaft provided with spaced arms extending into the guideways of the sliding shoe, a trip lever secured to the trip lever shaft, a pin mounted in one end of the trip lever and adapted to extend from opposite sides thereof, a reduced portion formed on one of the projecting ends of the pin adapted to extend into the arc shaped way formed in one of the bracket plates, a coupling attached to the opposite end of the pin, a coupling rod having one end attached to the coupling, and a pedal attached to the opposite end of the coupling rod adapted to be manually operated to actuate the trip mechanism.

96. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, a roller mounted on the cam sleeve, an axle journaled in the frame, an intermittent transmission disk attached to the axle and engaged by the roller and adapted to rotate it a partial revolution for each rotation of the cam shaft, a stop cam secured to the said axle, a shaft journaled in bearings attached to the frame, toggle link connections between the shaft and the clutch, a trip bracket mounted on the shaft, a plunger mounted in the trip bracket, a trip roller mounted on the plunger, and means for reciprocating the plunger to throw the trip roller into or out of engagement with the stop cam.

97. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, an axle journaled in the frame, an intermittent transmission disk secured to the axle, a roller carried by the cam sleeve adapted to engage the intermittent transmission disk to rotate it a partial revolution for each rotation of the cam sleeve, a stop cam secured to the axle for rotation with the intermittent transmission disk, a shaft journaled in bearings attached to the frame, toggle link connections between the shaft and the clutch, a spring connecting the toggle links to assist in flexing the links, a trip bracket mounted on the shaft, a plunger mounted in the trip bracket, a trip roller mounted on the plunger, a slide mounted on the plunger in the trip bracket, and means for reciprocating the slide and plunger to throw the trip roller mounted on the plunger into or out of engagement with the stop cam.

98. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, an axle journaled in the frame, an intermittent transmission disk secured to the axle, a roller carried by the cam sleeve for engaging the intermittent transmission disk adapted to rotate it a partial revolution for each revolution of the cam sleeve, a stop cam secured to the axle for rotation with the intermittent transmission disk, a shaft journaled in bearings attached to the frame, toggle link connections between the shaft and the clutch, a trip bracket mounted on the shaft, a plunger mounted in the trip bracket, a trip roller mounted in the plunger, a slideway formed in the trip bracket, a slide mounted on the plunger in the slideway, bracket plates secured to each side of the trip bracket, a trip lever shaft journaled in the bracket plates, a trip yoke secured to the trip lever shaft having spaced arms for engaging the slide, a trip lever secured to the trip lever shaft, and a pedal having a connection with the trip lever adapted to throw the trip roller into or out of engagement with the stop cam.

99. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, an axle journaled in the frame, an intermittent transmission disk secured to the axle, a roller carried by the cam sleeve for engaging the intermittent transmission disk and adapted to rotate it a partial revolution for each revolution of the cam sleeve, a stop cam secured to the axle for rotation with the intermittent transmission disk, a shaft journaled in bearings attached to the frame, toggle link connections between the shaft and the clutch, a trip bracket mounted on the shaft, a plunger mounted in the trip bracket, a trip roller mounted on the plunger adapted to engage the stop cam, means operated manually for reciprocating the plunger to throw the trip roller into or out of engagement with the stop cam, means actuated by the rotation of the cam sleeve to automatically throw the clutch out of engagement, and means for raising the trip roller off the stop cam.

100. In a wire article forming machine of the class described, a frame, a main shaft supported by the frame, a cam sleeve mounted on the main shaft, a plurality of cams mounted on and secured to the cam sleeve for actuating the wire feeding, shearing, forming and ejecting mechanism, driving means for rotating the cam sleeve, a clutch on the cam sleeve for controlling the driving means, an axle journaled in the frame, an intermittent transmission disk secured to the axle, a roller carried by the cam sleeve for engaging the intermittent transmission disk and adapted to rotate it a partial revolution for each revolution of the cam sleeve, a stop cam secured to the axle for rotation simultaneously with the intermittent transmission disk, means for adjusting the stop cam after each intermittent movement, a trip mechanism comprising a shaft journaled in bearings attached to the frame, toggle link connections between the shaft and the clutch, a trip bracket mounted on the shaft, a plunger mounted in the trip bracket, a trip roller mounted on the plunger adapted to engage the stop cam, means operated manually for reciprocating the plunger to throw the trip roller into or out of engagement with the stop cam, means actuated by the rotation of the cam sleeve to automatically throw the clutch out of engagement, and a resilient connection attached to the toggle link for raising the trip roller off the stop cam.

101. In a wire article forming machine of the class described, means for intermittently feeding a length of wire to the machine, coacting shear plates and die plates adapted to cut the fed length of wire to form a blank and to simultaneously bend a hook at each end thereof, means for supporting the central and end portions of the blank, a swinging loop former and former plate adapted to coact with an anvil and a corner die to form a loop and a crimp in one end portion of the blank, a recess former die coacting with a twister horn adapted to form a recess in the blank between the central and formed end portion, a twister former for bending the formed end portion adjacent to the recess at right angles to the central portion of the blank, and means for forming the opposite end portion of the blank in a similar manner and in succession to the first formed end.

102. In a wire article forming machine of the class described, means for intermittently feeding a length of wire to the machine, coacting shear plates and die plates adapted to cut the fed length of wire to form a blank and to simultaneously bend a hook at each end thereof, stationary bending dies for supporting the central portion of the blank, a swinging guiding arm for supporting each end portion of the blank, a swinging crank arm, a loop former and a former plate carried by the swinging crank arm adapted to coact with a rocking anvil and a relatively stationary corner die to form a loop and a crimp in one end portion of the blank, a rotating recess former coacting with a stationary twister horn adapted to form a recess in the blank between the central and formed end portion, a rotating twister having a twister former coacting with a stationary former for bending the formed end portion at right angles to the central portion of the blank, and means for forming the opposite end portion of the blank in a similar manner and in succession to the first formed end portion.

103. In a wire article forming machine of the class described, a main shaft, a cam sleeve mounted on the main shaft, means for rotating the cam sleeve, a cam disk mounted on the cam sleeve, a plurality of cams mounted on the cam disk, means for adjusting the cams on the cam disk concentrically, means for intermittently feeding a length of wire to the machine, coacting shear plates and die plates adapted to cut the fed length of wire to form a blank and to simultaneously bend a hook at each end thereof, stationary bending dies for supporting the central portion of the blank, a swinging guiding arm for supporting each end portion of the blank, a swinging crank arm, a loop former and a former plate carried by the swinging crank arm adapted to coact with a rocking anvil and a relatively stationary corner die to form a loop and a crimp in one end portion of the blank, a recess former and a coacting stationary twister horn, a plunger projected by a cam on the cam disk to rotate the recess former to form a recess in the blank between the central and formed end portions, a twister having a twister former adapted to coact with a stationary former, a plunger projected by a cam on the cam disk to rotate the twister and for bending and offsetting the formed end portion at right angles to the central portion of the blank, and means for forming the opposite end of the blank in a similar manner and in succession to the first formed end portion.

104. In a wire article forming machine of the class described, a main shaft, a cam sleeve mounted on the main shaft, means for rotating the cam sleeve, a cam disk mounted on the cam sleeve, a plurality of cams mounted on the cam disk, a plurality of concentric grooves formed in the cam disk, a ring seated in each groove, a cam attached to each ring, clamping means for securing the rings to the disk and to allow for adjustment, means for intermittently feeding a length of wire to the machine, coacting shear plates and die plates adapted to cut the fed length of wire to form a blank and to simultaneously bend a hook at each end thereof, stationary bending dies having offset ends for supporting the central portion of the blank, a swinging guiding arm for supporting each end portion of the blank, a swinging crank arm, a loop former and a former plate carried by the swinging crank arm adapted to coact with a rocking anvil and a relatively stationary corner die to form a loop and a crimp in one end portion of the blank, a top twister block, a pinion mounted in the top twister block, a recess former attached to the pinion, a stationary twister horn adapted to coact with the recess former, a plunger having a rack for engaging the pinion, a roller carried by the plunger for engaging a cam on the cam disk to rotate the recess former and form a recess in the blank between the central and formed end portions, a twister having a twister former adapted to coact with a stationary former, a toothed portion formed on the twister, a plunger having a rack for engaging the toothed portion of the twister, a roller carried by the plunger for engaging a cam on the cam disk to rotate the twister adapted to bend and offset the formed end portion at right angles to the central portion of the blank, and means for forming the opposite end of the blank in a similar manner and in succession to the first formed end portion.

105. In a wire article forming machine of the class described, comprising means for intermittently feeding a length of wire to the machine, means for cutting the fed wire into a length to form a blank and then simultaneously bending a hook at each end of the blank, means for forming a loop and a crimp in one end portion of the blank, means for forming a recess between the central portion of the blank and the loop formed end, means for twisting the wire between the loop formed end and the recess, means for bending and offsetting the formed end portion adjacent to the recess at right angles to the central portion of the blank, and means for forming the opposite end portion of the blank in a similar manner and in succession to the first formed end portion.

106. In a wire article forming machine of the class described, means for intermittently feeding a length of wire to the machine, a shear plate for shearing off the fed length of wire to form a blank, a plurality of coacting pairs of bending dies operating in sequence for forming one end portion of the blank, and a plurality of coacting pairs of bending dies operating in sequence for forming the opposite end portion of the blank in succession to the first formed end portion.

107. In a wire article forming machine of the class described, means for intermittently feeding a length of wire to the machine, a shear plate for shearing off the fed length of wire to form a blank, a plurality of coacting pairs of bending dies operating in sequence for forming one end portion of the blank in the same vertical plane as the central portion of the blank, a pair of recess forming dies adapted to bend the wire at right angles to the vertical plane, and means for forming the opposite end portion in a similar manner and in succession to the first formed end portion.

108. In a wire article forming machine of the class described, means for intermittently feeding a length of wire to the machine, a shear plate for shearing off the fed length of wire to form a blank, a plurality of coacting pairs of bending dies operating in sequence for forming one end portion of the blank in the same vertical plane as the central portion of the blank, a pair of recess forming dies adapted to bend the wire at right angles to the vertical plane, means for forming the opposite end portion in a similar manner and in succession to the first formed end portion, and twister formers adapted to be operated to bend and offset the formed end portions in succession at right angles to the central portion of the blank.

109. In a wire article forming machine of the class described, means for feeding a length of wire to the machine, means for intermittently shearing off the length of wire, coacting dies for forming one end portion of the length of wire, and coacting dies for forming the other end portion of the length of wire in succession to the first formed end portion.

110. In a wire article forming machine of the class described, means for intermittently feeding a length of wire to the machine, means for shearing off the length of wire, a plurality of coacting pairs of dies for forming one end portion of the length of wire, and a plurality of coacting pairs of dies for forming the other end portion of the length of wire in succession to the first formed end portion.

111. In a wire article forming machine of the class described, means for intermittently feeding a length of wire to the machine, means for shearing off the length of wire, a plurality of coacting pairs of dies operated in sequence for forming one end portion of the length of wire, and a plurality of coacting pairs of dies operated in sequence for forming the other end portion of the length of wire and in succession to the first formed end portion.

112. In a wire article forming machine of the class described, means for feeding a length of wire to the machine, means for shearing off the length of wire, a plurality of coacting pairs of dies operated in sequence adapted to form one end portion of the length of wire and bend it laterally of the central portion, a plurality of coacting pairs of dies operated in sequence for forming the other end portion of the length of wire and bend it laterally of the central portion and in succession to the first formed end portion, and means for holding the central portion of the length of wire stationary during the formation of the end portions.

EULA S. GEER,
*Administratrix of the Estate of Harry R. Geer, Deceased.*

CERTIFICATE OF CORRECTION.

Patent No. 2,116,169. May 3, 1938.

EULA S. GEER, ADMINISTRATRIX OF
HARRY R. GEER, DECEASED.

It is hereby certified that error appears in the printed specification of the above numbered patent requiring correction as follows: Page 27, second column, line 32, claim 109, strike out the word "intermittently" and insert the same after "for" in line 31, same claim; and that the said Letters Patent should be read with this correction therein that the same may conform to the record of the case in the Patent Office.

Signed and sealed this 2nd day of August, A. D. 1938.

(Seal)
Leslie Frazer,
Acting Commissioner of Patents.